(12) United States Patent
Plummer

(10) Patent No.: US 11,680,550 B2
(45) Date of Patent: Jun. 20, 2023

(54) SYSTEM AND METHOD FOR INDEPENDENTLY CONTROLLING FIRING OF INDIVIDUAL INTERNAL COMBUSTION ENGINE CYLINDERS AT LEAST PARTLY WITH ENGINE POSITION SENSOR

(71) Applicant: Duram Plummer, Bend, OR (US)

(72) Inventor: Duram Plummer, Bend, OR (US)

( * ) Notice: Subject to any disclaimer, the term of this patent is extended or adjusted under 35 U.S.C. 154(b) by 0 days.

(21) Appl. No.: 18/070,087

(22) Filed: Nov. 28, 2022

(65) Prior Publication Data
US 2023/0099571 A1    Mar. 30, 2023

Related U.S. Application Data

(63) Continuation of application No. PCT/US2021/037139, filed on Jun. 12, 2021.

(60) Provisional application No. 63/040,333, filed on Jun. 17, 2020.

(51) Int. Cl.
| | |
|---|---|
| *F02P 7/07* | (2006.01) |
| *F02P 5/15* | (2006.01) |
| *F02D 41/06* | (2006.01) |
| *F02D 35/02* | (2006.01) |

(Continued)

(52) U.S. Cl.
CPC .............. *F02P 5/1512* (2013.01); *F02P 5/153* (2013.01); *F02P 5/1506* (2013.01); *F02P 5/1522* (2013.01)

(58) Field of Classification Search
CPC ....................................................... F02P 7/07
See application file for complete search history.

(56) References Cited

U.S. PATENT DOCUMENTS

| | | |
|---|---|---|
| 3,906,920 A | 9/1975 | Hemphill |
| 4,194,480 A | 3/1980 | Rado |
| 4,198,941 A | 4/1980 | Oishi |

(Continued)

FOREIGN PATENT DOCUMENTS

| | | |
|---|---|---|
| DE | 2844054 | 4/1980 |
| JP | S58133479 | 8/1983 |

(Continued)

OTHER PUBLICATIONS

International Search Report and Written Opinion dated Sep. 10, 2021 for International Application No. PCT/US2021/037139.

*Primary Examiner* — John Kwon
*Assistant Examiner* — Arnold Castro
(74) *Attorney, Agent, or Firm* — Jose R. Mata

(57) ABSTRACT

An electronic engine timing system that includes at least (1) an engine position sensor that includes a diametric magnet and two or more hall effect sensors configured and positioned to sense diametric magnet position, (2) sensor data receiving circuitry configured for receiving sensory input, including at least input from the engine position sensor; and (3) control circuitry configured to control firing of one or more cylinders of the engine at least in part by calculating one or more timing advance positions for one or more cylinders of the engine and by causing the one or more cylinders to fire according to the one or more calculated timing advance positions, the control circuitry further configured to calculate the one or more timing advance positions for the one or more cylinders separately from one another based at least in part on input from the engine position sensor.

63 Claims, 32 Drawing Sheets

(51) Int. Cl.
  *F02P 5/152*  (2006.01)
  *F02P 5/153*  (2006.01)

(56) References Cited

U.S. PATENT DOCUMENTS

| | | | |
|---|---|---|---|
| 4,236,491 | A | 12/1980 | Hattori et al. |
| 4,320,729 | A | 3/1982 | Sawada et al. |
| 4,376,429 | A | 3/1983 | Youngblood |
| 4,562,813 | A | 1/1986 | Okado et al. |
| 4,567,751 | A | 2/1986 | Ootsuka et al. |
| 4,597,366 | A | 7/1986 | Chen |
| 4,606,314 | A | 8/1986 | Yamazaki |
| 4,658,789 | A | 4/1987 | Morita |
| 4,810,967 | A | 3/1989 | Yokoyama et al. |
| 4,966,117 | A | 10/1990 | Kawamura |
| 5,085,192 | A | 2/1992 | McDougal et al. |
| 5,156,125 | A | 10/1992 | Fukui et al. |
| 5,544,633 | A | 8/1996 | Mottier et al. |
| 6,050,242 | A * | 4/2000 | Wilkinson .............. F02P 7/077 324/207.2 |

FOREIGN PATENT DOCUMENTS

| | | |
|---|---|---|
| JP | S6253708 | 11/1987 |
| JP | 1446049 | 6/1988 |
| WO | WO 2015/092480 A1 | 6/2015 |

* cited by examiner

SYSTEM AND METHOD FOR INDEPENDENTLY CONTROLLING FIRING OF INDIVIDUAL INTERNAL COMBUSTION ENGINE CYLINDERS AT LEAST PARTLY WITH ENGINE POSITION SENSOR

CROSS-REFERENCE TO RELATED APPLICATIONS

The present application claims priority to U.S. Provisional Patent Application No. 63/040,333, entitled "System and Method for Independently Controlling Firing of Individual Internal Combustion Engine Cylinders at least partly with Engine Position Sensor," filed Jun. 17, 2020 and to an international application PCT/US2021/037139, entitled "System and Method for Independently Controlling Firing of Individual Internal Combustion Engine Cylinders at least partly with Engine Position Sensor," filed Jun. 12, 2021, which both originated in and designated the United States. Each of the above applications is hereby incorporated by reference in their entireties.

TECHNICAL FIELD

Certain embodiments pertain to a system and method for independently controlling the firing of individual internal combustion cylinders at least in part with an engine position sensor. Certain particular embodiments pertain to a system and method for independently controlling the firing of individual internal combustion cylinders at least in part with a single engine position sensor that includes a diametric magnet.

BACKGROUND

Controlling the timing of the firing of cylinders in internal combustion engines is important for performance, fuel efficiency, and engine safety. One timing issue is the timing advance. The timing advance is a number of degrees before top-dead-center that a sparkplug will be ignited in a cylinder. Generally, as an engine runs faster the amount of advance increases. If there is not enough advance, there is engine sluggishness, decreased performance, and fuel inefficiency. If there is too much advance, engine knocking, detonations, and engine damage may occur.

SUMMARY

The following summary introduces at a high level a limited number of topics described in the Detailed Description. This summary is not intended to identify key or essential features and should not be used for that purpose. In addition, this summary is not intended to be used as a guide to the scope of the claims. Instead, this Summary is provided as an introduction for the reader.

Some embodiments provide an electronic engine timing system that includes at least an engine position sensor that is configured to output electrical signals indicative of engine position in an engine firing cycle of an engine, the engine position sensor including at least: (1) a diametric magnet configured to be rotated by at least one of a rotatable distributor shaft or cam shaft; and (2) two or more hall effect sensors configured and positioned to sense diametric magnet position, and the engine position sensor being configured at least via the diametric magnet and the two or more hall effect sensors to output the electrical signals indicative of engine position both when the engine is running and when the engine is not running.

In some embodiments the electronic engine timing system further includes at least sensor data receiving circuitry configured for receiving sensory input, including at least input from the engine position sensor.

In some embodiments the electronic engine timing system further includes at least control circuitry configured to control firing of one or more cylinders of the engine, the control circuitry configured to control the firing at least in part by calculating one or more timing advance positions for one or more cylinders of the engine and by causing the one or more cylinders to fire according to the one or more calculated timing advance positions, the control circuitry further configured to calculate the one or more timing advance positions for the one or more cylinders separately from one another on a per cylinder basis based at least in part on input from the engine position sensor.

Some embodiments provide a method preformed with an electronic engine timing system. The method may include at least generating engine position data at least in part by calculating distributor shaft position with an engine position sensor that is configured to output electrical signals indicative of engine position in an engine firing cycle of an engine both when the engine is running and when the engine is not running and that includes at least: (1) a diametric magnet configured to be rotated by at least one of a rotatable distributor shaft or cam shaft, and (2) two or more hall effect sensors configured and positioned to sense diametric magnet position.

In some embodiments the method further includes at least receiving sensory input that includes at least the generated engine position data.

In some embodiments the method further includes at least controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor.

BRIEF DESCRIPTION OF THE FIGURES

Various embodiments will now be described, by way of example, with reference to the accompanying drawings. It should be noted that these drawings are not necessarily to scale. In addition, the drawings are simplified to avoid obscuring important principles with unnecessary details.

DETAILED DESCRIPTION

Figure 1:
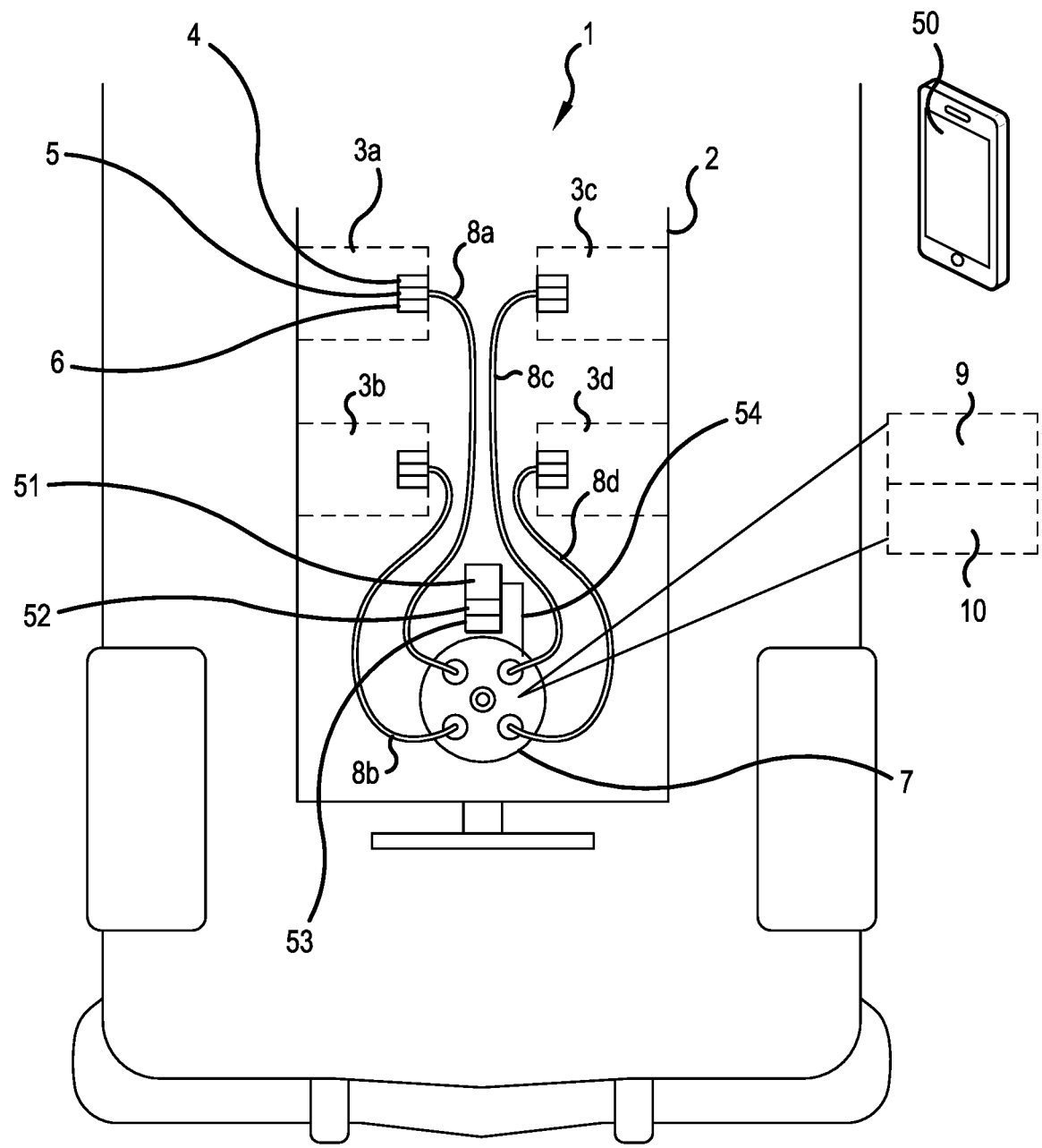
FIG. 1 is a simplified schematic diagram showing an exemplary environment in which some embodiments may be implemented.

Some embodiments are now described with reference to the above-described figures. In the following description, multiple references are often made to "some embodiments." These references to "some embodiments" are not necessarily referring to the same embodiments, as numerous and varied embodiments are possible. No effort is made to describe all possible embodiments. Sufficient embodiments are described so that those skilled in the art will become appraised of the relevant principles. In addition, disclosed embodiments are not necessarily preferred or advantageous over other embodiments.

Additionally, in various embodiments those skilled in the art will recognize that various combinations of features are possible. Therefore is, no features should be considered essential unless explicitly indicated.

Various limitations exist in traditional engine timing systems for controlling engine timing in motor vehicles with internal combustion engines. And in particular there are various limitations with traditional engine timing systems with respect to controlling the firing of the cylinders with an optimal advance.

One limitation involves legacy automobiles that were sold with and are still operating with mechanical distributors that use a mechanical rotor. Mechanical distributors are not extremely accurate in determining an optimal timing advance compared with electronic distributors. These mechanical distributors also do not typically provide protection for the engine caused by excessive advance. They rely on mechanic tuning for good running performance. These mechanical distributors also provide for advance only within a fixed static range. Therefore, there is a need to provide these legacy automobiles with engine timing systems that do not have these disadvantages.

Another limitation with traditional engine timing systems in legacy automobiles is that most older cars use a single coil with distributor, rotor and ignition wires. These systems can only produce a small amount of spark energy, for example between 5-20 mJ (milliJoules) of spark energy. In most cases this is enough for the engine to run by only igniting a small amount of the compressed fuel air mixture, which in turn ignites the remaining compressed fuel. The above has disadvantages, including that the burn of the compressed fuel air mixture is not as clean or complete as optimal. Therefore, there is a need for an engine timing system that avoids the above limitations.

But various limitations also exist in traditional electronic engine timing systems for controlling engine timing in motor vehicles with electronic distributors. One limitation is that with traditional vehicle timing systems the same degree of timing advance is typically used for all cylinders in an engine. This approach may not be optimal for all cylinders in a particular engine in all conditions. For example, while a particular advance may be acceptable for a group of cylinders, one or more particular cylinders of the group may experience too much advance (and perhaps experience knocking or other harm) or too little advance (and perhaps experience poor performance, poor gas mileage, or other issues). Therefore there is a need for an engine timing system that provides other than using the same degree of timing advance for all cylinders in a vehicle.

Another limitation is that many traditional electronic engine timing systems use a static advance curve for determining the degree of advance. Static advance curves specify the degree of advance as a function of engine speed specified as revolutions per minute ("RPM"). There is often a maximum timing advance of 25-30 degrees of advance. Determining the degrees of advance based on static advance curves has a disadvantage of not considering all current engine conditions when determining timing advance. For example, while a particular advance may be acceptable in some conditions, in other conditions one or more cylinders of an engine may experience too much advance (and perhaps experience knocking or other harm) or too little advance (and perhaps experience poor performance, poor gas mileage, or other issues). Therefore, there is a need for an engine timing system that allows greater flexibility than can be achieved with static advance curves.

Another limitation is that many traditional engine timing systems determine the position of the engine in its firing order with cogged wheels (reluctor) on the crankshaft and/or camshaft (rotates at one half the rate as the crankshaft). The use of cogged wheels on a crankshaft and/or camshaft are sensed by a hall effect sensor creating a square wave signal that is processed by an Engine Control Module (ECM). The ECM counts the teeth as the engine rotates to determine the overall engine position. This overall position is also used to predict when the engine will be at a certain position. For example a prediction may be made by first calculating a next fire position based on past readings and then scheduling a hardware timer to fire at that next fire position. This prediction is only an accurate prediction of position when the engine is at a constant speed. When engine changes speed up or down these predictions made by counting teeth do not predict the true engine position Therefore, there is a need for is a need for a timing system that provides a more accurate determination of engine position when the engine is in transition.

Therefore, there is a need for one or more engine timing systems that avoid one or more of the above limitations.

Some embodiments of a novel engine timing system include one or more features that overcome one or more limitations of traditional engine timing systems. These features include a engine position sensor that provides highly accurate data on the position of an engine in a firing order. Some embodiments of this engine positions sensor may include at least a diametric magnet and two or more hall effect sensors for detecting the position of the diametric magnet. This engine position sensor is far more accurate than systems that rely on, for example, cogged wheels (reluctor) on the crankshaft and/or camshaft. Some embodiments of this engine position sensor may be sampled in a range of at least 50 thousand and 50 million times per second. Some embodiments of this engine position sensor may output engine position data that correlates to a number of degrees out of 720 degrees with a tolerance of no greater than plus or minus 0.25 degrees. With this sensor, theoretical maximum engine speed is 56,000 revolutions per minute of a crankshaft.

Because of the high sampling frequency and the high accuracy it is not necessary to rely on traditional engine timing systems that predict when the engine will be in a given position in the firing order. Predictions of engine position are not needed. Instead, this novel engine timing system relies on real-time data.

Before discussing other aspects of this novel engine timing system, the following definitions are provided. It should be noted that different definitions of the terms used below may exist in the relevant industries. The purpose of the definitions below is to have consistent terminology for use in this document for the purposes of easing understanding of the relevant principles. These definitions should not be used to limit either the scope of this disclosure. Many different products, systems, and devices may fall within the scope of either this disclosure even though they may at times be described with different definitions. Applicant asserts that those skilled in the art will be able to take the teachings of this disclosure and apply them (without undue experimentation) to technologies that may be expressed with alternative, additional, or different definitions or terminology.

Degrees: A timing advance is often expressed as a given number of degrees before top-dead-center ("TDC"). Engine position may also be discussed in degrees. However a number of degrees in one vehicle may be different than the same number of degrees in another vehicle due to different engine configurations in different models of vehicles. For simplicity, this document will discuss vehicles in which a typical firing cycle is 360 degrees of a camshaft rotation and 720 degrees of crankshaft rotation (a crankshaft rotates twice for each camshaft revolution). Referenced degrees will be out of 720 degrees of crankshaft rotation. Applicant notes that it is well within the capability of those skilled in the art to convert teachings herein to vehicles with a different system for designating engine positions.

Detect point: This is an engine position at which a determination is performed to determine an advance for a next firing of a sparkplug. In some embodiments a detect point may be approximately 720 degrees before the next firing of the sparkplug.

Fire point: A targeted firing position. It may be expressed in degrees. The location of a fire point may be a number of degrees before or after TDC. The location of the fire point relative to TDC determines the amount of advance. A new fire point is calculated every engine cycle at a Detect Point, typically immediately after the preceding fire point. The calculation of a fire point is based on engine speed plus one or more operating parameters such as, for example, knock condition offset (a knock being a detonation in a cylinder), or temperature offset.

RPM: Rotation per minute of a crankshaft. Typically twice distributor speed. In this document RPM is used as the basis for speed.

Dwell Time: The dwell time is the amount of time required to completely charge an ignition coil to get a full and complete spark. Typical dwell times are 3-6 milliseconds.

Dwell Degree: Dwell time converted to degrees. For example, a fire point may be 10 degrees advance (before TDC) with an engine running at 1000 RPM and a dwell time of 4 millisecond ("ms"). It may be desirable to convert 4 ms to dwell degrees. First one may calculate:

(RPM*360)/60000=degrees per ms (degrees per ms)*(dwell time in ms)=dwell degrees Applying the above to the above fact situation, we have:

(1000 RPM*360)/60000=6 degrees per ms (6 degrees per ms)*(dwell time of 4 ms)=24 dwell degrees In other words, at 1000 RPM we need to charge the ignition coil 24 degrees before fire point.

Charge Point: The position that the engine should charge the ignition coil to get correct dwell time and meet perfect fire point. Charge point may be expressed in dwell degrees.

Peak Pressure Position: An engine position at which ignition will generate the highest (i.e. peak) amount of pressure. Feedback data from ion detection (discussed below) returns a value of the current peak pressure position of the engine. This may at times be an ideal position for a fire point, but constant running at peak pressure position may exceed the thermal dissipation capability of the engine. Peak pressure position may, in some embodiments, be a starting point in computing a fire point before considering other factors.

Cylinder Temperature: Some embodiments (as discussed below) use a temperature sensor, such as a thermistor or thermocouple or other temperature sensor, at each cylinder's spark plug. This is used as a feedback for cylinder temperature. In a given engine some cylinders typically run hotter or colder than others, perhaps based on, for example an engine's cooling system. Cylinders that run colder can accommodate a greater degree of advance. In contrast, cylinders that run hotter need less advance.

Advance: Sometimes also called timing advance, advance is a distance (positive or negative) of the fire point from TDC. Advance may be calculated constantly based on many factors. Advance is often calculated based on an advance curve that specifies at least a provisional advance (e.g., before considering other factors) based on RPM. Traditional distributors use a static advance chart based on mechanical springs. As discussed below, in some embodiments a calculated advance curve may be used instead of a static advance curve. The term "calculated timing advance position" is used to refer to an advance calculated according to embodiments described herein, such as for example, an advance calculated based on input from at least (1) a table (e.g. static advance or dynamic table discussed below) and (2) input from an engine position sensor.

Various objectives for various embodiments are now discussed. Some embodiments have one or more objectives for addressing one or more limitations in traditional engine timing system. It is not anticipated that every embodiment will necessarily address all, a majority of these objectives, or even more than one of these objectives.

In some embodiments an objective is to provide an engine timing system in which the advance is determined individually on a per cylinder basis. This addresses a limitation in traditional engine timing systems in which advance is determined only collectively for an engine's cylinders. Determining advance only collectively has disadvantages. In a given engine some cylinders typically run hotter or colder than others, perhaps based on, for example an engine's cooling system. Cylinders that run colder can accommodate a greater degree of advance. In contrast, cylinders that run hotter need less advance. Traditional engine timing systems apply a uniform advance to all cylinders without regard to whether they run colder or hotter. Thus engine performance, fuel efficiency, and engine safety are compromised.

In some embodiments the determining of advance on a per cylinder basis is enabled by using coil packs instead of a single coil. The determining of advance on a per cylinder basis is enabled by the availability of temperature data for individual cylinders instead having available only an overall engine temperature as in many traditional engine timing systems.

In some embodiments an objective is to receive and utilize data regarding cylinders on a per cylinder basis. For example data regarding at least one of temperature or cylinder pressure may be received and utilized on a per cylinder basis to adjust advance. As discussed above, many traditional engine timing systems have the disadvantage of only utilizing an overall engine temperature. Some embodiments avoid these limitations. For example, individual cylinder temperature data may be obtained via temperature sensors (e.g. one or more of a thermistor or a thermocouple), associated with individual spark plugs. As a further example, individual cylinder pressure data may be obtained via ion sensing technology associated with individual sparkplugs.

In some embodiments an objective is to provide a higher output spark voltage and mJ (milliJoules) than is available in traditional distributors. Many traditional distributors only produce a small amount of spark energy, for example, between 10-20 mJ of spark energy. This results in a gradual burn of the fuel air mixture in a cylinder, resulting in a burn that is not as clean or complete as optimal. Some embodiments address this limitation with coil packs that have a power between 40-110 mJ at 13.8V. This higher spark energy is enough to ignite the entire fuel air mixture at once creating a cleaner and more complete burn than with traditional distributors.

In some embodiments an objective is to provide an engine timing system that has an option to use a calculated formula to dynamically determine the degrees of advance. Unlike a static advance curve used by many traditional engine timing systems, a curve determined by a formula may be changed based on changes in engine conditions. For example, the curve may be modified in response to detections of one or more knocks. Because a calculated advance curve may be adjusted in response to conditions, there is no need for a static range of permissible advances as there is in traditional engine timing systems. Nevertheless, some embodiments utilize one of more static tables with a static advance curve.

In some embodiments an objective is to provide for highly accurate real-time data on engine position from an engine position sensor that includes a diametric magnet and two or more hall effect sensors.

Some embodiments of this engine position sensor may output engine position data with a tolerance of no greater than plus or minus 0.25 degrees. In contrast traditional engine timing systems that rely on, for example, cogged wheels (reluctor) on the crankshaft and/or camshaft, need to rely on a computed prediction of a future engine position. With the highly accurate and frequently sampled data from the engine position sensor, there is no need for predicting future the engine position.

In some embodiments an objective is to provide accurate engine position even when the engine is changing speeds or when the engine is stopped (as in at engine start-up). Data from the engine position sensor is accurate enough and sampled frequently enough that accurate engine position data is available regardless of changing engine speeds. Additionally, engine position is available on start-up as soon as the engine is turning. In some embodiments an engine timing system can begin firing spark plugs immediately allowing near instant starting. This contrasts with many traditional engine timing systems which require at least one full revolution of rotation of the crankshaft before sparks start firing taking longer to start.

In research and development, at least one prototype electronic engine timing system achieved a remarkably clean burn of the air-fuel mixture in the combustion chambers of the cylinders of one or more engines of one or more vehicles. Before installing a prototype electronic engine timing system an engine required an RPM of 850 (factory setting was 900 RPM) to be able to idle smoothly. After installing the prototype electronic engine timing system the RPM rose to 1950 because the same amount of air-fuel mixture in the combustion chamber burned cleaner and provided more power. After then adjusting the idle speed to reduce the amount of fuel, the engine was able to run smoothly on an RPM of 180—one fifth of the RPM required for smooth operation under a traditional engine timing system. These results indicate that significant fuel savings are possible with at least some embodiments described herein apparently, at least in part, because the air-fuel mixture is burned more completely than with traditional engine timing systems.

One of more of the objectives may be achieved with an exemplary electronic engine timing system that includes at least an engine position sensor that is configured to output electrical signals indicative of engine position in an engine firing cycle of an engine, the engine position sensor including at least: a diametric magnet configured to be rotated by at least one of a rotatable distributor shaft or cam shaft; and two or more hall effect sensors configured and positioned to sense diametric magnet position; and the engine position sensor being configured at least via the diametric magnet and the two or more hall effect sensors to output the electrical signals indicative of engine position both when the engine is running and when the engine is not running; sensor data receiving circuitry configured for receiving sensory input, including at least input from the engine position sensor; and control circuitry configured to control firing of one or more cylinders of the engine, the control circuitry configured to control the firing at least in part by calculating one or more timing advance positions for one or more cylinders of the engine and by causing the one or more cylinders to fire according to the one or more calculated timing advance positions, the control circuitry further configured to calculate the one or more timing advance positions for the one or more cylinders separately from one another on a per cylinder basis based at least in part on input from the engine position sensor.

Referencing FIG. 1, a vehicle 1 provides an exemplary environment in which some embodiments may be implemented. Vehicle 1 includes at least an engine 2. Engine 2 includes at least cylinders 3a-3d, and a distributor 7 electrically coupled with the cylinders 3a-3d via at least cables 8a-8d respectively. An exemplary cylinder 3a includes at least a spark plug 4 coupled with cable 8a. Consistent with some embodiments spark plug 4 is equipped with ion sensing circuitry 6 (e.g., an ion sensor) to provide cylinder pressure data on a per cylinder basis. Ion sensing circuitry 6 operates by conducting sensing by sensing with the spark plug 4 based on electrical current passed through the spark plug 4 during non-ignition periods of time. Ion sensing circuitry 6 could be, for example, a commercially available ion sensor, for example General Motors Part Number 12205719 or Mitsubishi J5T45171.

Consistent with some embodiments spark plug 4 is also mechanically and electronically coupled with temperature sensor 5, (e.g., a thermistor, a thermocouple, etc.) for providing cylinder temperature data on a per cylinder basis. Although temperature sensor 5 may be either of at least a thermistor or a thermocouple, a thermistor has an advantage of being more resistant to electro-magnetic interference from circuitry of a running engine. In some embodiments, temperature sensor 5 is a commercially available thermistor, such as Amphenol, Model No. CTTS-203856-S02. In some embodiments, temperature sensor 5 could also be a k-type thermocouple. Again consistent with some embodiments distributor 7 includes a controller 9 and an engine position sensor 10.

Engine 2 is also equipped with a global or general engine temperature sensor 52, with a Manifold Absolute Pressure ("MAP") sensor 51 (i.e., a sensor for producing sensor data indicative manifold pressure which can be used for determining at least vehicle load information), and with a wide band oxygen sensor 53 (i.e., a sensor configured to be in communication with a carburetor (not shown) to produce data indicative of at least a lean fuel condition) each connected with distributor 7 via sensor connection wiring 54. One type of MAP sensor 51 is a $O_2$ NOx sensor that is a MAP sensor configured to produce additional readings for NOx gases. Readings for NOx gases allow a system to detect over-advanced ignition and high combustion temperature situations. As used herein the term "wide band oxygen sensor" or MAP sensor includes MAP sensors with and without the ability to produce additional readings for NOx gases.

There is also a mobile device 50 which may be equipped with an app for communicating with controller 9 for providing a mobile user interface to one or more users (not shown). In different embodiments mobile device 50 could be a smartphone, a laptop computer, a tablet computer, an ereader, a smartwatch, or an automotive tool with a communication capability (e.g., a Bluetooth device).

Figure 2:
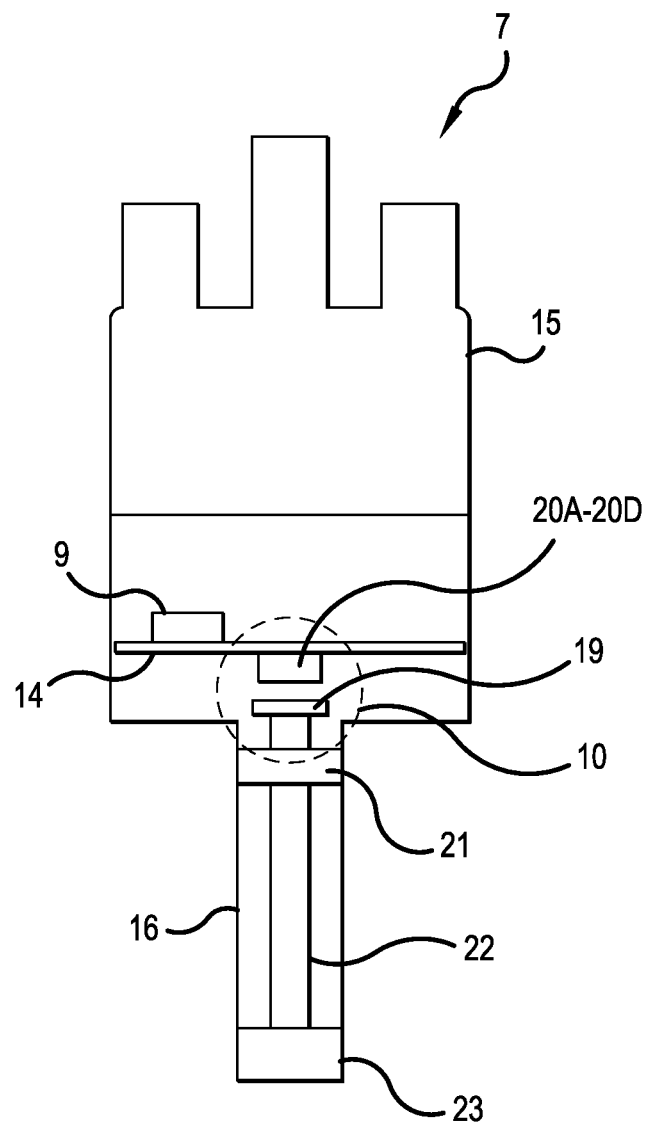
FIG. 2 is a simplified schematic drawing showing an exemplary electronic distributor, consistent with some embodiments, including an engine position sensor with at least a diametric magnet and at least two hall effect sensors.
Figure 27:
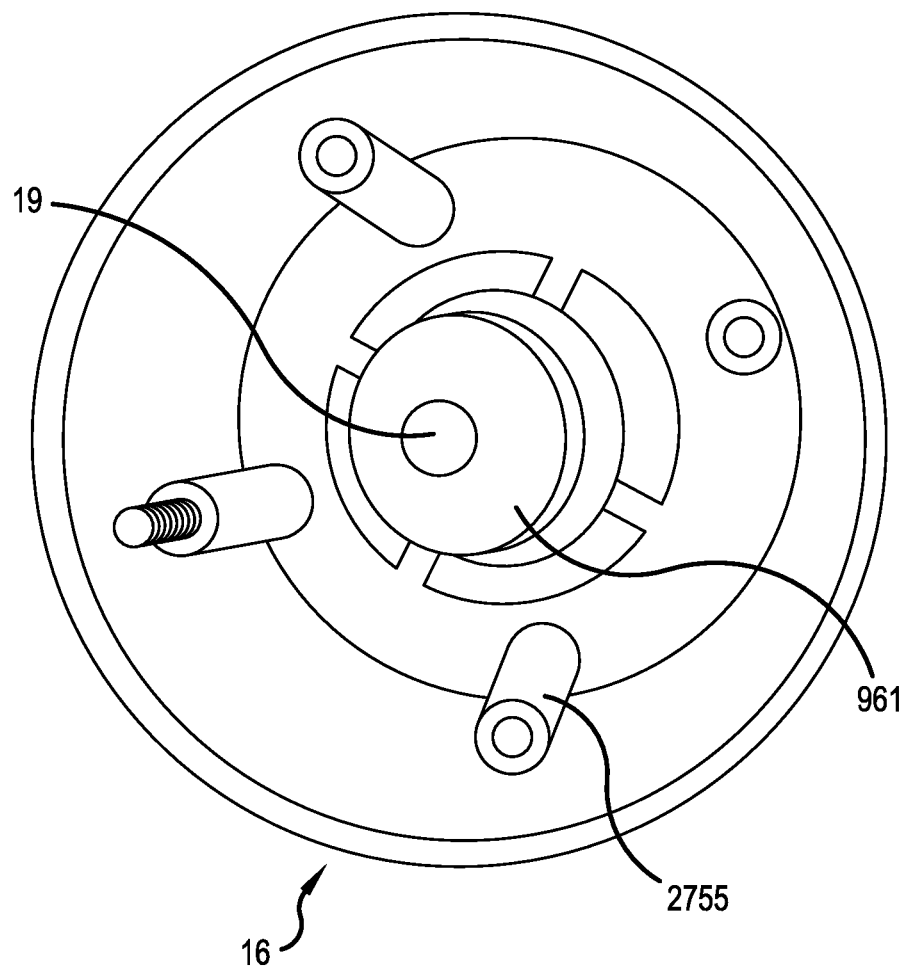
FIG. 27 is a simplified drawing of a diametric magnet mounted in a distributor housing consistent with some embodiments.

Referencing FIG. 2, some pertinent portions of distributor 7 of FIG. 1 are now described, consistent with some embodiments. Distributor 7 includes at least distributor cap 15, distributor housing 16, drive gear 23, and distributor shaft 22. Consistent with some embodiments distributor 7 further includes at least engine position sensor 10, which includes at least diametric magnet 19 and hall effect sensors 20A-20D. Diametric magnet 19 is coaxially coupled with (e.g., mounted to) a distributor shaft 22. In the embodiment shown, the diametric magnet is mounted on a end of the distributor shaft 22, but this is not required. In vehicles without a distributor diametric magnet may be positioned coaxial to camshaft rotation. Also, a diametric magnet may also be disposed inside a distributor (See FIG. 27). Diametric magnets of various dimensions and strengths may be used. In some embodiments diametric magnet 19 is a neodymium magnet diametrically poled. In some embodiments, the diametric magnet 19 is a commercial product, such as, for example, Arnold Magnetic Technologies Part #81X0564-2.

The distributor shaft 22 in turn is driven by a crankshaft (now shown) and rotates at one half the speed of the crankshaft. Consistent with some embodiments distributor 7 also includes a printed circuit board 14 to which the hall effect sensors 20A-20D and a controller 9 are affixed or integral with. Printed circuit board 14 bears hall effect sensors 20A-20D in a position to obtain positional data indicative of the orientation and/or position of the diametric magnet 19. Distributor 7 also includes, consistent with some embodiments, a knock sensor 21 coupled proximate the distributor shaft 7. In some embodiments knock sensor 21 is mounted to the distributor body internally. In other embodiments where space is limited the knock sensor 21 may be bolted to the engine case or cylinder head. In some embodiments knock sensor 21 is an accelerometer configured to detect engine vibrations due to knocking.

Figure 2A:
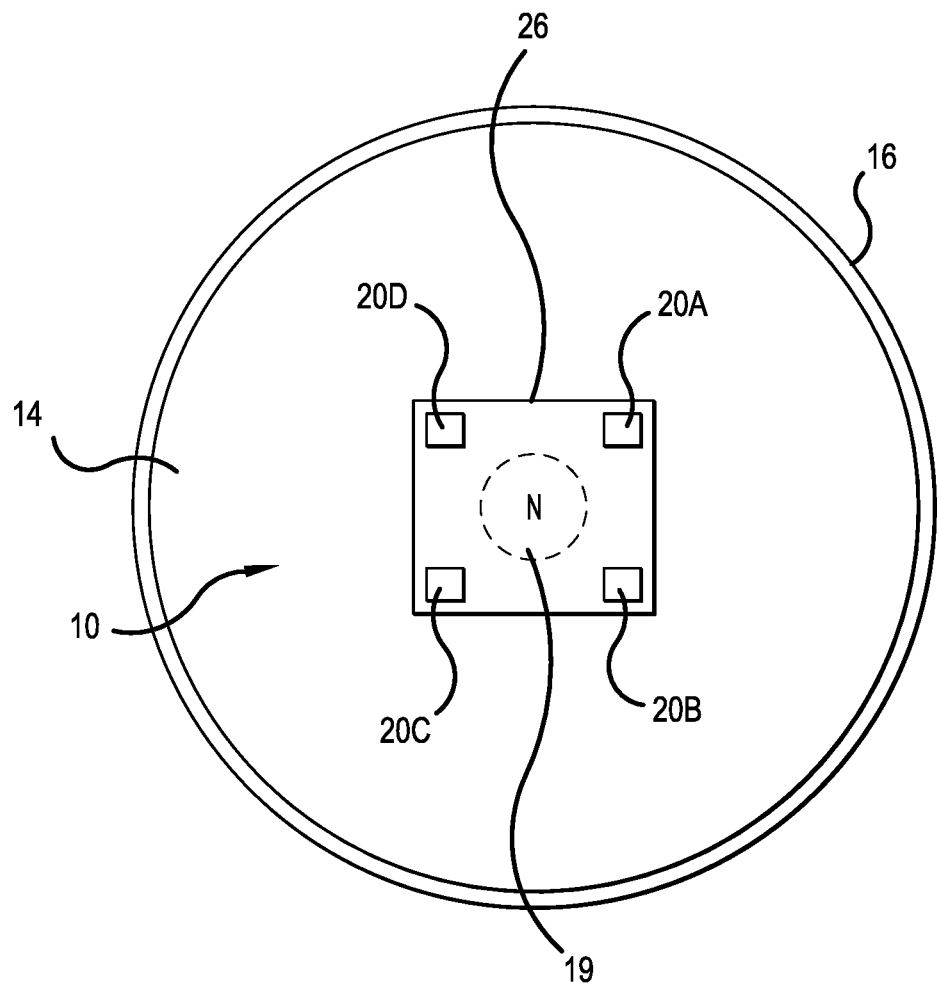
FIG. 2A is a simplified schematic drawing showing an exemplary engine position sensor consistent with some embodiments, including a diametric magnet (in broken line) and a sensor chip that includes four hall effect sensors.

Referencing FIG. 2A, an exemplary engine position sensor 10 is depicted disposed on printed circuit board 14 within distributor housing 16. Consistent with some embodiments, engine position sensor 10 includes at least sensor chip 26 to which are mounted hall effect sensors 20A-20D. Diametric magnet 19 is shown in broken line indicating it is disposed (hidden from normal view) below sensor chip 26 coupled with distributor shaft 22 of FIG. 2. Although four hall effect sensors 20A-20D are shown, in other embodiments different numbers of hall effect sensors are present. For example, in some embodiments there are two hall effect sensors. Preferably there are at least two hall effect sensors to accurately track movement and changing position of diametric magnet 19. In the embodiment shown, there is a single diametric magnet 19.

Figure 9:
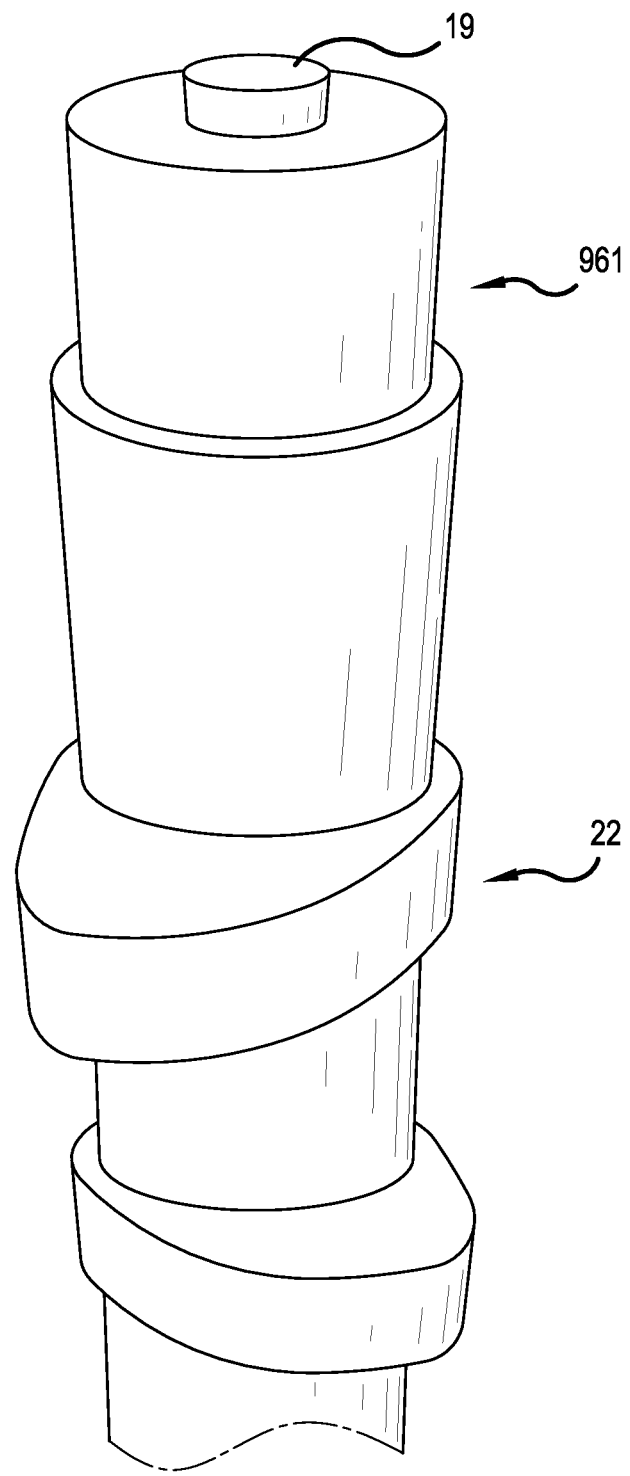
FIG. 9 a simplified drawing of a diametric magnet mounted to a distributor shaft, consistent with some embodiments.

Moving forward to reference FIG. 9, a diametric magnet 19 is mounted to an isolator 961 that is mounted to distributor shaft 22. Isolator 961 in some embodiments is a high temperature carbon composite infused plastic isolator that is bonded to distributor shaft 22 with high temperature epoxy. A distributor shaft is typically made of iron that causes a magnetic disturbance to the magnetic field of the diametric magnet 19. In some embodiments the isolator 961 is of a height sufficient to distance diametric magnet 961 from the iron of the distributor shaft 22. In some embodiments the isolator 961 spaces the diametric magnet 19 at least 5 mm from metal of the distributor shaft 22. In some embodiments the diametric magnet 19 is disposed on the isolator 961 sufficiently close to printed circuit board 14 for the hall effect sensors 20A-20B to read the magnetic field of the diametric magnet 19. In some embodiments the isolator 961 positions the diametric magnet between 0.1 and 3 mm from the printed circuit board 14. The optimum distance between the diametric magnet 19 and the circuit board 14 is dependent on at least the strength of the diametric magnet 19. A stronger magnet can be farther away from the printed circuit board 14 than a weaker one. Moving further forward to reference FIG. 27, a diametric magnet 19 is mounted to an isolator 961 that is mounted to a distributor housing 16 (with fasteners 2755 for attachment of distributor cap 15). Similar considerations apply regarding mounting and placement of diametric magnet 19 and isolator 961 as discussed above relative to FIG. 9.

Returning to reference FIG. 3, an ignition system 30 (e.g., a partial cylinder block) is shown consistent with some embodiments. System 30 includes a valve 34 and a cylinder (e.g., cylinder 3*a* of FIG. 1) in which there is a piston 35 and a combustion chamber 36. Combustion chamber 36 includes a firing end of a sparkplug 4. Sparkplug 4 is functionally coupled with, ignition coil 37, and temperature sensor 5 (e.g., a thermistor or thermocouple). Ignition coil 37 is communicably linked with ion sensing circuitry 6 (i.e., effectively an ion sensor) via ignition cable 8*a*, which continues past ion sensing circuitry 6 to distributor 7. Generally, ion sensing circuitry 6 contains an integrated circuit that provides high voltage to the spark plug 4 during periods between ignition. This voltage creates an ionic field that can be sensed with the ion sensing circuitry 6. The ion sensing circuitry returns an analog signal to controller 9, providing a pressure waveform of the cylinder and combustion.

In some embodiments ignition coil 37 fits firmly around the spark plug 4. A thermistor fits next to the spark plug base as a temperature sensor of the cylinder head. In some embodiments ion sensing circuitry 6 is configured both to detect pressure in cylinder 3*a* and to detect if a knock has occurred in cylinder 3*a*.

Figure 4:
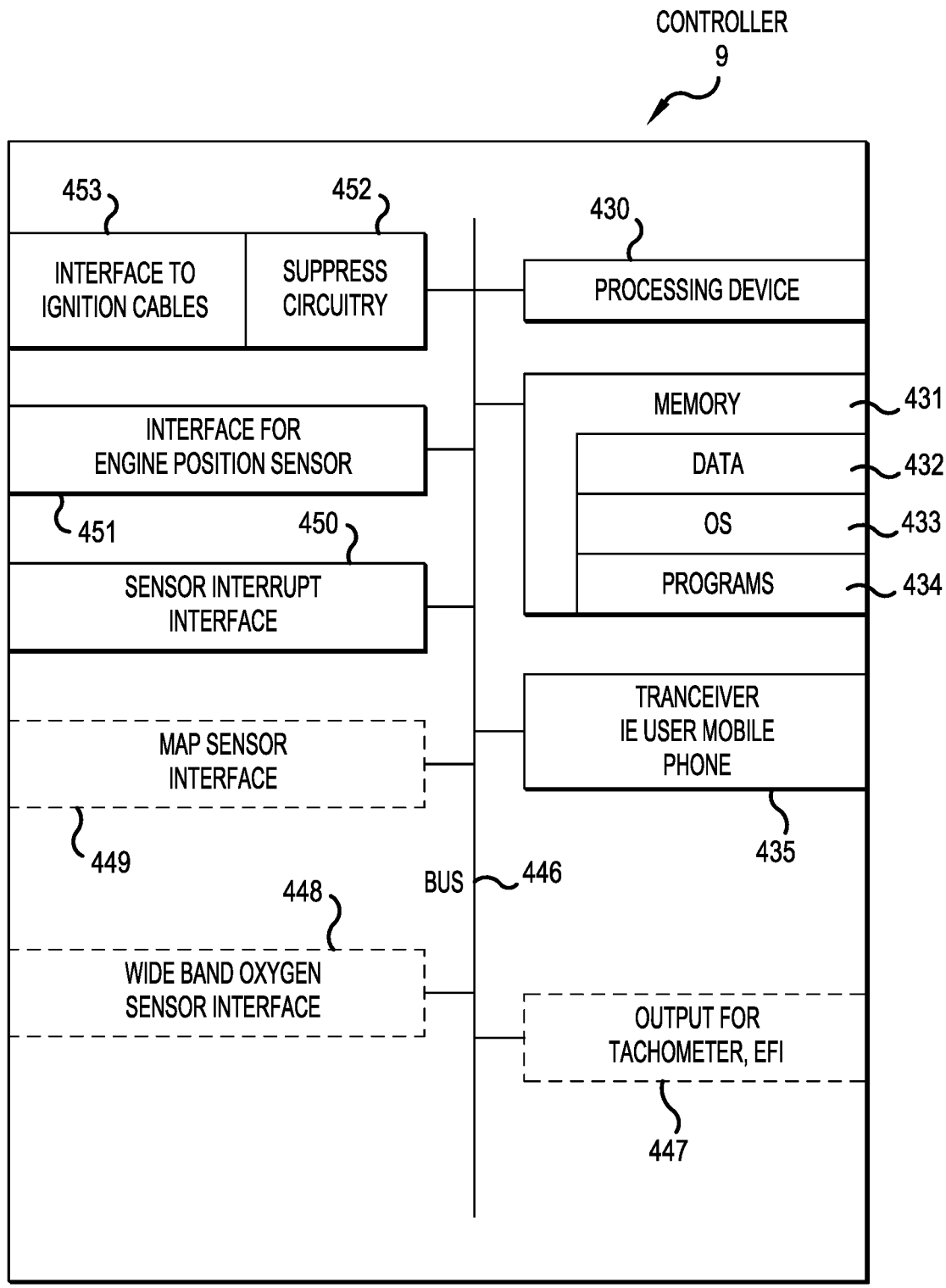
FIG. 4 is a simplified block diagram of a controller, consistent with some embodiments.

Referencing FIG. 4, consistent with some embodiments, a exemplary controller 9 is shown. Controller 9 includes a processing device 430 (e.g., a processor, an application-specific integrated chip (ASIC), field-programmable gate array or other processing circuitry) that is communicably coupled with bus 446. Processing device 430 is communicably coupled with memory 431 (e.g., one or more of volatile or non-volatile memory, cache memory, random access memory, flash memory, hard drive memory, etc.) which includes one or more of data 432 (e.g., one or more of cylinder temperature or pressure data, engine temperature, data from engine position sensor, RPM data, etc.), operating system 433 (e.g., one or more operating system routines, device or program interfaces, interrupt handling routines, etc.), or programs 434 (e.g., executable code for one or more of computing timing advance, for calculating offsets to a provisional advance, etc.). In some embodiments one or more memory functions may be hard-wired into processing device 430 and may not be part of memory. In some embodiments memory 431 is a removable or portable memory, such as a flash drive. In some embodiments, memory 431 is a non-transitory computer readable medium bearing instructions (e.g. at least one of operating system 433 or programs 434) that when executed cause a system to execute at least one of one or more operations, one or more processes, or programs.

Processing device 430 is further coupled with a transceiver 435 (via bus 446) configured to interface with, for example, mobile device 50 of FIG. 1. As discussed below, mobile device may be configured with one or more apps for providing a user interface to a user (not shown). Processing device 430 is also communicably coupled (via bus 446) with output EFI 447 for tachometer (not shown). Most vehicles have a tachometer, which were mechanical and cable driven until mid-1960's but since have been electronic. Input to a tachometer includes a square wave of spark dwell time. This equates similar to a PWM duty cycle. For legacy tachometer to work with some embodiments here, a square wave is provided via output EFI 447.

Continuing with reference to FIG. 4, controller 9 includes at least interface to ignition cables 453 and suppress circuitry 452 for suppressing signals to ignition cables 452 if mobile device (e.g., mobile device 50 of FIG. 1) is not locatable via transceiver 435. Both interface to ignition cables 453 and suppress circuitry 452 are accessible via bus 446 by processing device 430. Additionally or alternatively, suppress circuitry 452 could be a executable code in programs 434 of memory 431. Controller 9 also includes at least interface for engine position sensor 451 for sampling output of engine position sensor 10. Controller 9 also includes at least one sensor interrupt interface 450 for receiving sensory data from one or more sensors, such as temperature sensor 5 of FIG. 1, ionic sensing circuitry 6 of FIG. 1, and/or knock sensor 21 of FIG. 2. In some embodiments one or more sensors generate one or more sensor interrupts which are handled at least partly via sensor interrupt interface 450 and operating system 433. At times in an engine firing cycle sensory interrupts are suppressed (see discussion below relative to FIG. 8). In some embodiments where an engine timing system includes one or more of a MAP sensor or a wide band oxygen sensor, controller 9 may include at least one of MAP sensor interface 449 or wide band oxygen sensor interface 448.

Figure 5:
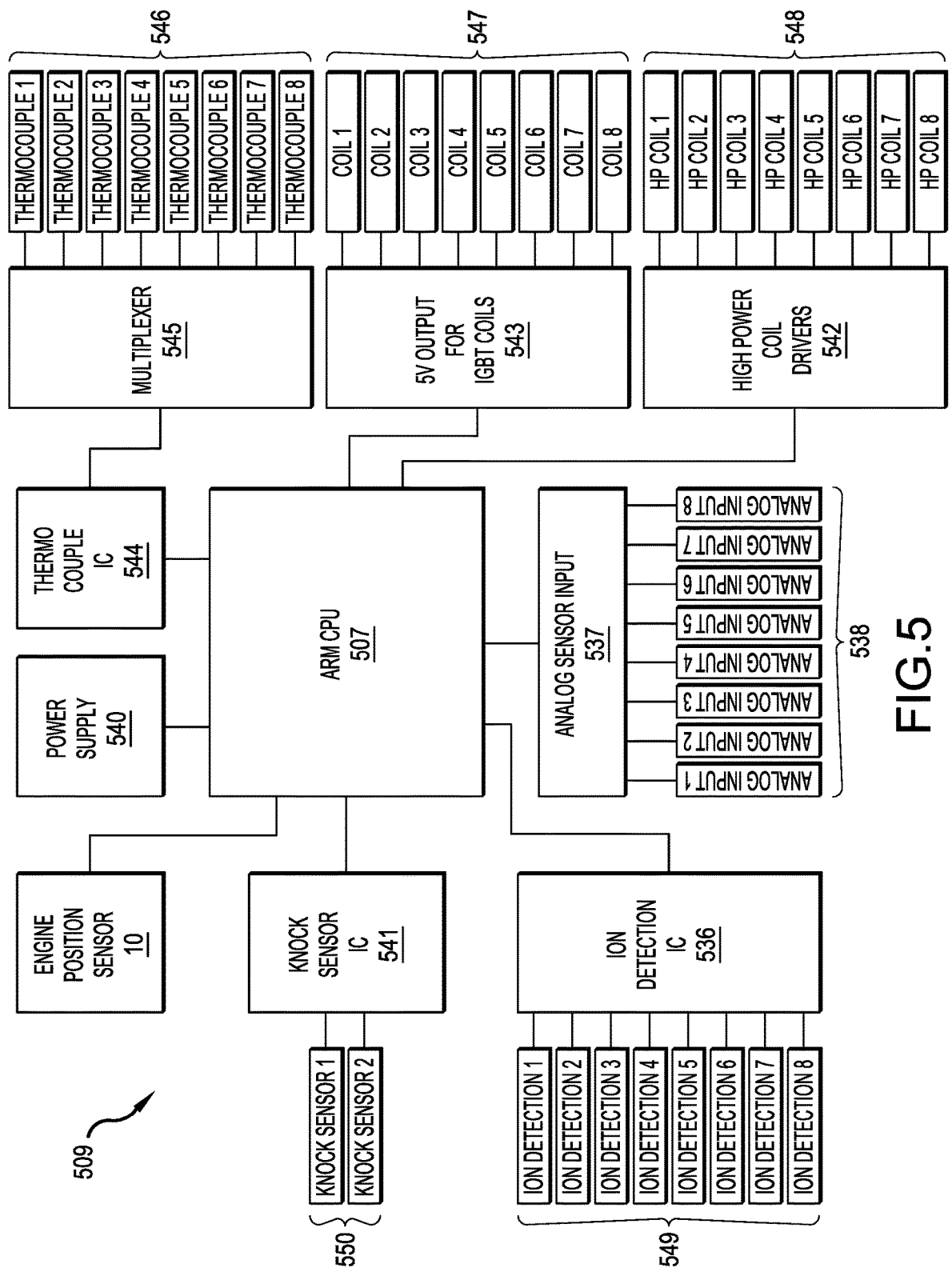
FIG. 5 is a simplified block diagram of a controller, consistent with some embodiments, showing and ARM CPU and other components.

Referencing FIG. 5, a controller 509 is now discussed consistent with some embodiments. In some embodiments, controller 509 is at least similar to controller 9 of FIG. 4, but conceptualized differently, perhaps with different features or circuits emphasized. In general, FIG. 5 presents a more low-level depiction of a controller as compared to FIG. 4. In the discussion below, a number of items are in sets of eight (e.g., analog input units 1-8), consistent with controller 509 being associated with an eight cylinder engine. This is merely an example and different amounts of the various units may exist in different embodiments, including having sets of 6, 4 or some other number.

Consistent with some embodiments, controller 509 includes at least ARM CPU 507. While the embodiment shown uses an ARM CPU, in other embodiments, other types of processing devices, including different types of CPU's may be used. ARM CPU 507 is communicably linked with analog sensor input 537 which in turn is linked with analog input units 1-8 (538). In some embodiments analog input units 1-18 (538) receive input from at least one of wideband oxygen sensor 53 or MAP sensor 51 (or other analog sensors).

Continuing with reference to FIG. 5, ARM CPU 507 is electrically coupled with power supply 540 and is also communicably linked with Ion detection IC 536 which is configured as an interface for ion detection units 1-8 (549) which are ion sensors (e.g. such as ion sensing circuitry 6 of FIG. 1). In some embodiments ARM CPU 507 and ion detection IC 536 are configured to sample input from ion detection units 1-8 (549) between 500 and 50,000 times per ignition cycle (e.g. per 720 degrees of crankshaft rotation). In some embodiments this sampling is performed by ion detection units 1-8 (549) generating interrupts which are then handled by ARM CPU 507. ARM CPU 507 is also communicably linked with knock sensor integrated circuit 541 ("IC") which is communicably lined with knock sensors 1-2 (550), for example knock sensor 21 of FIG. 2. In some embodiments ARM CPU 507 and knock sensor IC 541 are configured to sample input from knock sensors 1-2 (550) in a range between 500 and 50,000 times per ignition cycle (e.g. per 720 degrees of crankshaft rotation). In some embodiments this sampling is performed by knock sensors 1-2 (550) generating interrupts which are then handled by ARM CPU 507. ARM CPU 507 is also communicably linked with engine position sensor 10. In some embodiments, ARM CPU 507 includes interface circuitry for interfacing with engine position sensor 10, similar to engine position sensor interface 451 of FIG. 4.

Further referencing FIG. 5, in some embodiments (as shown) ARM CPU is also communicably linked with thermocouple integrated circuit 544 which is linked with multiplexor 545 (the depiction of thermocouple IC 544 is just an example, in some alternative embodiments, thermistor IC, or other temperature sensor IC). In some embodiments multiplexor 544 is communicably linked to and configured to select a one of thermocouples 1-8 546 (or other temperature sensor 5). Cylinder and engine temperature changes slowly relative to other changes in an engine firing system. Therefore it is not necessary to sample as frequently as for example, sampling of the engine position sensor or the knock sensor. In some embodiments a circuit (See FIG. 7 and discussion) may be used to sample temperature in a different cylinder perhaps one or two times each ignition cycle (e.g. each 720 degrees of crankshaft rotation).

Continuing with reference to FIG. 5, In some embodiments ARM CPU 507 is also communicably coupled with 5 volt output for ignition timing (IBGT) coils 543 (in some embodiments these are IGBT coils ("insulated Gate Bipolar Transistor") which is electrically coupled with individual coils 1-8 (547). In some embodiments ARM CPU 507 is also communicably coupled with high power coil drivers 542 which are electrically coupled with individual high power coils 1-8 (548). High power coils 1-8 (548) may be capable of generating between 40-60 mJ at 12V. This higher spark energy is enough to ignite the entire fuel air mixture at once creating a cleaner and more complete burn than with traditional distributors (e.g., operating conventional coils 1-8 (547).

A method 600 of determining an advance, consistent with some embodiments, is now described with reference to FIG. 6. It is noted that method 600 is simplified and is a portion of method 800 described relative to FIG. 8 below. In some embodiments method 600 is performed at process block 862 of FIG. 8.

In some embodiments method 600 may be performed by, for example, processing device 430 of FIG. 4 or ARM CPU 507 of FIG. 5 based on inputs to be described below. In some embodiments method 600 is performed on a per cylinder basis for individual cylinders (e.g., cylinder 3a of FIGS. 1 and 3) and is performed repeatedly in a repeating loop.

At process block 640 an advance (e.g., a provisional advance subject to adjustment) is computed based on a formula that includes at least RPM. Generally, the higher the RPM, the higher the advance. In some embodiments this calculation is made when engine timing system is in a "dynamic mode", discussed below relative to FIGS. 11 and 13.

Figure 3:
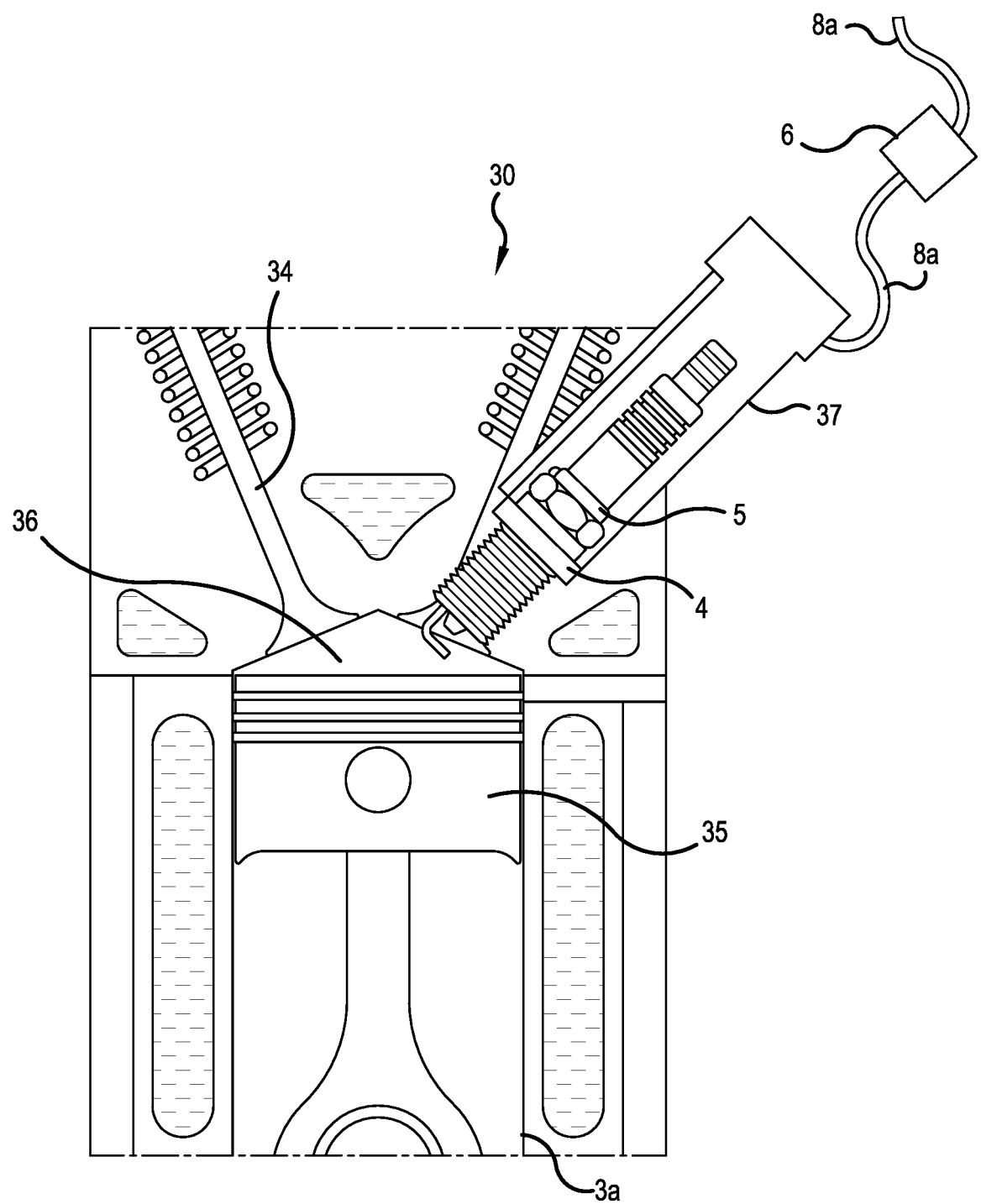
FIG. 3 is a cross-sectional side view of an exemplary ignition system, consistent with some embodiments, showing a sparkplug that is electronically coupled with ion sensing circuitry and with a temperature sensor.

Alternatively, if the engine is in ion detection mode, the amount of advance is not calculated but is instead set at "peak pressure position" (e.g., for cylinder 3a) based on input from, for example, ion sensing circuitry 6 of FIGS. 1 and 3 and the engine position sensor 10. For example, in dynamic mode, input may be repeatedly received by controller 9 from ion sensing circuitry 6 regarding cylinder pressure. Input may also be repeatedly received by controller 9 from engine position sensor 10 regarding engine position. Controller 9 may then compare the cylinder pressure inputs with the engine position inputs to determine the peak pressure position. A provisional advance is then set the position in the next cycle with the given cylinder will be at peak pressure position. This provisional cylinder is then subject to adjustment as depicted in process blocks 642-652 of FIG. 6 (adjustments depicted for formula-based calculation also applicable to ion sensing mode).

Moving to process block 642 a determination is made (e.g., by processing device 430 or ARM CPU 507 based on input from knock detector 21 or from ion sensing circuitry 6 of FIGS. 1 and 3) of whether a knock has occurred. If a knock has occurred, then at process block 644 the advance is reduced, in some embodiments by 2-5 degrees. In some embodiments, the precise amount by which the calculated advance is reduced is a setting entered by a user.

Moving to process block 646 a determination is made of whether cylinder temperatures are within settings. This determination is made for a particular cylinder (e.g., cylinder 3a of FIGS. 1 and 3) by processing device 430 or ARM CPU 507 based in input from, for example, temperature sensor 5 of FIGS. 1 and 3. In some embodiments temperature settings are set by a user with mobile device 50 of FIG. 1. In some embodiments the determination may include comparing a stored value (e.g., the settings stored in data 432 of FIG. 4) with actual temperature data from temperature sensor 5 of FIGS. 1 and 3 to determine if the temperature of a cylinder (e.g., cylinder 3*a*) is within the settings. If the temperature is not within the settings then at process block 648 the calculated advance is reduced, in some embodiments, by 1-2 degrees (e.g., by processing device 430 or by ARM CPU 507). In some embodiments, the precise amount by which the advance is reduced is a setting entered by a user, for example entered by a user through mobile device 50 of FIG. 1.

Moving to process block 650 a determination is made (e.g., by processing device 430 or ARM CPU 507 based on input from knock detector 21 or from ion sensing circuitry 6 of FIGS. 1 and 3) if there has been no knock (e.g., in a particular cylinder such as cylinder 3*a*) within 1000 ignitions in RPM range. An RPM range is a range of similar RPM's. For example an RPM range could be 1500 RPM's, plus or minus 75 RPM's. In some embodiments, the determination may be if there has been no knock within 1000 ignitions within a range of load on the engine as determined based on MAP sensor data. That is, MAP sensor data indicative of vehicle load may be used for the determination instead of RPM's.

The 1000 ignitions is an example and is variable and may be a setting entered by a user, for example entered by a user through mobile device 50 of FIG. 1. If a knock has not occurred in 1000 ignitions, then at process block 652 the advance is increased, in some embodiments by 0.25-1 degrees. In some embodiments, the precise amount by which the calculated advance is increased is a setting entered by a user, for example entered by a user through mobile device 50 of FIG. 1. Control then returns to process block 640 and method 600 repeats, continuing its performance in repeating loop.

Figure 7:
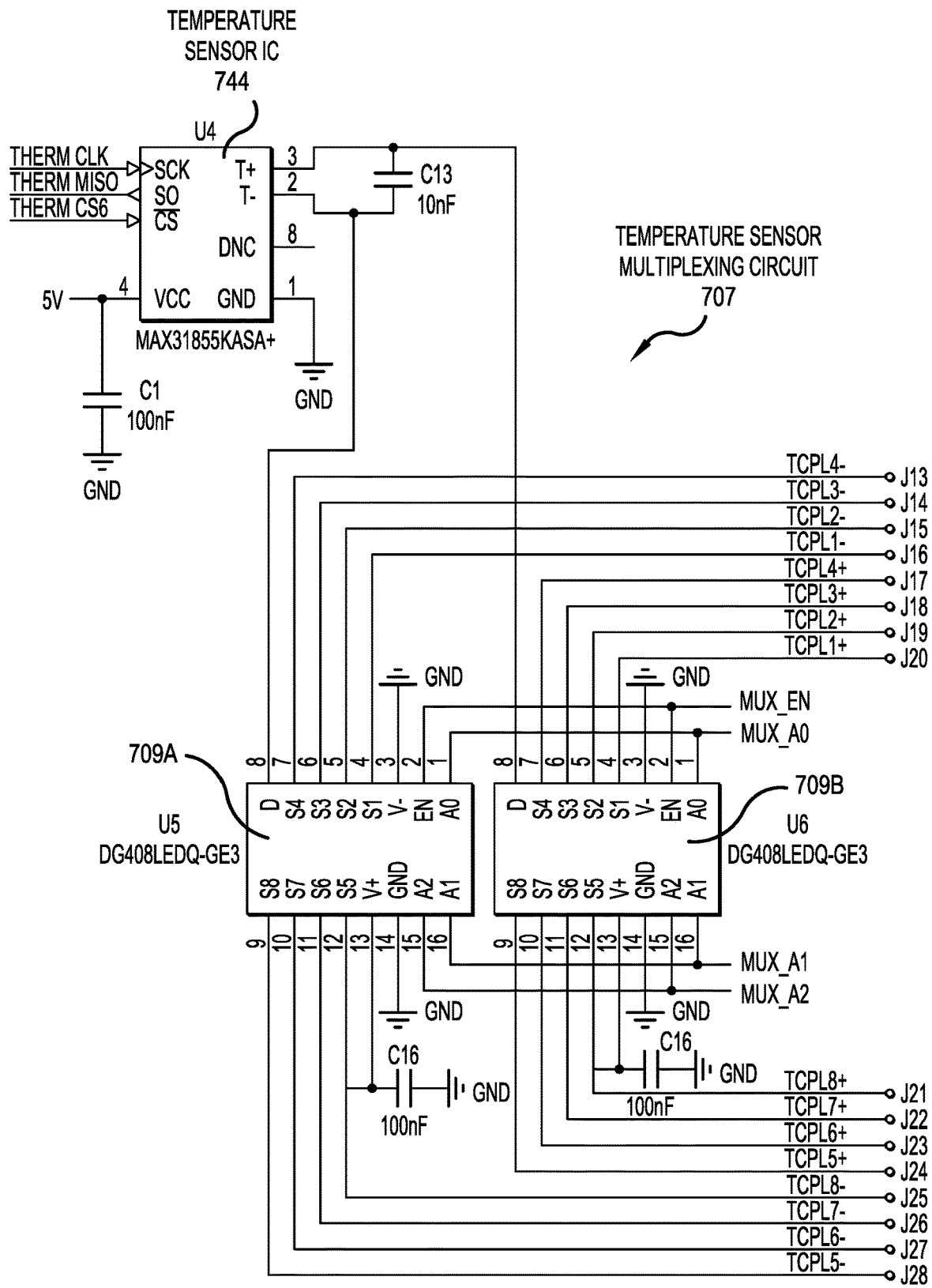
FIG. 7 is a schematic diagram illustrating electrical circuitry for sampling temperature information for a plurality of cylinders, consistent with some embodiments.

A Temperature Sensor Multiplexing Circuit 707 for sampling cylinder temperature readings, consistent with some embodiments, is now discussed relative to FIG. 7. Temperature Sensor Multiplexing Circuit 707 includes Temperature Sensor IC ("integrated circuit) 744 and two multiplexors 709A, 709B. This circuit 707 is wired to eight temperature sensor inputs (e.g. from temperature sensor 5 of FIG. 1). The values of the A0, A1, A2 pins of multiplexors 709A and 709B are changed to select a single one of the eight temperature sensor inputs for transmission to temperature sensor IC 744. The result is to sample temperature in a different one of eight cylinders (in the example of FIG. 7) perhaps one or two times each ignition cycle (e.g. each 720 degrees of crankshaft rotation). This reduces the traffic on the network and also the number of pins required in control circuitry (e.g. processing device 430 of FIG. 4 or ARM CPU 507 of FIG. 5). Because temperature changes relatively slowly, more frequent sampling of cylinder temperatures is not needed.

Figure 8:
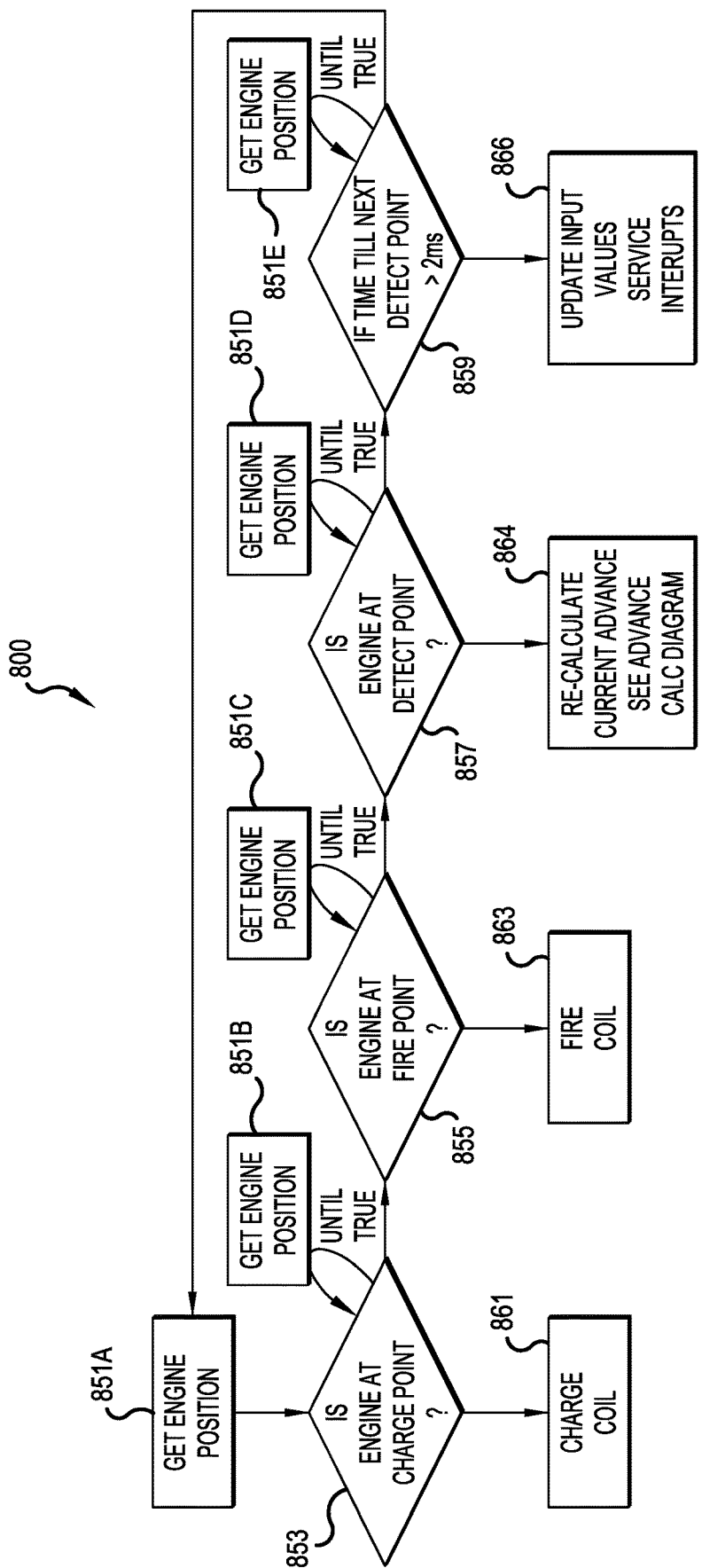
FIG. 8 is a flow chart of an exemplary process for controlling the calculation of a timing advance, the charging of an ignition coil, firing the ignition coil, and the receiving of inputs for the next calculation of a timing advance.

A method 800 of controlling an engine firing cycle, consistent with some embodiments, is now described with reference to FIG. 8. In some embodiments method 800 may be performed by, for example, processing device 430 of FIG. 4 or ARM CPU 507 of FIG. 5 based on inputs from engine position sensor 10. In some embodiments method 800 is performed on a per cylinder basis for individual cylinder (e.g., cylinder 3*a* of FIGS. 1 and 3) and is performed repeatedly in a repeating loop.

At process block 851A engine position is obtained (e.g., processing device 430 of FIG. 4 or ARM CPU 507 of FIG. 5 based on inputs from engine position sensor 10, perhaps via interface such as interface 451 of FIG. 4). Although in FIG. 8, process block 451A for obtaining engine position is shown only before process block 853, it is intended that engine position is repeatedly obtained including before, at, and after each of process blocks 853-866 (See process blocks 851B-851E).

The discussion of process blocks 853, 855, and 857 includes discussion of charge points, fire points, and Detect points, which are defined above, for purposes of this document. These definitions will be reviewed as they become relevant to the discussion below. However it is noted that all of these points are relative to the advance selected. Generally, the advance determines the fire point, the charge point is based on and precedes the fire point, and the detect point follows the fire point. For purposes of the discussion below, an engine is deemed to be at a point (e.g., a charge point, a fire point, a detect point) if a given cylinder is at such a point.

Moving to process 853, a determination is made if the engine is at a charge point. As indicated in FIG. 8, this determination may be made repeatedly in a loop (and engine position is repeatedly obtained from engine position sensor 10 at process block 851B) until it evaluates to true and an ignition coil 37 is charged at process block 861. Thus there the above determination may evaluate to false many times before it evaluates to true and an ignition coil is charged. In some embodiments, this determination is made by processing device 430 of FIG. 4 or ARM CPU 507 of FIG. 5 based on obtaining a new engine position from engine position sensor 10.

In some embodiments, determination of whether the engine is at a charge point is determined by comparing a stored value for previously computed charge point (e.g., computed in previous cycle and stored in data 432) versus the current engine position. The charge points are on a per cylinder basis, so each charge point is associated with a particular cylinder. At process block 861, if it is determined that the engine is a charge point, the ignition coil 37 for the appropriate cylinder is charged. It is noted that processing device 430 of FIG. 4 or ARM CPU 507 of FIG. 5 may repeatedly make the determination of whether the engine is at a charge point until the determination tests true.

Moving to process block 855, a determination is made of whether the engine (i.e., a cylinder of the engine) is at a fire point. As indicated in FIG. 8, this determination may be made repeatedly in a loop (and engine position is repeatedly obtained from engine position sensor 10 at process block 851C) until it evaluates to true and an ignition coil 37 is fired at process block 863. In some embodiments, this determination is made by processing device 430 of FIG. 4 or ARM CPU 507 of FIG. 5 by comparing a stored value for previously computed charge point (e.g., computed in previous cycle and stored in data 432) versus the current engine position obtained from engine position sensor 10. If the engine is at a fire point (i.e., if a specific cylinder of the engine is at a fire point), then at process block 863 the ignition coil 37 for the cylinder that is at the fire point is fired.

Moving forward to process block 857, a determination is made if the engine is at a detect point. In some embodiments, this determination of whether the engine is at a detect point is repeatedly made by processing device 430 of FIG. 4 or ARM CPU 507 of FIG. 5 based on obtaining a new engine position (in process block 851D) from engine position sensor 10 until the determination tests true.

Figure 6:
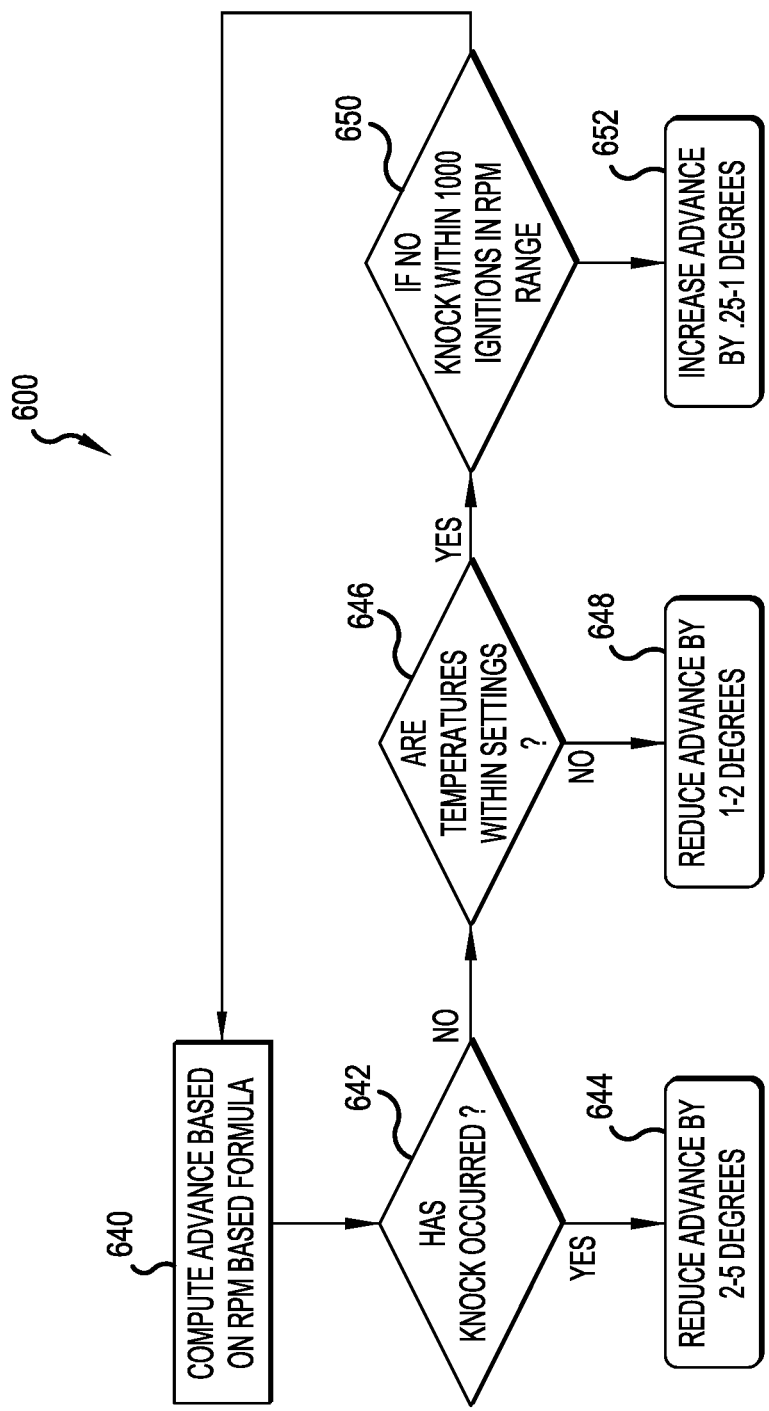
FIG. 6 is a flow chart of an exemplary process for computing a timing advance, consistent with some embodiments.

If the determination of whether the engine is at a detect point evaluates to true, then an advance is calculated at Process Block 864 (See FIG. 6). For discussion of the calculation and adjustment of an advance, please see discussion relative to FIG. 6 above.

Moving to process block 859, a determination is made if the time until the next Detect Point (in some embodiments a Fire Point) is greater than 2 milliseconds (ms). If this determination evaluates to true, then at Process Block 866, an update of values received from sensors (e.g. any or all of ion sensing circuitry 6, knock sensor 21, temperature sensor 5, MAP sensor 52, wide band oxygen sensor 53 or other sensor via service interrupts). In some embodiments, this determination of whether the time until the next Detect Point is greater than 2 ms is made by processing device 430 of FIG. 4 or ARM CPU 507 of FIG. 5 based on obtaining a new engine position from engine position sensor 10 (in process block 851E) and comparing to time until next Detect Point (e.g., could be stored in data 432). In some embodiments, process block is evaluated in a repeating loop (as shown), including obtaining engine position data at process block 851E until the determination if the time until the next Detect Point is greater than 2 milliseconds (ms) evaluates to False. When false, interrupts are suppressed and control moves to process block 851A and method 800 repeats.

Generally, except for the engine position sensor, sensors generate interrupts that need to be serviced to obtain sensor data. If it is determined that the time until the next Detect Point is greater than 2 ms, then at process block 866, servicing of sensor interrupts continues and sensor values (e.g., temperature, cylinder pressure, knocks, etc.) are updated. If it is determined instead that the time until the next Detect Point is equal two or less than 2 ms, then servicing of interrupts is halted (i.e., suspended or suppressed) until the next Detect Point.

Figure 10:
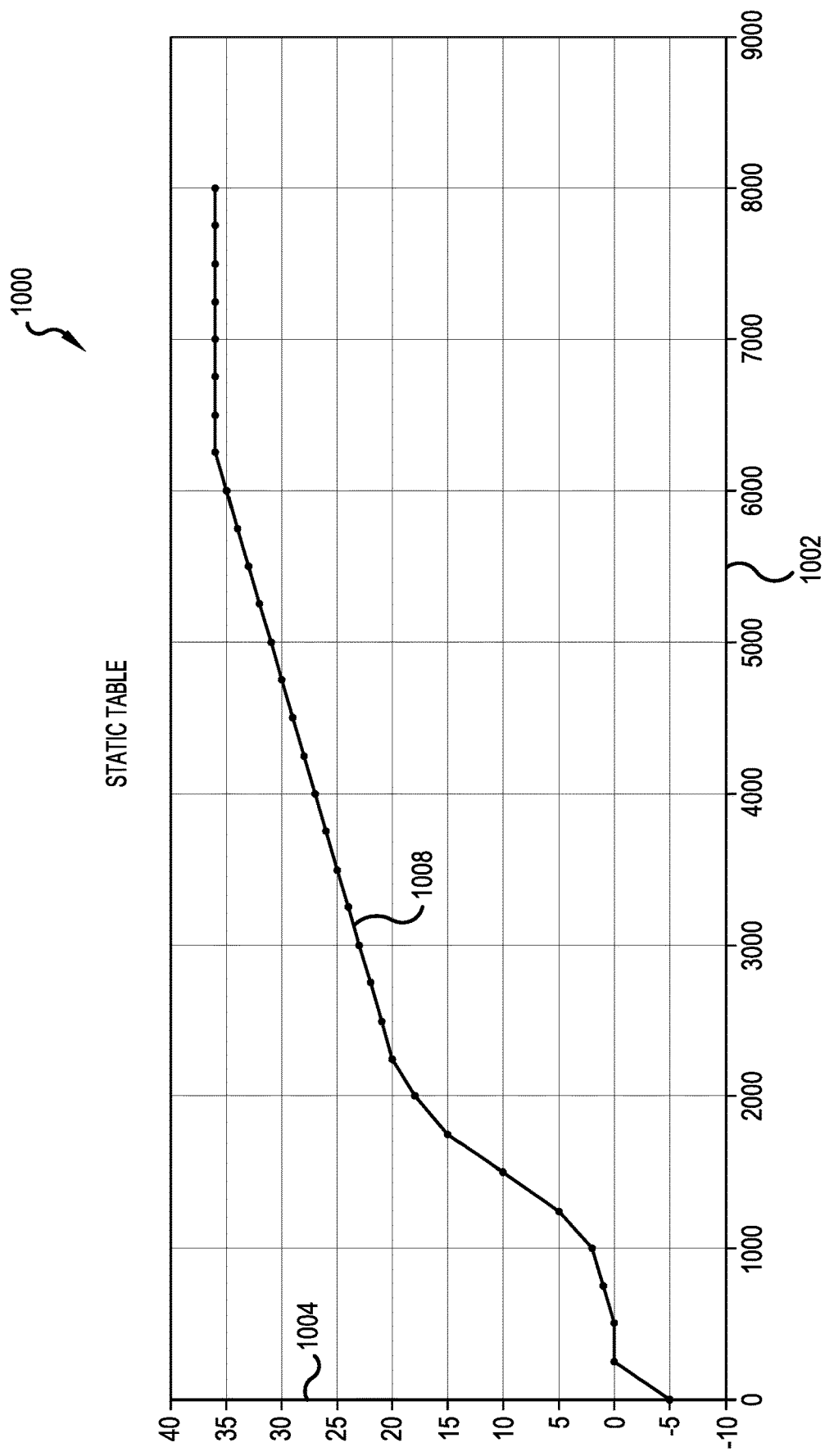
FIG. 10 is an exemplary static advance table with a static advance curve according to some embodiments.

Referencing FIG. 10, a chart illustrates a static table 1000, consistent with some embodiments, for controlling engine advance. Static Table 1000 includes a vertical axis 1004 with values for degrees of advance from 0 to 40 degrees. Static Table 1000 further includes horizontal axis 1002 with values for RPM from 0 to 9000 RPM Static curve 1008 plots the designated advance for the RPM's of the horizontal axis. Static curve 1008 is based on designated values. As can be seen in FIG. 10, between about 2225 RPM's and 6225 RPM's, static curve 1008 is a straight line. To determine advance with this Static Table, a function may receive current RPM as an input value and then determine the advance based on the static curve 1008. In some embodiments, if selected as a user setting, the advance derived from the static curve 1008 may be adjusted if there is a knock (e.g. detected by knock sensor 21). A Static Table 1000 may be provided by a manufacturer or input by a user as a user setting.

Figure 11:
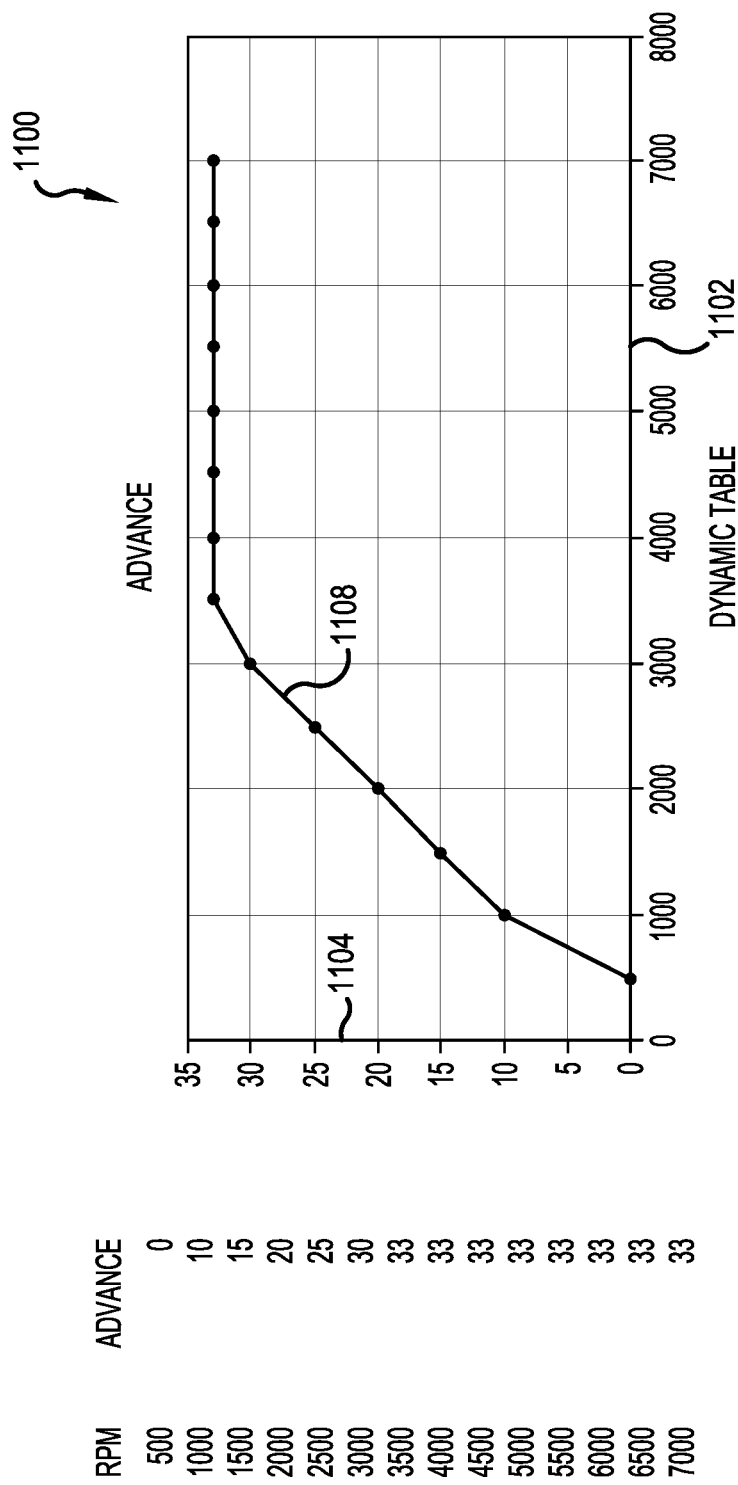
FIG. 11 is an exemplary dynamic advance table with a dynamically-calculated advance curve according to some embodiments.

Referencing FIG. 11, an exemplary chart illustrates a Dynamic Table 1100 consistent with some embodiments. Dynamic Table 1100 includes a vertical axis 1104 with values for degrees of advance from 0 to 35 degrees. Dynamic Table 1000 further includes horizontal axis 1102 with values for RPM from 0 to 8000 RPM. Dynamic curve 1108 plots the designated advance for the RPM's of the horizontal axis. Dynamic curve 1008 is based on computed advance values that are adjusted for sensor values as indicated in FIG. 6 and the corresponding discussion. Because the advance values for dynamic curve 1008 are adjusted for sensor values, the indicated advance values dynamically change over time.

Unlike the Static Table 1000, which uses a pre-determined set of points, Dynamic Table 1100 is initially created by calculating a timing slope (e.g., change in advance over change in RPM) based on inputs that may include one or more of (1) a starting RPM at which advance starts to increase, (2) an ending RPM at which the advance stops increasing, (3) an advance at the starting RPM, and (4) an Advance at the ending RPM. Once a slope is computed, a vertical intercept on the vertical axis may be computed. Finally, a provisional advance for a particular RPM may be computed based on the vertical intercept and the timing slope. This is a provisional advance because it is subject to adjustment as indicated in FIG. 6 and the corresponding discussion. Once some advances have been computed, further advances for particular RPM's may be computed via interpolation between previously determined points on dynamic curve 1108. Advance curve 1108 may be referred to as a calculated formula because it provides a formula for determining an advance once RPM is known and because it is calculated as discussed above.

Figure 12:
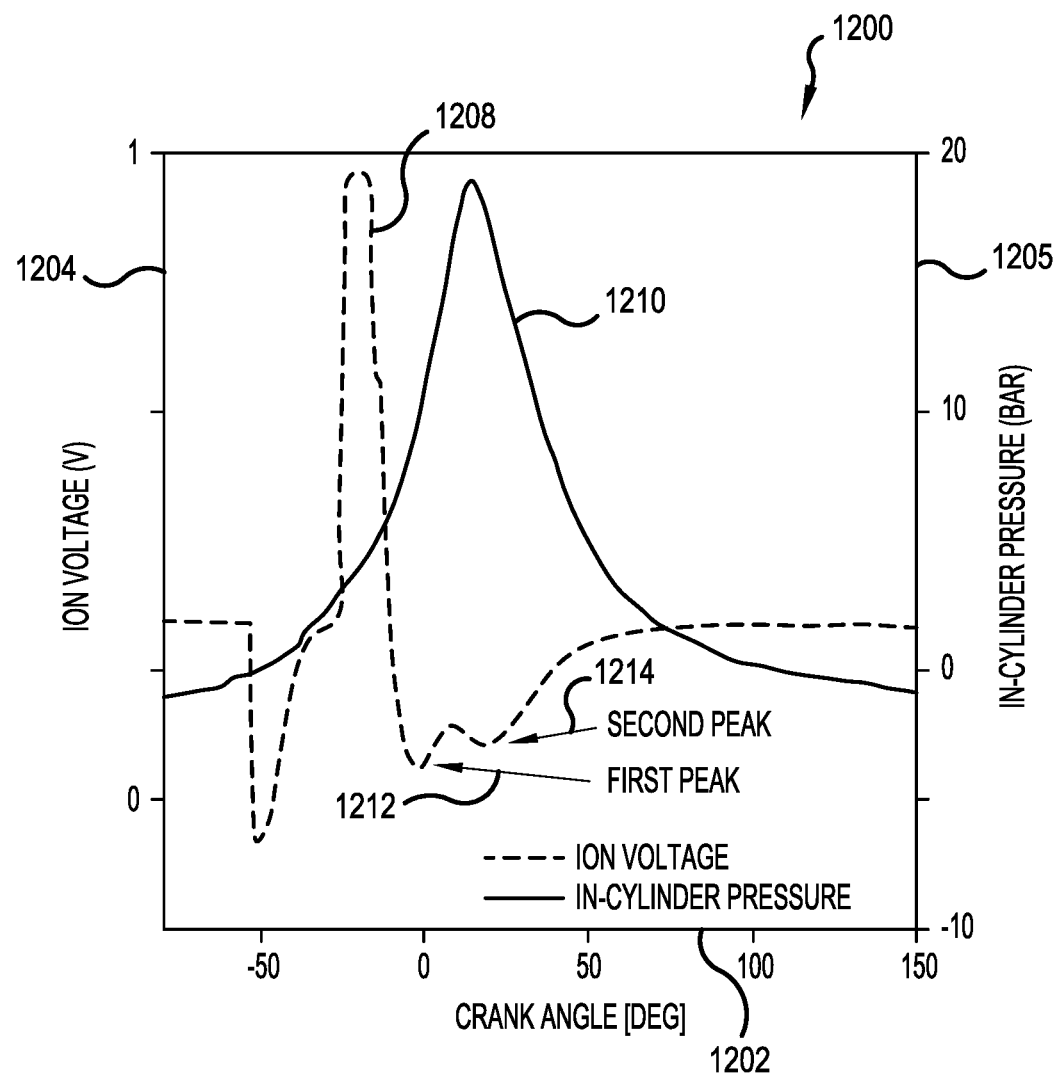
FIG. 12 is a graph illustrating values for computing peak pressure position based on ion sensing circuitry output.

Referencing FIG. 12, a graph 1200, consistent with some embodiments, is illustrated showing waveforms used to compute the peak pressure position in a given cylinder (e.g. cylinder 3a) with input from ion sensing circuitry 6. Table 1200 includes a vertical axis 1204 with input from ion sensing circuitry 6 in the form of ion voltage between 0 and 1. Table 1200 further includes a horizontal axis 1202 with values for crank angle (e.g. engine position in degrees). Ion voltage curve 1208 (in broken line) tracks these two axes to show how ion voltage changes relative to engine position. Table 1200 also includes a second vertical axes 1205 for in-cylinder pressure, which is inferred from the ion voltage of the first axis 1204. In-cylinder pressure curve 1210 (in solid line) tracks changes in in-cylinder pressure relative to engine position.

First Peak 1212 and Second Peak 1214 represent disruptions and/or disturbances in the data represented by Ion voltage curve 1208. These two points and similar disturbances and/or disruptions are used to determine the peak pressure position. Thus, the peak pressure position is determined. No table similar to Static Table 1000 or Dynamic Table 1100 is used. A provisional advance is determined at the peak pressure position and then it is subject to adjustment as indicated in FIG. 6 and corresponding description.

An exemplary user interface 1300 is now described with reference to FIGS. 13-15. This user interface 1300 could be presented on a mobile device, such as mobile device 50 of FIG. 1. In other embodiments, user interface 1300 could be presented on a desktop computer, an automotive computer (e.g., on a dashboard screen or a screen of a diagnostic device), an Internet-of-things (IoT) device, or on another computational device or environment.

In some embodiments user interface 1300 may be presented on a touchscreen. In the same or other embodiments user interface 1300 may be operable with, a user touch, a mouse, a pointer or stylus, or through other well known selection means.

One skilled in the art will recognize that the principles described can be used to create a wide array of user interfaces with different pages, names for fields, organizations, etc. All are within the scope of this disclosure. The user interface 1300 is merely exemplary for disclosing the relevant principles associated with some embodiments.

Figure 13:
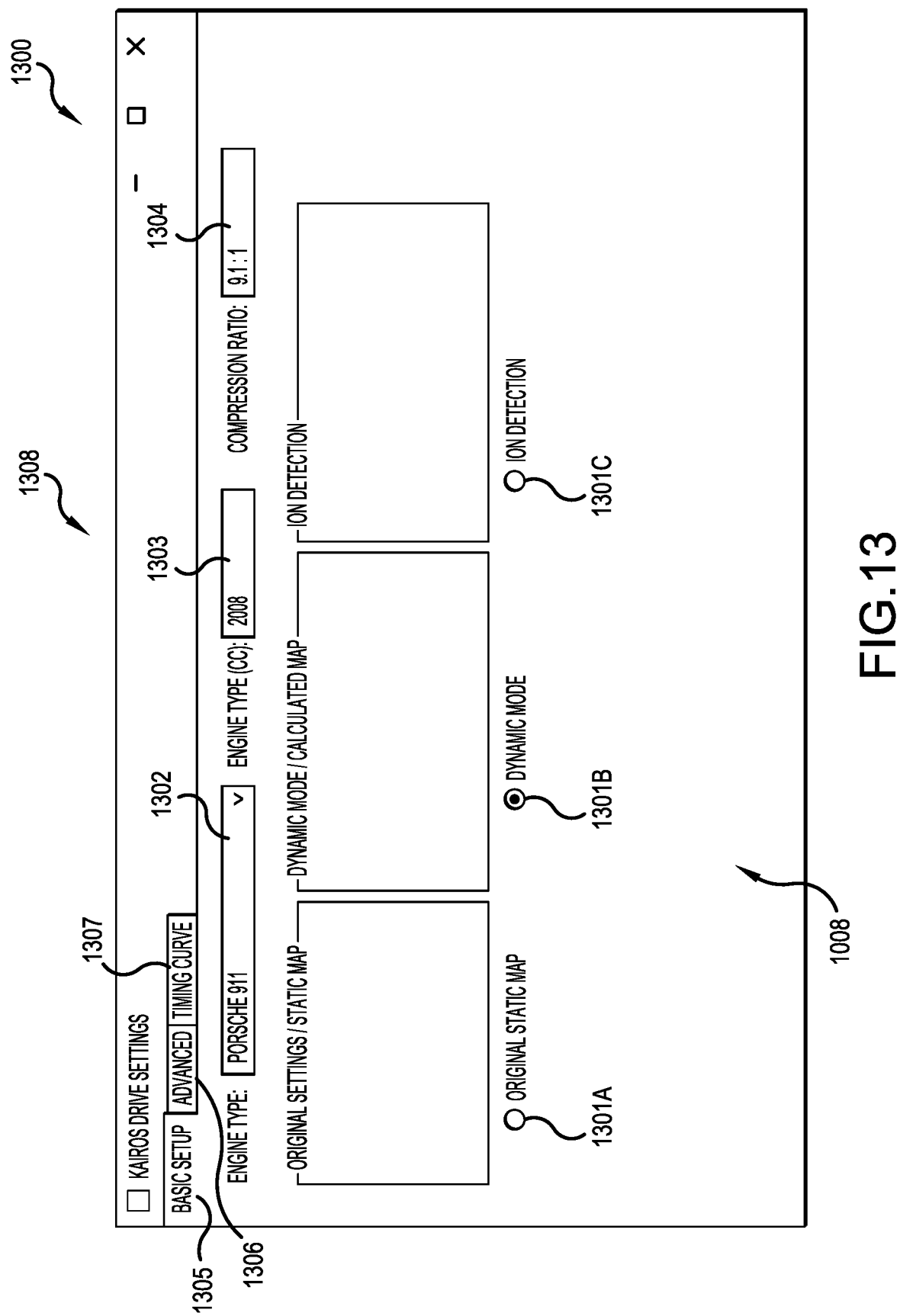
FIG. 13 is a two-dimensional diagram of a "basic setup" page of user interface, consistent with some embodiments.

Referencing FIG. 13, consistent with some embodiments, user interface 1300 includes tabs 1305 for selecting a basic setup page, 1306 for selecting an advanced page, and 1307 for selecting a timing curve page. In FIG. 13, tab 1305 for basic setup is selected and basic setup page 1308 is displayed. Basic setup page 1308 of user interface 1300 includes selection features (e.g., radio dials) 1301A for a static mode (e.g., displayed as "original static map" and using a static table such as Static Table 1000), 1301B for a dynamic mode (e.g., using a dynamic table such as Dynamic Table 1100"), and 1301C for an ion detection mode (see, FIG. 12 and discussion). These modes are:

a. Static mode: Engine starts with advance provided by factory settings and/or stock timing configurations. A static table (e.g. static table 1000 of FIG. 10) is used that sets the advance based on RPM and (if user so selects) a knock sensor. That is, if a knock sensor detects a knock, the statically set advance is adjusted by 2-5 degrees. But in some embodiments there are no further possible adjustments based on other factors, such as cylinder pressure or cylinder temperature.

b. Dynamic mode: This mode sets advance based on a dynamic curve that uses RPM as an input (See, e.g. dynamic curve 1108 of FIG. 11 and discussion). Dynamic curve 1108 is dynamic and is adjusted over time based on sensor readings. For example, the map may be adjusted based on experience with knocks with lack of knocks. The dynamic curve 1108 is used to generate a provisional advance (See discussion relative to FIG. 6) which is adjusted based on inputs such as one or more of cylinder temperature, pressure, or the occurrence or absence of knocks.

c. Ion detection mode: This mode uses ion detection (e.g., with ion detecting circuitry 6) to calculate peak cylinder pressure (See, e.g., FIG. 12 and discussion). Peak pressure position is used to generate a provisional advance that may be adjusted (See discussion relative to FIG. 6—Process blocks 642-652 which may be applicable to ion detection mode as well as dynamic mode).

Basic setup page 1308 further includes an engine type display 1302, an engine type (cc) display 1303, and a compression ratio display 1304.

Figure 14:
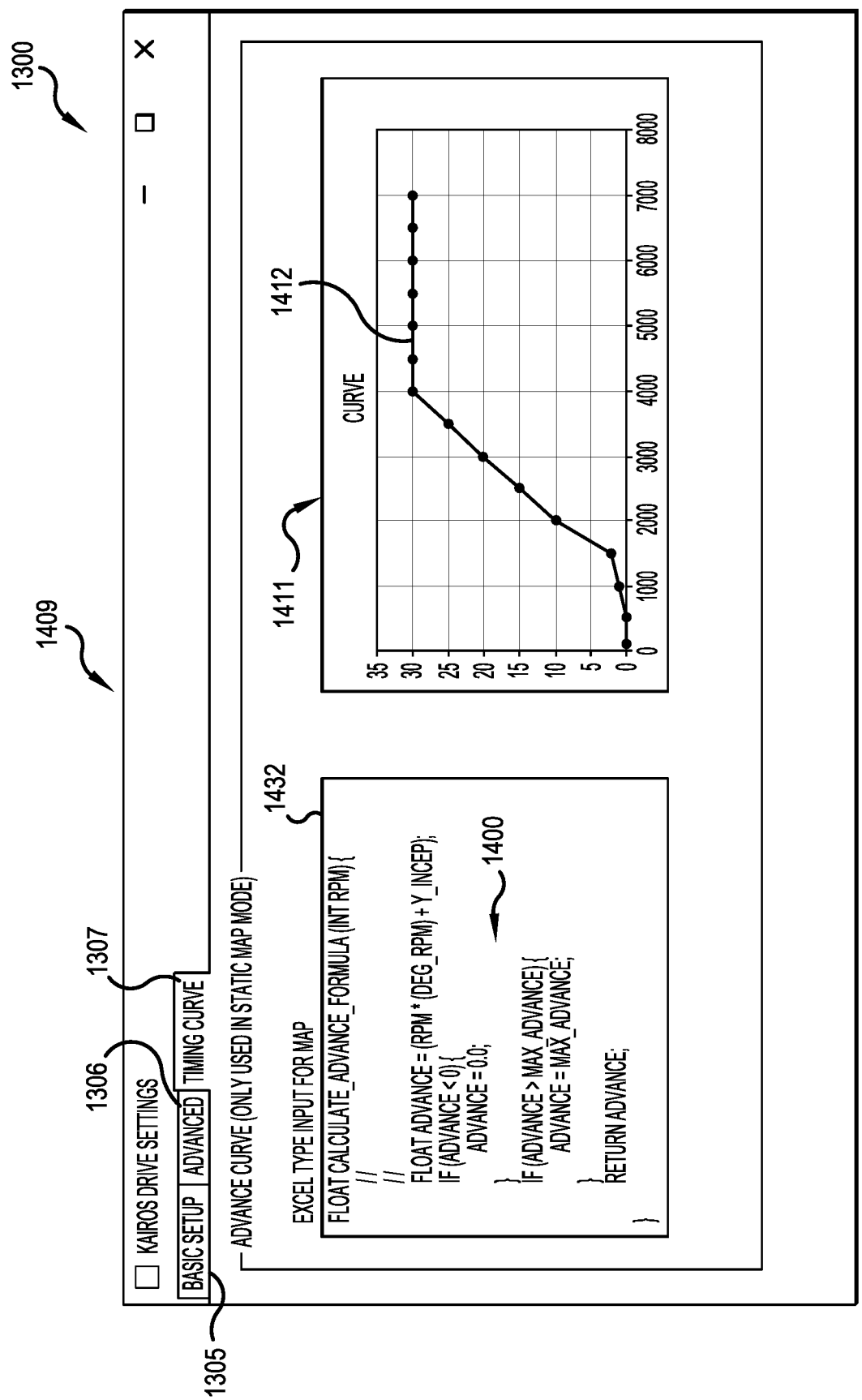
FIG. 14 is a two dimensional diagram of a "timing curve" page of the user interface of FIG. 13, consistent with some embodiments.

Referencing FIG. 14, a timing curve page 1409 of user interface 1300 is illustrated, consistent with some embodiments. Page 1409 includes tabs 1305, 1306, and 1307 discussed above with reference to FIG. 13. Page 1409 further includes at least an input window 1432 for entering code 1400 (e.g., a formula for generating a dynamic curve). Page 1409 further includes window 1411 for displaying advance curve 1412.

Figure 15:
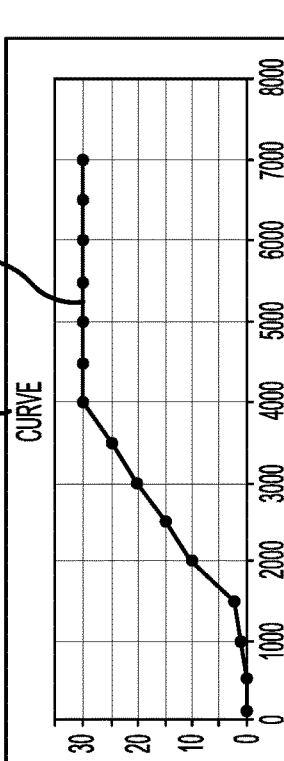
FIG. 15 is a two-dimensional diagram of an "advanced" page of the user interface of FIG. 13.

Referencing FIG. 15, A advanced page 1510 of user interface 1300, consistent with some embodiments, is illustrated. Page 1510 includes a window 1511 with entry and display for a plurality of settings:

a. Base Timing 1513: For setting TDC (in this case set to zero)
b. Maximum Advance 1514: Allows user to set a maximum advance
c. RPM Max Advance Reached 1515: Allows user to indicate an RPM at which the maximum advance 1514 is reached
d. RPM Advance Starts 1516: Allows user to specify an RPM at which advance increases from zero
e. Starting Advance 1517: Allows user to specify the amount of the advance when it starts A window 1411 for displaying advance curve 1412 (discussed with reference to FIG. 14) is included in Page 1510. But window 1432 for displaying code 1400 (formula—described with reference to FIG. 14) is not displayed unless dynamic mode or ion detection mode is detected.

Page 1510 includes options window 1536 which includes a variety options (e.g., as check boxes 1518-1524) for user entry:

a. Checkbox 1518 for indicating whether to use MAP sensor for load detection
b. Checkbox 1519 for indicating whether to detect/read engine coolant temperature
c. Checkbox 1520 for indicating whether to detect/read engine oil temperature
d. Check box 1521 for indicating whether to use IGT type coils
e. Checkbox for indicating spark output high power (ground switched)
f. Checkbox 1524 for indicating whether to enable immobilizer which immobilizes/blocks ignition if mobile device 50 (associated with automobile 1) is not detected in proximity Options window 1536 further includes data entry boxes and virtual buttons for inputting user settings:

a. 1525: a virtual button to select "Zero Sensor as TDC"
b. RPM Limit 1526: Allows user to set an RPM limit
c. COIL dwell time (ms) 1527: Allows user to specify coil dwell time
d. Distributor rotation direction 1528: Allows user to specify a clockwise or counterclockwise rotation of distributor
e. Firing order 1529: Allows user to specify a firing order for the cylinders of vehicle
f. 1530: a virtual button to select "pair phone"

Figure 16:
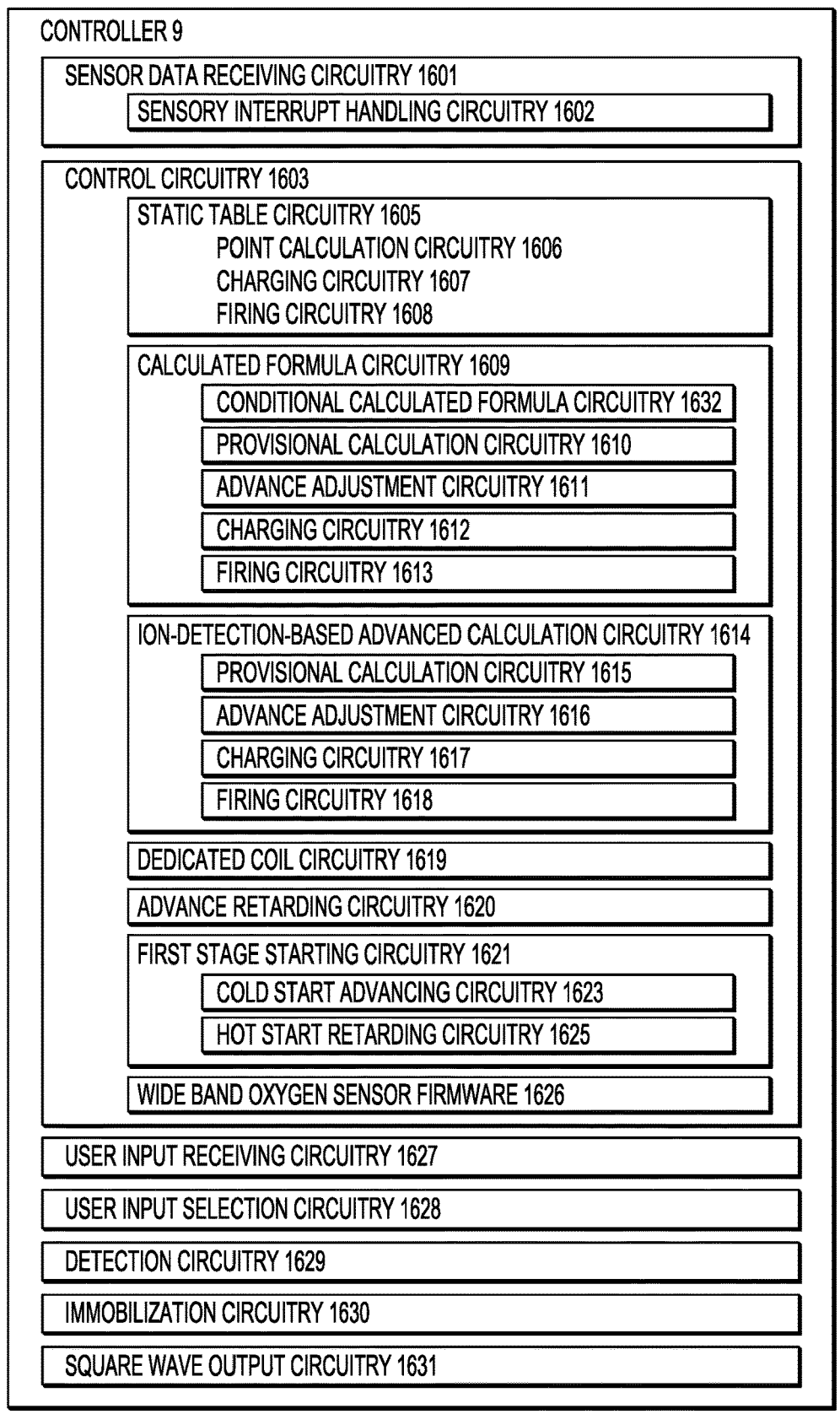
FIG. 16 is a functional diagram of a controller, consistent with some embodiments, showing a functional illustration of various circuitries.

Exemplary controller 9 is now described functionally, consistent with some embodiments, with reference to FIG. 16. Specific hardware that may, in some embodiments, be used to implement the circuitries discussed below, as well as their function, is described in more detail with respect to method flow charts 17-24 below. Although some circuitries are depicted as being part of or located within another circuitry, in other embodiments such circuitries may be standalone circuitries. In addition, the below described may in some embodiments be separate from each other. And in some embodiments, they may overlap either totally or in part with others of the circuitries.

Referencing FIG. 16, consistent with some embodiments, controller 9 includes one or more of sensor data receiving circuitry 1601, control circuitry 1603, user input receiving circuitry 1627, user input receiving circuitry 1628, detection circuitry 1629, immobilization circuitry 1630, and square wave output circuitry 1631.

Consistent with some embodiments, sensor data receiving circuitry 1601 optionally includes sensory interrupt handling circuitry 1602. Additionally, in some embodiments, control circuitry optionally includes one or more of static table circuitry 1605, calculated formula circuitry 1609, ion-detection-based advance calculation circuitry 1614, dedicated coil circuitry 1619, advance retarding circuitry 1620, first stage starting circuitry 1621, or wide-oxygen sensor firmware 1626.

Consistent with some embodiments, static table circuitry 1605 optionally includes one or more of point calculation circuitry 1606, charging circuitry 1607, or firing circuitry 1608. Consistent with some embodiments calculated formula circuitry 1609 optionally includes one or more of conditional calculated formula circuitry 1632, provisional calculation circuitry 1610, advance adjustment circuitry 1611, charging circuitry 1612, or firing circuitry 1613. Consistent with some embodiments ion-detection-based advance calculation circuitry 1614 optionally includes one or more of provisional calculation circuitry 1615, advance adjustment circuitry 1616, charging circuitry 1617, or firing circuitry 1618. Consistent with some embodiments first stage starting circuitry 1621 optionally includes one or more of cold start advancing circuitry 1623 or hot start retarding circuitry 1625.

Figure 25:
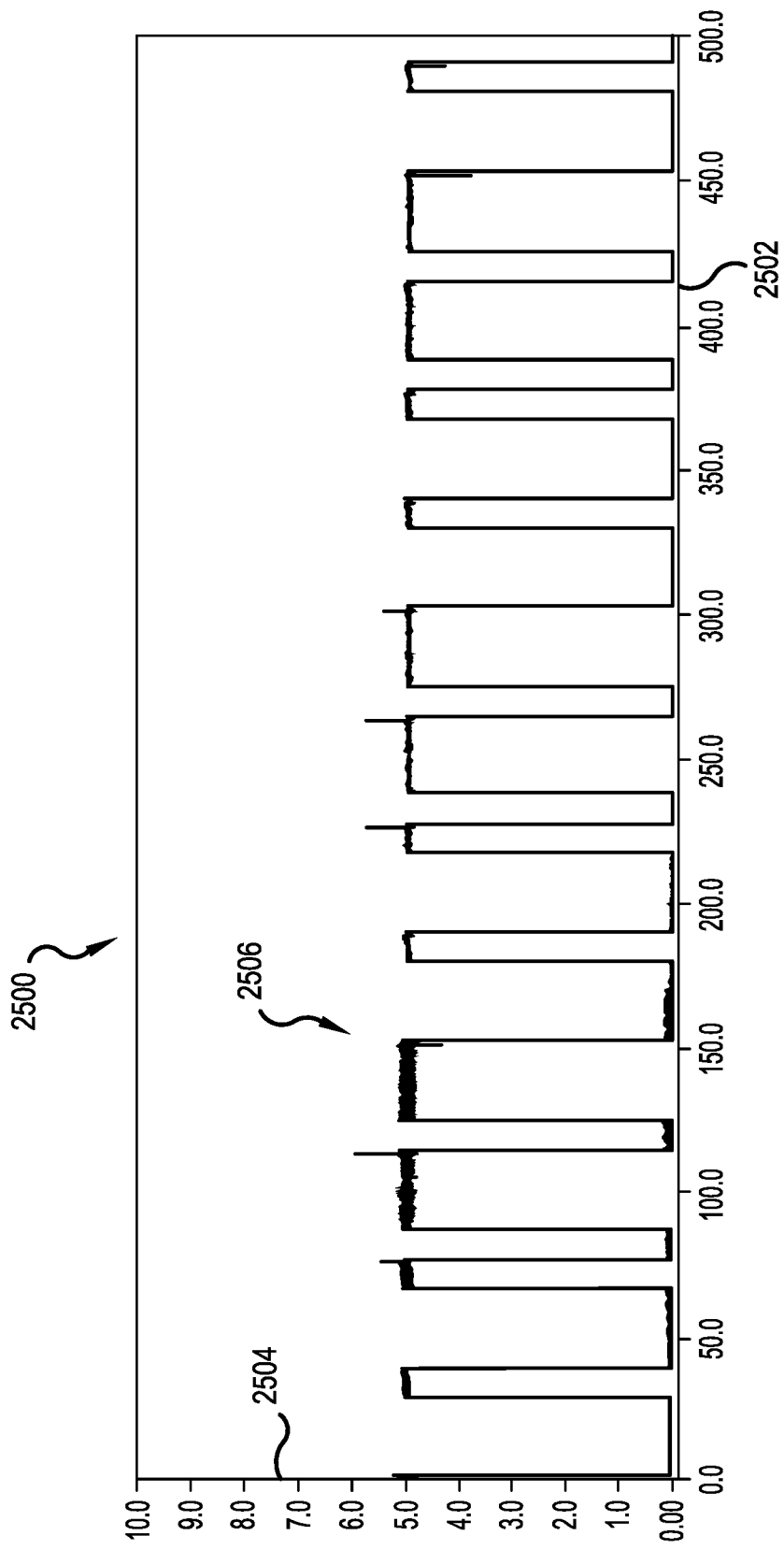
FIG. 25 is a drawing of a chart, consistent with some embodiments, showing a waveform associated with output of a camshaft angle sensor, consistent with some embodiments.

Many vehicles were manufactured in 1990's through mid 2000's with basic electronic fuel injection ("EFI") systems that use a conventional distributor. In these legacy EFI systems the conventional distributor acts as at least one of a cranks angle sensor or a camshaft angle sensor that produces a vehicle-specific square wave that reflects the input of hall-effect sensors associated with the distributor. This hall-effect sensor input is used by a vehicle's engine control unit ("ECU") for a variety of purposes and by the legacy EFI system to determine the engine position. These legacy EFI systems can benefit from the systems and methods described herein but may require some additional output traditionally produced by the distributor hall-effect sensors. Embodiments of the electronic timing systems described herein can replace conventional distributors and therefore can produce at least one of camshaft or crankshaft position to replace the hall-effect sensor data associated with conventional distributors. In some embodiments, two types of output signals may be produced to assist these legacy EFI systems. First, as shown in FIG. 25 a 5 volt square wave 2506 can be output that represents camshaft position. Second, as shown below in FIG. 26 a 5 volt square wave can be output that represents camshaft positions. One or both of these square waves will allow an EFI system to function with embodiments described herein. Embodiments described herein may therefore be installed in vehicles with legacy EFI's with additional output provided as discussed above.

Referencing FIG. 25, a graph 2500 is described that includes a waveform 2506 associated with output of a camshaft angle sensor, consistent with some embodiments. Graph 2500 includes a horizontal axis 2502 indicating replicated hall sensor output of a camshaft. And a vertical axis 2504 indicates voltage from hall effect sensors (e.g. 0 for "off" and perhaps 3, 5, or 12 volts indicating "on" 5 volts for vertical axis is illustrated).

Figure 26:
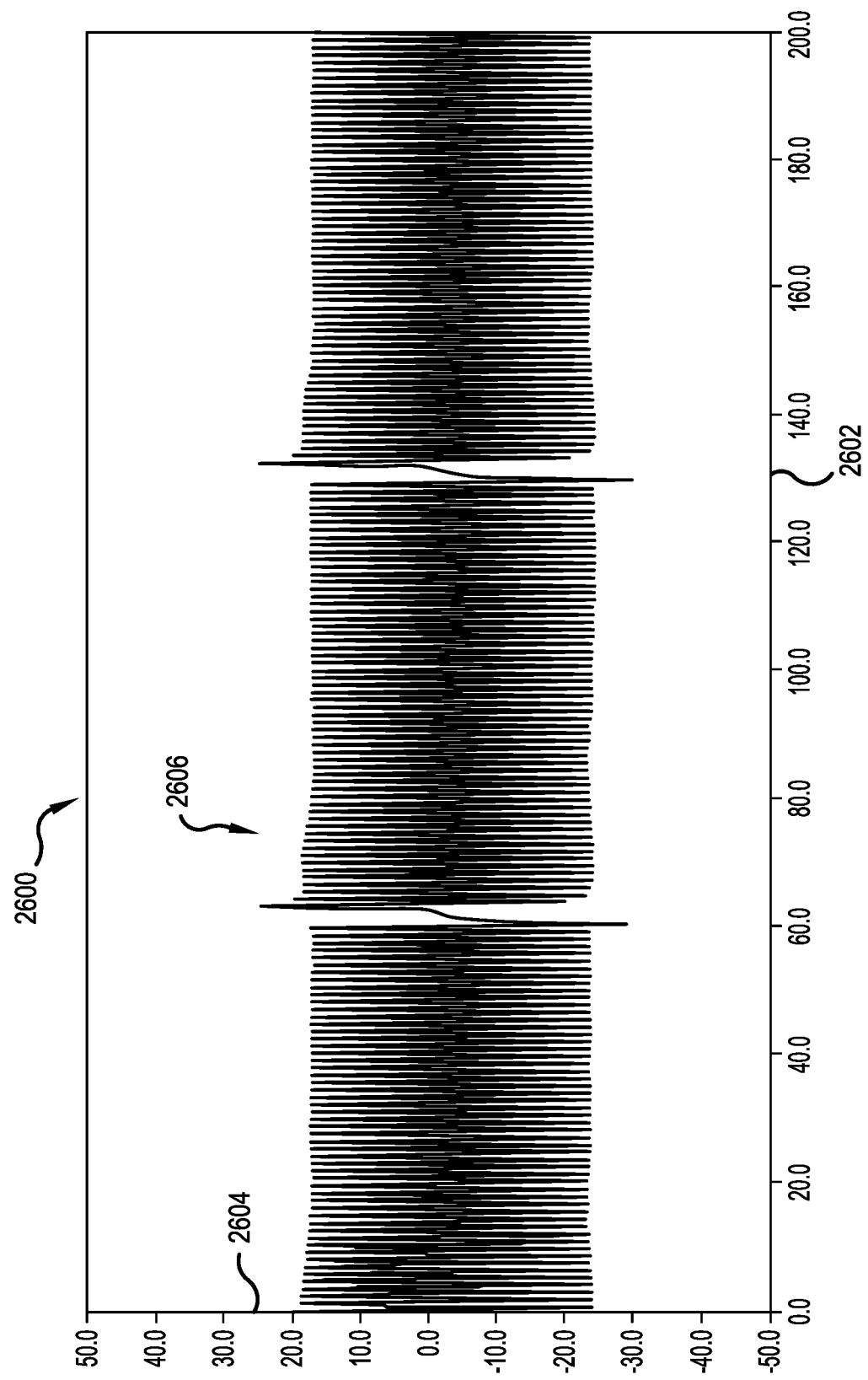
FIG. 26 is a drawing of a chart, consistent with some embodiments, showing a waveform associated with output of a crankshaft position sensor, consistent with some embodiments.

Referencing FIG. 26, a graph 2600 is described that includes a waveform 2606 associated with output of a cranks angle sensor, consistent with some embodiments. Graph 2600 includes a horizontal axis 2602 indicating replicated hall sensor output of a crankshaft and a vertical axis 2604 indicating voltage from hall effect sensors (e.g. 0 for "off" and perhaps 3, 5, or 12 volts indicating "on"). The discussion above relative to FIG. 25 is applicable to FIG. 26 is one substitutes "crankshaft" for "camshaft."

Figure 28:
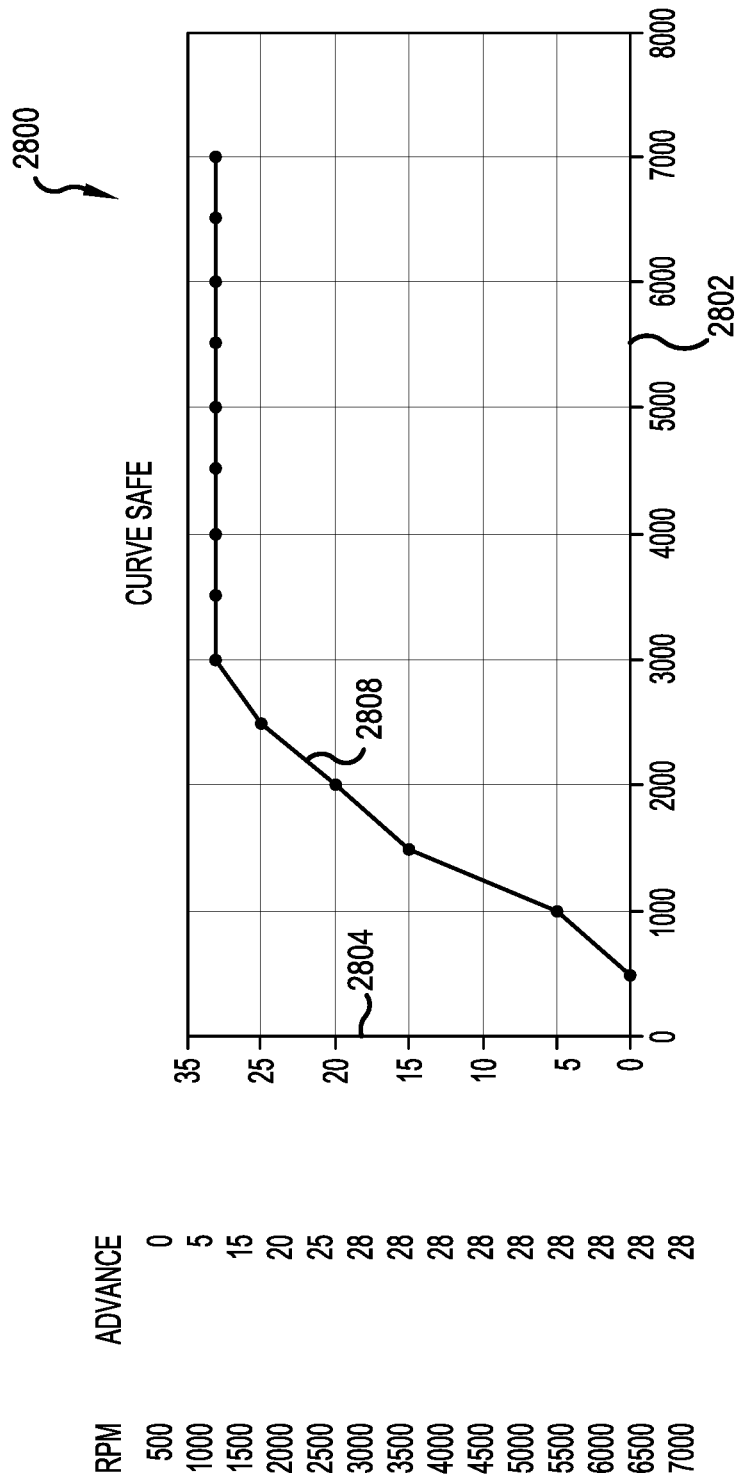
FIG. 28 is an exemplary dynamic advance table with a dynamically-computed safe curve, consistent with some embodiments.
Figure 29:
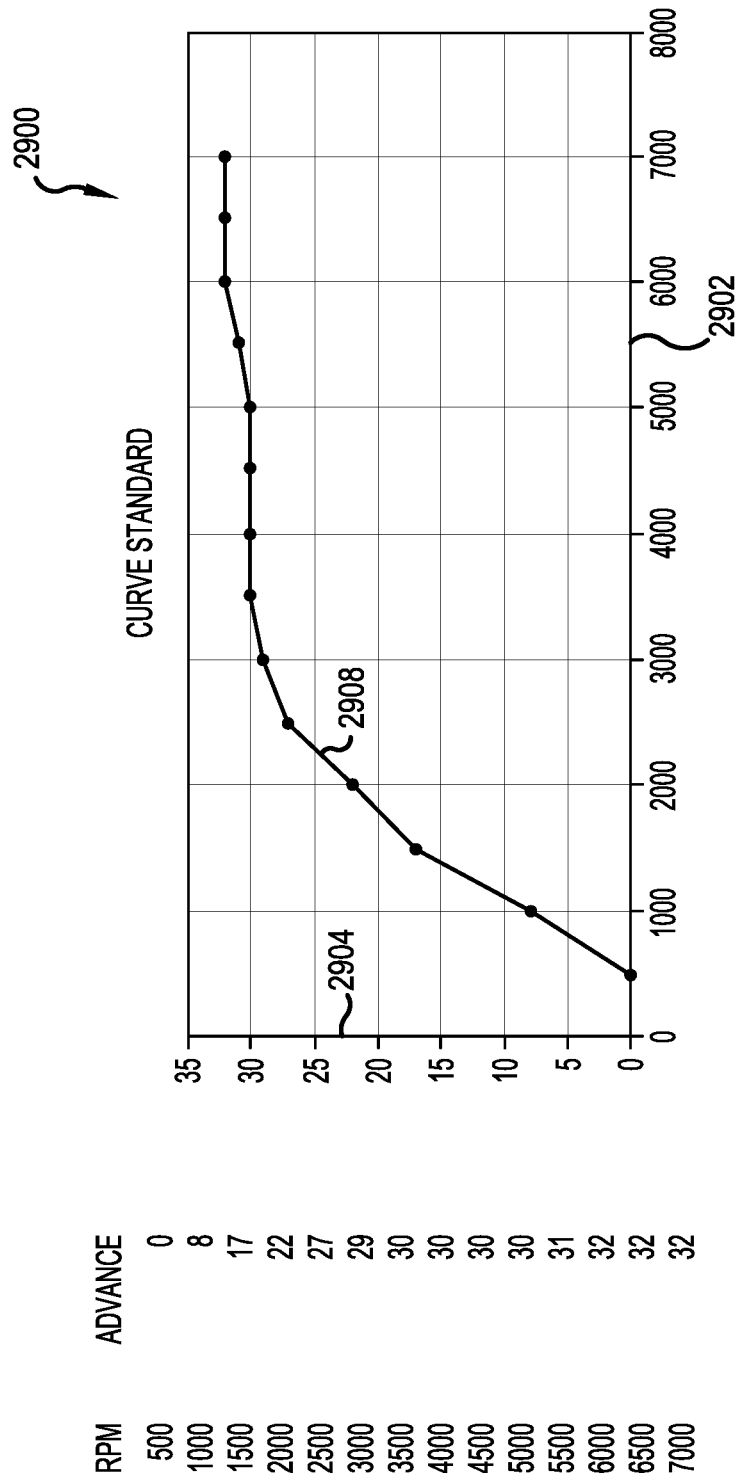
FIG. 29 is an exemplary dynamic advance table with a dynamically-computed standard curve, consistent with some embodiments.
Figure 30:
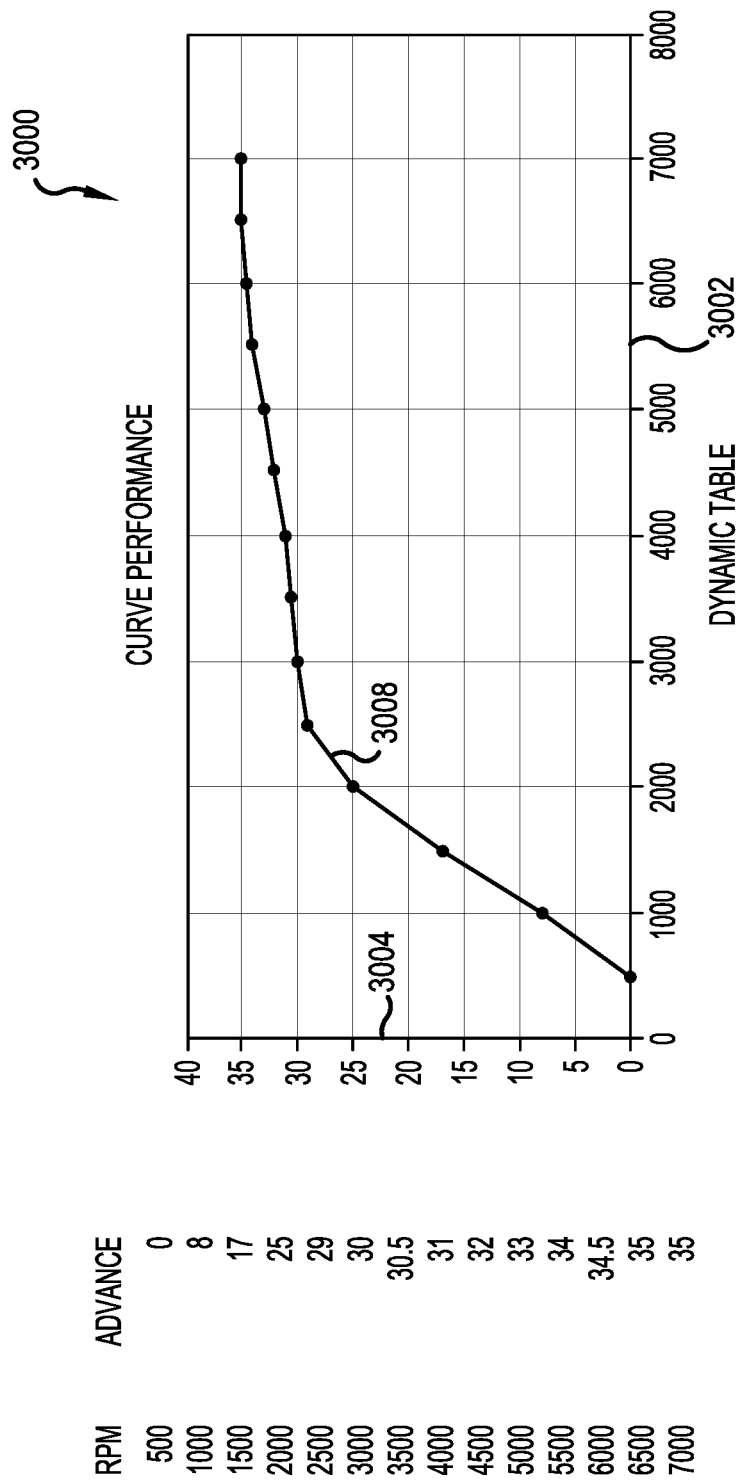
FIG. 30 is an exemplary dynamic advance table with a dynamically-computed performance curve, consistent with some embodiments.

FIGS. 28-30 are dynamic tables illustrating dynamic curves that result from user safe, standard, and/or performance settings. FIG. 28 depicts Curve Safe Table 2800 with RPM values on horizontal axis 2802, advance values on vertical axis 2804, and safe advance curve 2808 showing the change in advance as RPM changes. FIG. 29 depicts Curve Standard Table 2900 with RPM values on horizontal axis 2902, advance values on vertical axis 2904, and standard advance curve 2908. FIG. 30 depicts Curve Performance Table 3000 with RPM values on horizontal axis 3002, advance values on vertical axis 3004, and performance advance curve 3008. Comparing the above curves, safe advance curve 2808 goes from an advance of zero at 500 RPM to an advance of 20 at 2000 RPM, an increase of 20 degrees of advance as RPM changes from 500 to 2000. Standard advance curve 2908 goes from an advance of zero at 500 RPM to an advance of 25 at 2000 RPM, an increase of 25 degrees of advance as RPM changes from 500 to 2000. Finally, performance advance curve 3008 goes from an advance of zero at 500 RPM to an advance of 30 at 2000 RPM, an increase of 30 degrees of advance as RPM changes from 500 to 2000. In addition, safe advance curve 2808 has a maximum advance of 28 whereas standard advance curve 2908 has a maximum advance of 32 and performance advance curve 3008 has a maximum advance of 35. Thus, users are permitted to specify a level of performance and risk they will tolerate, perhaps based on engine type and configuration.

FIGS. 17-24 include various examples of operational flows. Discussions and explanations of these flow charts incorporate previous discussion relative to FIGS. 1-16 and 25-30. The discussions include a discussion of one or more circuitries from FIG. 16 and components from FIGS. 4 and 5 that may be used to implement the operations discussed. However, the described operational flows may be executed and implemented with a variety of different circuitries, components, and environments.

In addition, although the various operational flows are presented in illustrated sequences, it should be understood that in various embodiments the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. For additional clarity, some optional operations may be placed in broken line boxes.

Figure 17:
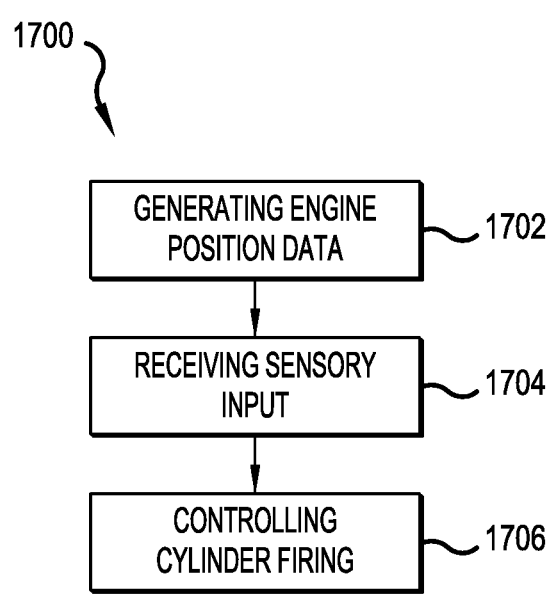
FIG. 17 is a flow chart illustrating an exemplary method, consistent with some embodiments.

FIG. 17 illustrates a method 1700, consistent with some embodiments, that is performed with an electronic engine timing system. Method 1700 includes at least operations 1702, 1704, and 1706.

Consistent with some embodiments operation 1702 related to generating engine position data includes at generating engine position data at least in part by calculating distributor shaft position with an engine position sensor that is configured to output electrical signals indicative of engine position in an engine firing cycle of an engine both when the engine is running and when the engine is not running and that includes at least: (a) a diametric magnet configured to be rotated by at least one of a rotatable distributor shaft or cam shaft; and (b) two or more hall effect sensors configured and positioned to sense diametric magnet position. In some embodiments, operation 1702 may be performed with at least an engine position sensor 10 that is configured to output electrical signals indicative of engine position in an engine firing cycle of an engine 2, the engine position sensor 10 including at least: (a) a diametric magnet 19 configured to be rotated by at least one of a rotatable distributor shaft 22 or cam shaft; and (b) two or more hall effect sensors (e.g., two or more of hall-effect sensors 20A-20D) configured and positioned to sense diametric magnet position; and the engine position sensor 10 being configured at least via the diametric magnet 19 and the two or more hall effect sensors to output the electrical signals indicative of engine position both when the engine is running and when the engine is not running.

Consistent with some embodiments operation 1704 includes at least receiving sensory input that includes at least the generated engine position data. In some embodiments operation 1704 may be performed with at least sensor data receiving circuitry 1601 (e.g., processing device 430 via interface for engine position sensor 451 or other sensor interface and/or ARM CPU 507 accessing engine position sensor 10) configured for receiving sensory input, including at least input from the engine position sensor 10.

Consistent with some embodiments operation 1706 includes at least controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor. In some embodiments, operation 1706 may be performed with at least control circuitry 1603 (e.g., one or more components of controller 9 or 509, including one or more of processing device 430 or ARM CPU 507 accessing engine position data via interface for engine position sensor 451 or other sensory interfaces) configured to control firing of one or more cylinders (e.g., cylinders 3a-3d) of the engine 2, the control circuitry configured to control the firing at least in part by calculating (e.g., with static mode, dynamic mode, or ion detection mode) one or more timing advance positions for one or more cylinders of the engine and by causing the one or more cylinders to fire according to the one or more calculated timing advance positions, the control circuitry further configured to calculate the one or more timing advance positions for the one or more cylinders separately (e.g., cylinder 3a separately from any of cylinders 3b-3d) from one another on a per cylinder basis based at least in part on input from the engine position sensor 10.

Figure 18:
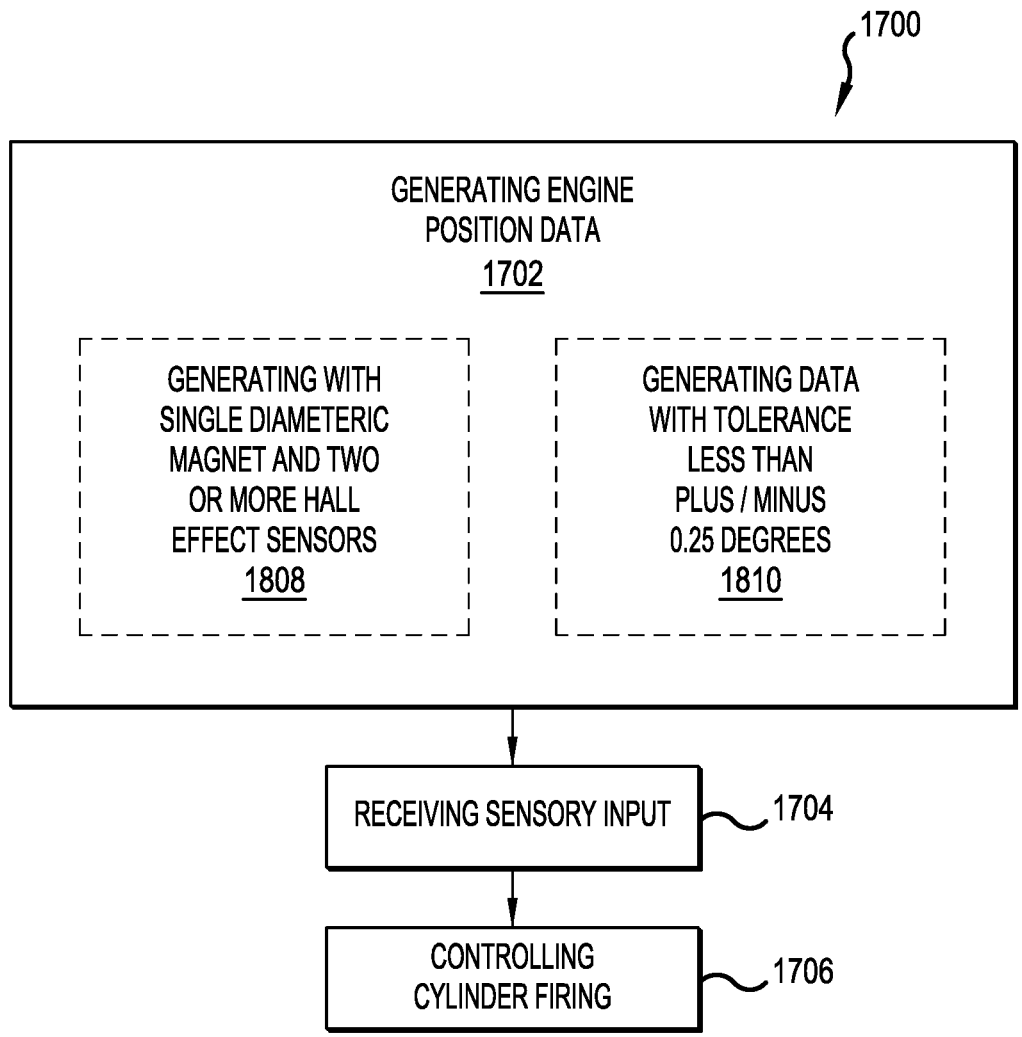
FIG. 18 is a flow chart illustrating the exemplary method of FIG. 17, with additional optional operations, consistent with some embodiments.

Referencing FIG. 18, in some embodiments, Operation 1702 may include one or more of optional operations 1808 or 1810.

Consistent with some embodiments operation 1808 includes at least generating the engine position data at least in part with only a single engine position sensor, a single engine position sensor that includes only a single diametric magnet and two or more hall effect sensors associated with the single diametric magnet. In some embodiments operation 1808 is implemented at least with a system that contains only a single engine position sensor 10, the single engine position sensor including only a single diametric magnet 19 and two or more hall effect sensors (e.g., at least two of any of hall-effect sensors 20A-20D) associated with the single diametric magnet.

Consistent with some embodiments operation 1810 includes at least generating the engine position data at least in part by operating an engine position sensor to output electrical signals indicative of an engine position that correlates to a number of degrees out of 720 degrees with a tolerance of no greater than plus or minus 0.25 degrees. In some embodiments operation 1810 may be performed with at least an engine position sensor 10 that is configured to output electrical signals indicative of an engine position that correlates to a number of degrees out of 720 degrees with a tolerance of no greater than plus or minus 0.25 degrees.

Figure 19:
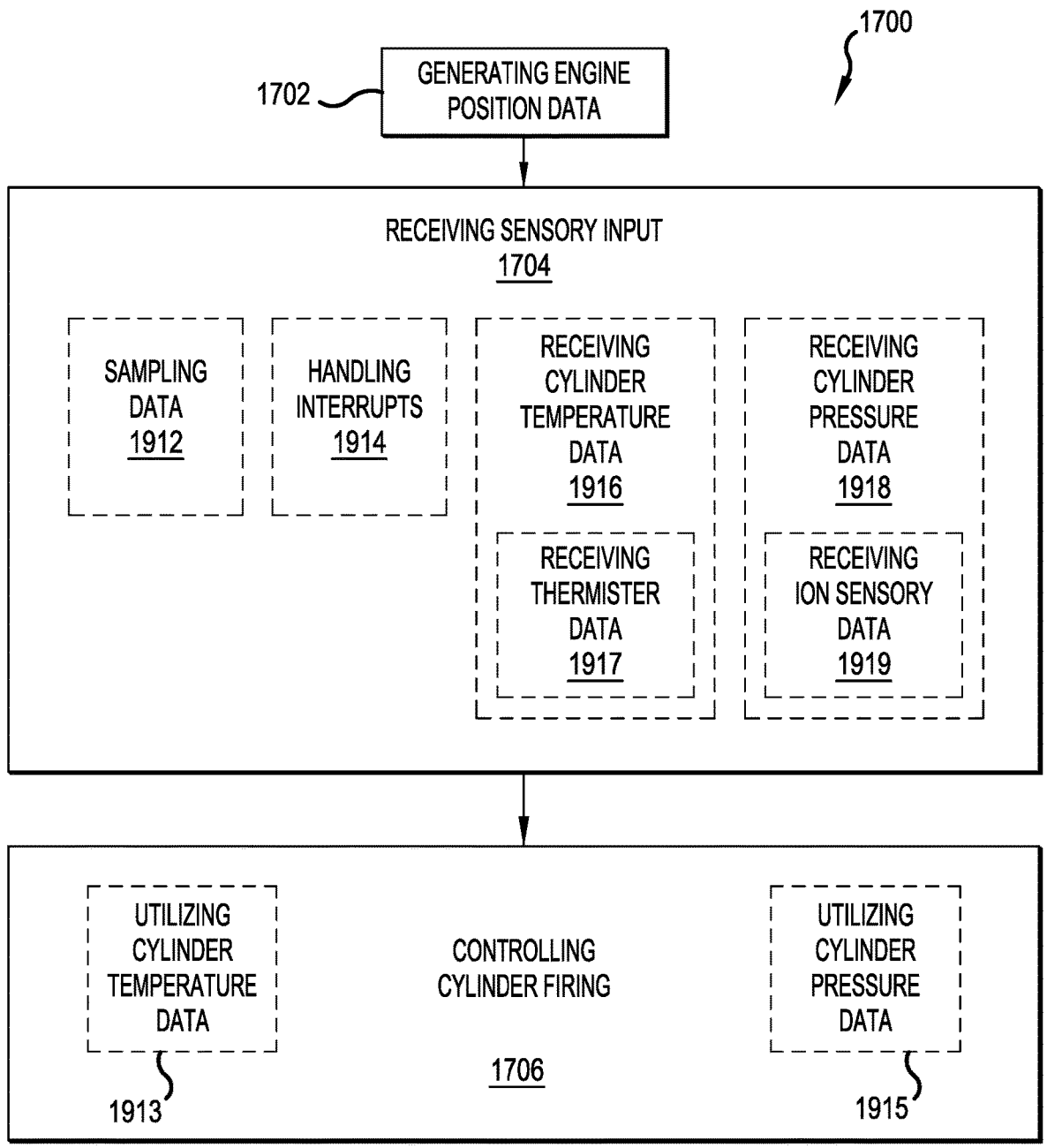
FIG. 19 is a flow chart illustrating the exemplary method of FIG. 17, with additional optional operations, consistent with some embodiments.

Referencing FIG. 19, in some embodiments, operation 1704 may include one or more of optional operations 1912, 1914, 1916, or 1918 and operation 1706 may include one or more of optional operations 1913 or 1915.

Consistent with some embodiments operation 1912 includes at least receiving sensory input at least in part by sampling the output of the engine position sensor with a frequency of at least 50,000 samples per second. In some embodiments, the sampling frequency is at least 50 million samples per second. In some embodiments, operation 1912 may be performed with at least sensor data receiving circuitry 1601 (e.g., processing device 430 configured to access engine position data via at least interface for engine position sensor 451 or ARM CPU 507) is configured for sampling the output of the engine position sensor 10, wherein the sensor data receiving circuitry 1601 is configured to sample the output of the engine position sensor 10 with a frequency of at least 50,000 samples per second. In some embodiments the sensor data receiving circuitry is configured to sample the output of the engine position sensor with a frequency of at least 50,000,000 samples per second.

Consistent with some embodiments operation 1914 includes at least handling sensory interrupts to obtain sensor data from one or more sensors. In some embodiments operation 1914 may be performed with at least sensory interrupt handling circuitry 1602 configured for handling sensory interrupts to obtain sensor data from one or more sensors (e.g., handling interrupts to obtain data associated with one or more of temperature sensor 5, ion sensing circuitry 6, etc.). In some embodiments a sensory interrupt may be handled by accessing an interrupt table which pairs specific types of sensory interrupts (e.g., temperature sensor interrupts, knock sensor interrupts, etc.) with a specific handler (e.g., handler for temperature sensor interrupts, handler for knock sensor interrupts, etc.) and then calling the specific handler to handle the interrupt and obtain the sensor data.

Consistent with some embodiments operation 1916 includes at least receiving sensory input from one or more cylinder temperature sensors associated with the one or more cylinders, the individual cylinder temperature sensors of the one or more cylinder temperature sensors being disposed within and coupled with respective ones of the one or more cylinders and configured to transmit sensor data indicative of internal temperature for their respective ones of the one or more cylinders, wherein the receiving sensory input includes at least handling sensory interrupts to obtain sensory input from the one or more cylinder temperature sensors. In some embodiments operation 1916 may be performed with at least one or more cylinder temperature sensors (e.g., temperature sensor 5) associated with the one or more cylinders (e.g., one or more of 3a-3d), the individual cylinder temperature sensors of the one or more cylinder temperature sensors being disposed within and coupled with respective ones of the one or more cylinders and configured to transmit sensor data to control circuitry 1603 that is indicative of internal temperature for their respective ones of the one or more cylinders, and wherein the sensor data receiving circuitry 1601 (e.g., processing device 430 via sensor interrupt interface 450 or other sensor interface and/or ARM CPU 507 accessing thermocouple IC 544 of FIG. 5) is configured to handle sensory interrupts to obtain sensory input from the one or more cylinder temperature sensors (e.g. temperature sensor 5). In some embodiments a sensory interrupt from e.g., temperature sensor 5 may be handled by accessing an interrupt table which pairs a temperature sensor interrupt with a specific handler for temperature sensor interrupts then calling the specific handler to handle the interrupt and obtain the sensor data.

Consistent with some embodiments operation 1913 includes at least controlling the firing of one or more cylinders of the engine, the controlling including at least controlling the firing at least in part by calculating one or more timing advance positions for one or more cylinders of the engine includes at least performing the calculations with input from the one or more cylinder temperature sensors associated with the one or more cylinders (e.g., with input from the one or more cylinder temperature sensors obtained via operation 1916). In some embodiments operation 1913 may be performed with at least control circuitry 1603 (e.g., processing device 430 and/or ARM CPU 507 accessing executable code (e.g., programs 434) for computing an advance and then utilizing data obtained (e.g., via sensor interrupt interface 450) to perform the calculations) that is configured to perform its calculation of the one or more timing advance positions based at least in part on input from the one or more cylinder temperature sensors 5.

Referencing FIG. 19, in some embodiments, operation 1916 optionally includes operation 1917.

Consistent with some embodiments operation 1917 includes at least receiving sensory input from one or more thermistors coupled with one or more spark plugs associated with the one or more cylinders. In some embodiments, operation 1917 may be performed with at least one or more cylinder temperature sensors 5 include at least one or more thermistors coupled with one or more spark plugs 4 associated with the one or more cylinders (e.g., 3a-3d).

Consistent with some embodiments operation 1918 includes at least receiving sensory input from one or more cylinder pressure sensors associated with the one or more cylinders, the individual cylinder pressure sensors of the one or more cylinder pressure sensors being disposed within and coupled with respective ones of the one or more cylinders, wherein the receiving sensory input includes at least handling sensory interrupts to obtain sensory input from the one or more cylinder pressure sensors. In some embodiments operation 1918 may be performed with at least one or more cylinder pressure sensors (e.g., ion sensing circuitry 6) associated with the one or more cylinders (e.g., one or more of 3a-3d), the individual cylinder pressure sensors of the one or more cylinder pressure sensors being disposed within and coupled with respective ones of the one or more cylinders, and wherein the sensor data receiving circuitry 1601 (e.g., processing device 430 via sensor interrupt interface 450 or other sensor interface and/or ARM CPU 507 accessing ion detection IC 536) is configured to handle sensory interrupts to obtain sensory input from the one or more cylinder pressure sensors (e.g., ion sensing circuitry 6). In some embodiments a sensory interrupt from e.g., ion sensing circuitry 6 may be handled by accessing an interrupt table which pairs an ion sensory interrupt with a specific handler for ion sensing interrupts then calling the specific handler to handle the interrupt and obtain the sensor data.

Consistent with some embodiments operation 1915 includes at least controlling the firing of one or more cylinders of the engine by at least controlling the firing at least in part by calculating one or more timing advance positions for one or more cylinders of the engine includes at least performing the calculations with input (e.g., obtained via operation 1918) from the one or more cylinder pressure sensors associated with the one or more cylinders. In some embodiments operation 1915 may be performed with at least wherein control circuitry 1603 (e.g., processing device 430 and/or ARM CPU 507 accessing executable code (e.g., programs 434) for computing an advance and then utilizing data obtained (e.g., via sensor interrupt interface 450) is configured to perform its calculation of the one or more timing advance positions based at least in part on input from the one or more cylinder pressure sensors (e.g., ion sensing circuitry 6).

Referencing FIG. 19, in some embodiments, operation 1918 optionally includes operation 1919.

Consistent with some embodiments operation 1919 includes at least receiving sensory input from the one or more cylinder pressure sensors that include at least one or more spark plugs configured to provide ion sensor data. In some embodiments operation 1919 may be performed with at least one or more cylinder pressure sensors (e.g. ion sensing circuitry 6) include at least one or more spark plugs (e.g. sparkplug 4) configured to provide ion sensor data.

Figure 20:
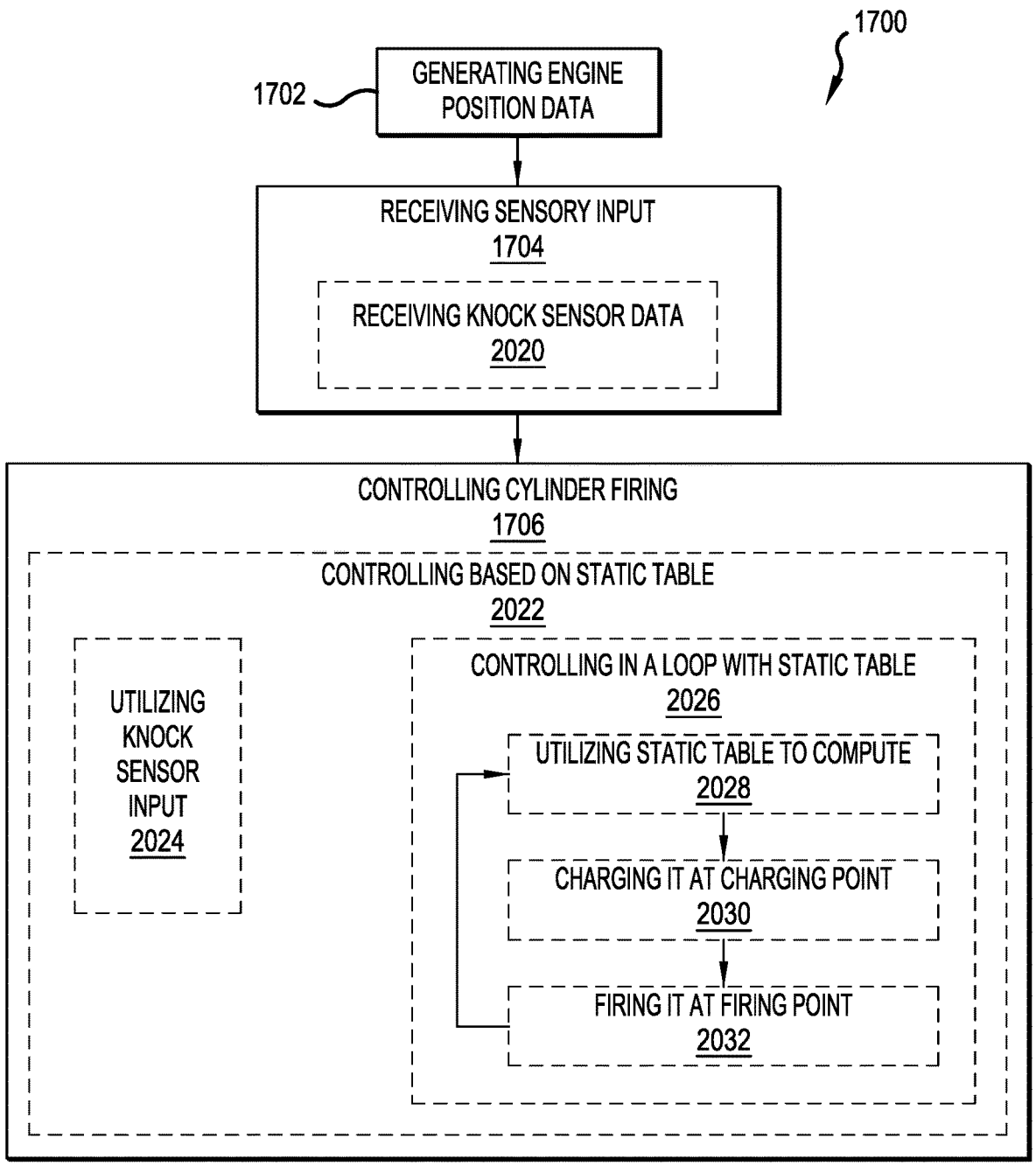
FIG. 20 is a flow chart illustrating the exemplary method of FIG. 17, with additional optional operations, consistent with some embodiments.

Referencing FIG. 20, in some embodiments, operation 1704 optionally includes operation 2020 and operation 1706 may include optional operation 2022.

Consistent with some embodiments operation 2022 includes at least controlling the firing of one or more cylinders of the engine at least in part by calculating the one or more timing advance positions for a given cylinder of the one or more cylinders based at least in part on (1) a static table (e.g. static table 1000) that includes at least an advance curve (e.g. advance curve 1008) and based at least in part on (2) input from the engine position sensor. In some embodiments operation 2022 may be performed with at least static table circuitry 1605 (e.g., processing device 430 or ARM CPU 507) configured to calculate the one or more timing advance positions for a given cylinder (e.g. 3a) of the one or more cylinders (e.g., 3a-3d) based at least in part on (1) a static table (e.g., 1000) that includes at least an advance curve (1008) and based at least in part on (2) input from the engine position sensor 10 (e.g. in some embodiments data from the engine position sensor 10 may be used by static table circuitry 1605 to calculate RPM at each detect point, then the calculated RPM is an input to determine the advance via the static table 1000, but in alternative embodiments RPM data is obtained from other sources, e.g. standard tachometer circuitry).

Referencing FIG. 20, in some embodiments operation 2020 includes at least receiving the output of one or more knock sensors. In some embodiments operation 2020 may be performed with at least sensor data receiving circuitry 1601 (e.g., processing device 430 via sensor interrupt interface 450 or other sensor interface and/or ARM CPU 507 accessing knock sensor IC 541) is configured for receiving the output of the one or more knock sensors (e.g., knock sensor 21). In some embodiments a sensory interrupt from e.g., knock sensor 21 may be handled by accessing an interrupt table which pairs a temperature sensor interrupt with a specific handler for knock sensor interrupts then calling the specific handler to handle the interrupt and obtain the sensor data.

Referencing FIG. 20, in some embodiments, operation 2022 includes one or more of optional operations 2024 or 2026.

Consistent with some embodiments, operation 2024 includes at least additionally utilizing input from one or more knock sensors (e.g., received via operation 2020) to calculate the one or more timing advance positions. In some embodiments operation 2024 may be performed with at least static table circuity 1605 (e.g., processing device 430 and/or ARM CPU 507 accessing executable code (e.g., programs 434) for computing an advance and then utilizing data obtained (e.g., via sensor interrupt interface 450 or knock sensor IC 541) to perform the calculations) is further configured to additionally utilize input from one or more knock sensors (e.g., knock sensor 21 to calculate the one or more timing advance positions for the one or more cylinders (e.g., one or more of cylinders 3a-3d).

Referencing FIG. 20, consistent with some embodiments, operation 2026 includes at least the performance of operations 2028, 2030, and 2032 in sequence in a repeating loop as shown below.

Consistent with some embodiments, operation 2026 includes at least performing the controlling (e.g., with control circuitry 1605) in a repeating loop, including at least:
   a. Per operation 2028, utilizing the static table (e.g. static table 1000) and input from the engine position sensor to repeatedly compute, within a repeating loop, a charge point and a fire point for the given cylinder. In some embodiments operation 2028 may be performed with at least point calculation circuitry 1606 (e.g., processing device 430 or ARM CPU 507 when data from engine position sensor 10 indicates a detect point) configured for utilizing the static table (e.g. static table 1000) and input from the engine position sensor to repeatedly compute, within the repeating loop, a charge point and a fire point for the given cylinder (e.g., cylinder 3a).
   b. Per operation 2030 repeatedly charging, within the repeating loop, an ignition coil 37 associated with the given cylinder if the given cylinder is at a charge point. In some embodiments operation 2030 may be performed with at least charging circuitry 1607 (e.g., processing device or ARM CPU 507 causing distributor 7 to charge ignition coil 37 for cylinder 3a when data from engine position sensor 10 indicates a charge point) configured for repeatedly charging, within the repeating loop, an ignition coil 37 associated with the given cylinder if the given cylinder is at a charge point.
   c. Per operation 2032 repeatedly firing, within the repeating loop, the ignition coil 37 associated with the given cylinder if the given cylinder is at a fire point. In some embodiments operation 2032 may be performed with at least firing circuitry 1608 (e.g., processing device or ARM CPU 507 causing distributor 7 to fire ignition coil 37 for cylinder 3a when data from engine position sensor 10 indicates a fire point) configured for repeatedly firing, within the repeating loop, the ignition coil associated with the given cylinder if the given cylinder is at a fire point.

Figure 21:
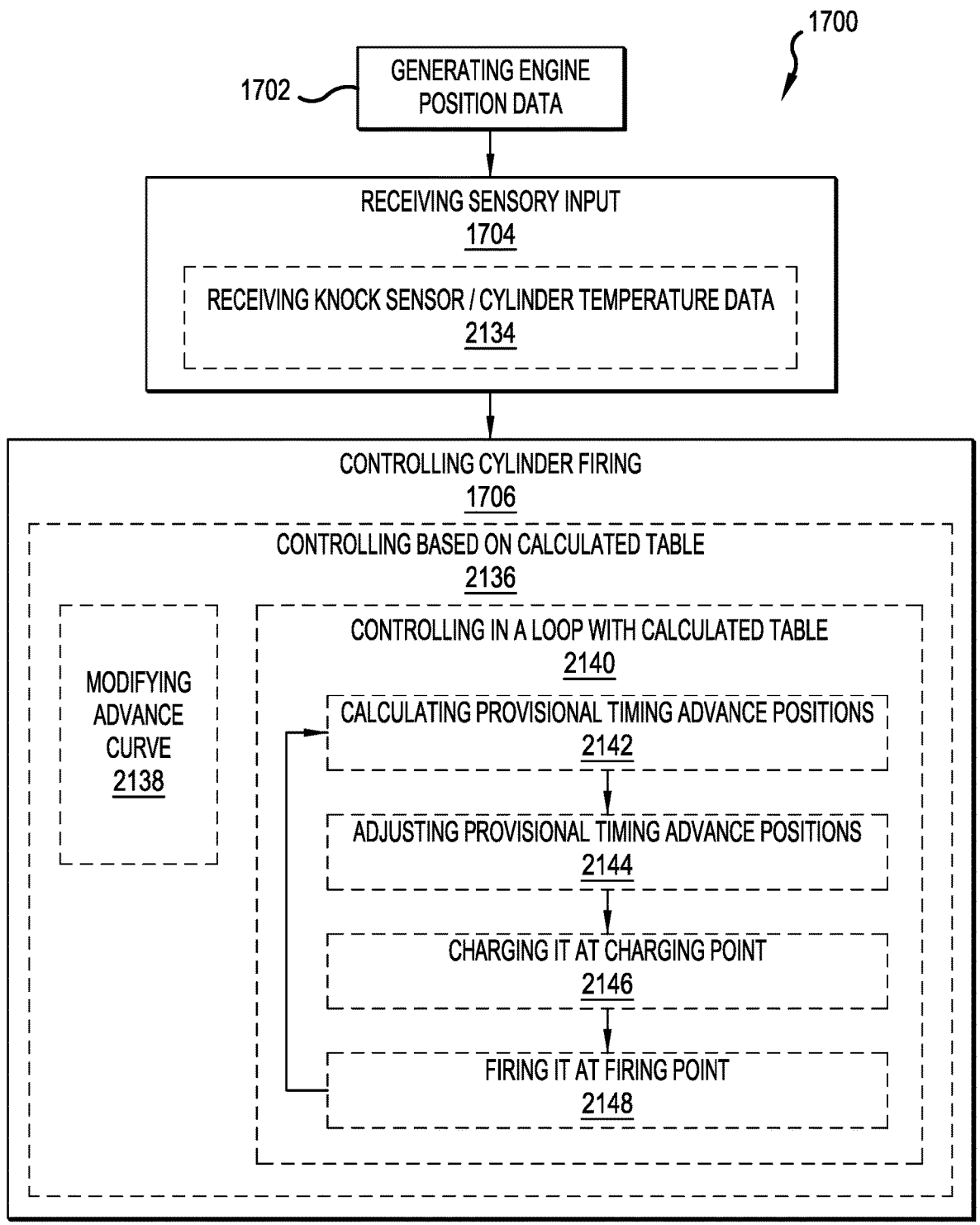
FIG. 21 is a flow chart illustrating the exemplary method of FIG. 17, with additional optional operations, consistent with some embodiments.

Referencing FIG. 21, in some embodiments, operation 1704 includes optional operation 2134 and operation 1706 includes optional operation 2136.

Consistent with some embodiments operation 2136 includes at least controlling the firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders. In some embodiments operation 2136 may be performed with at least calculated formula circuitry 1609 (e.g., processing device 430 performing calculation based at least in part on accessing at least engine position sensor 10 via interface for engine position sensor 451 and further accessing one or more of cylinder temperature or knock data via sensor interrupt interface 450 or ARM CPU 507 performing the calculation based on accessing at least engine position sensor 10 and one or more of Thermocouple IC 544 (of FIG. 5) or knock sensor IC 541) pf FIG. 5)) configured to control firing of one or more cylinders of the engine at least in part by calculating the one or more timing advance positions for a given cylinder (e.g., cylinder 3a) of the one or more cylinders (e.g., one or more of cylinders 3a-3d) based at least in part on (1) a dynamic table (e.g., FIG. 11) that includes at least an advance curve, (2) input from the engine position sensor, and (3) input from at least one of one or more knock sensors or one or more cylinder temperature sensors configured to sense temperature in individual cylinders of the one or more cylinders (e.g. in some embodiments data from the engine position sensor 10 may be used by calculated formula circuitry 1609 to calculate RPM at each detect point, then the calculated RPM is an input to determine a provisional advance via the dynamic table 1100, and the provisional advance adjusted based on data from the at least one of one or more knock sensors or one or more cylinder temperature sensors to determine an updated advance—but in some alternative embodiments RPM is obtained from traditional tachometer circuitry instead of from engine position sensor 10). As noted above, in some alternative embodiments, Thermocouple IC 544 is a thyristor IC or an IC associated with another type of temperature sensor).

Referencing FIG. 21, in some embodiments, operation 2136 includes one or more of optional operations 2138 or 2140.

Consistent with some embodiments operation 2138 includes at least making one or more modifications to the advance curve of the dynamic table applicable to the given cylinder, the one or more modifications being made over time responsive to one or more detected knocks within the given cylinder detected with the one or more knock sensors. In some embodiments operation 2138 may be performed with at least calculated formula circuitry 1609 (e.g., processing device 430 or ARM CPU 507) that is configured to modify the advance curve 1108 of the dynamic table (e.g. table 1100 of FIG. 11) applicable to the given cylinder (e.g., cylinder 3a), the modification being over time responsive to one or more detected knocks within the given cylinder detected with the one or more knock sensors (e.g., knock detector 21).

Operations 2134 and 2140 and now discussed in sequence.

Consistent with some embodiments operation 2134 includes at least receiving the output of at least one of one sensors that include at least one of one or more knock sensors or one or more cylinder temperature sensors configured to sense temperature in individual cylinders of the one or more cylinders. In some embodiments operation 2134 is implemented one or more sensors that include at least one of one or more knock sensors or one or more cylinder temperature sensors configured to sense temperature in individual cylinders of the one or more cylinders, wherein the sensor data receiving circuitry is configured for receiving the output of the one or more sensors.

Referencing FIG. 21, consistent with some embodiments, as discussed below operation 2140 includes at least the performance of operations 2142, 2144, 2146, and 2148 in sequence in a repeating loop.

Consistent with some embodiments operation 2140 includes at least performing the controlling (e.g., with calculated formula circuitry 1609) in a repeating loop, including at least:
   a. Per operation 2142 repeatedly calculating, in the repeating loop, one or more provisional timing advance positions for the given cylinder if the given cylinder is at a detect point, the repeated calculating of the one or more provisional timing advance positions being based at least in part on a dynamic table and on input from the engine position sensor. In some embodiments operation

2142 may be performed with at least provisional calculation circuitry 1610 (e.g., processing device 430 or ARM CPU 507 accessing engine position sensor 10, in some embodiments via interface for engine position sensor 451) configured to repeatedly calculate, in the repeating loop, one or more provisional timing advance positions for the given cylinder if the given cylinder is at a detect point (when engine position sensor 10 data indicates a detect point), the provisional calculation circuitry configured to perform the calculations of the one or more provisional timing advance positions based at least in part on a dynamic table and on input from the engine position sensor (e.g. data from the engine position sensor 10 may be used by provisional calculation circuitry 1610 to calculate RPM at each detect point, then the calculated RPM is an input to determine the provisional advance via the dynamic table 1100).

b. Per operation 2144 repeatedly adjusting, in the repeating loop, the one or more provisional timing advance positions for the given cylinder to derive one or more updated timing advance positions for the given cylinder based at least in part on input from the one or more sensors and the engine position sensor, the one or more updated timing advance positions including at least one or more charge points and one or more fire points for the given cylinder. In some embodiments operation 2142 may be performed with at least advance adjustment circuitry 1611 (e.g., processing device 430 accessing at least one of temperature sensor 5 or knock sensor 21 via sensor interrupt interface 450 or ARM CPU 507 accessing at least one of Thermocouple IC 544 (or other type of Temperature Sensor IC) or knock sensor IC 541) configured to repeatedly adjust, in the repeating loop, the one or more provisional timing advance positions for the given cylinder (e.g., cylinder 3a) to derive one or more updated timing advance positions for the given cylinder based at least in part on input from the one or more sensors (e.g., one or more of temperature sensor 5 or knock sensor 21) and the engine position sensor 10, the one or more updated timing advance positions including at least one or more charge points and one or more fire points for the given cylinder. But see discussion regarding process blocks 859 and 866 of FIG. 8 regarding time periods for servicing sensor interrupts.

c. Per operation 2146 repeatedly charging, within the repeating loop, an ignition coil 37 associated with the given cylinder if the given cylinder is at one of the one or more charge points. In some embodiments operation 2142 may be performed with at least charging circuitry 1612 (e.g., processing device or ARM CPU 507 causing distributor 7 to charge ignition coil 37 for cylinder 3a when engine position sensor 10 data indicates a charge point) for repeatedly charging, within the repeating loop, an ignition coil 37 associated with the given cylinder if the given cylinder is at one of the one or more charge points.

d. Per operation 2148 repeatedly firing, within the repeating loop, the ignition coil 37 associated with the given cylinder if the given cylinder is at one of the one or more fire points. In some embodiments operation 2142 may be performed with at least firing circuitry 1613 (e.g., processing device or ARM CPU 507 causing distributor 7 to fire ignition coil 37 for cylinder 3a when engine position sensor 10 data indicates a fire point) for repeatedly firing, within the repeating loop, the ignition coil associated with the given cylinder if the given cylinder is at one of the one or more fire points.

Figure 22:
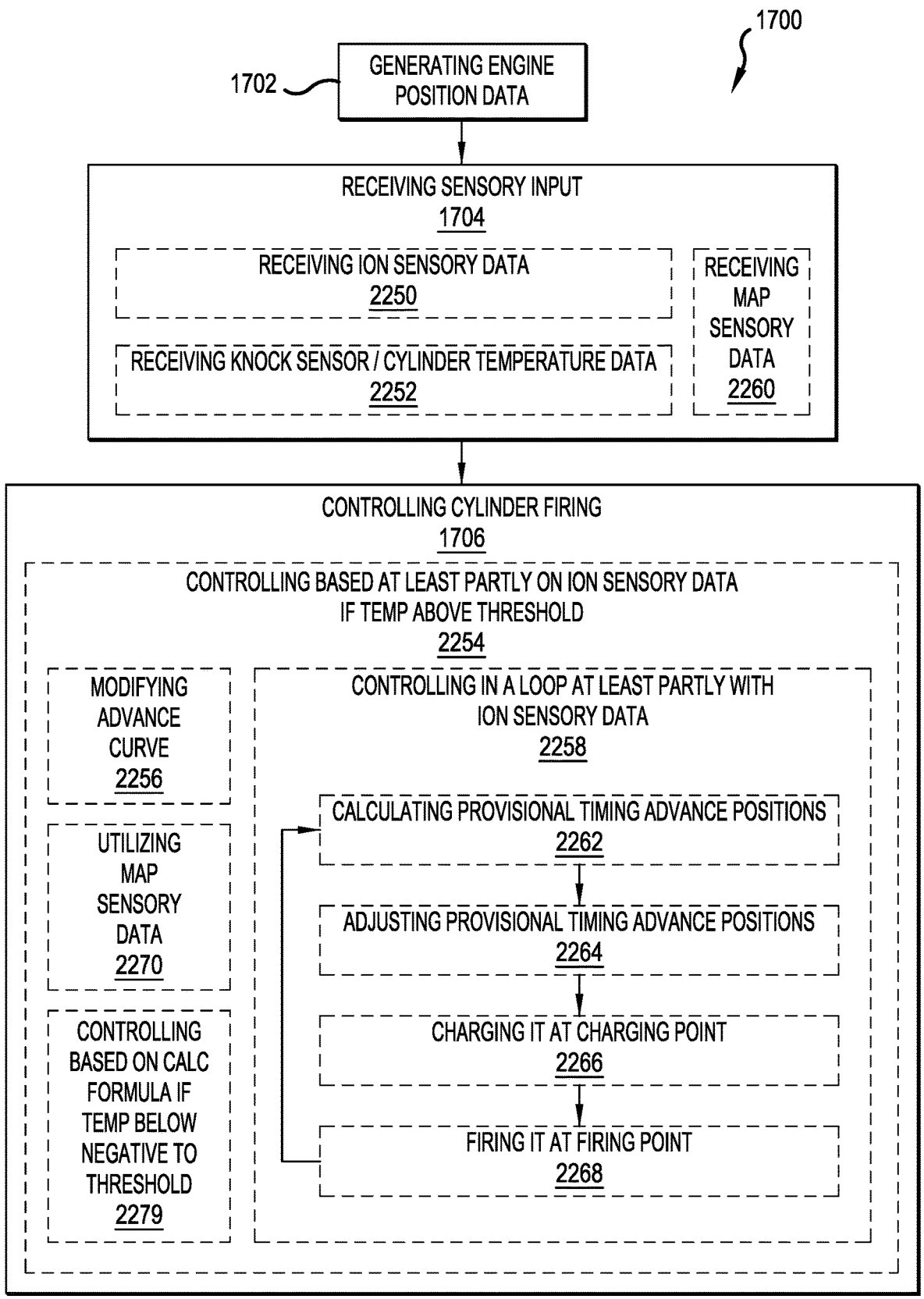
FIG. 22 is a flow chart illustrating the exemplary method of FIG. 17, with additional optional operations, consistent with some embodiments.

Referencing FIG. 22, in some embodiments, operation 1704 optionally includes one or more of operations 2250, 2252, or 2260 and operation 1706 optionally includes operation 2254. Operation 2254 is discussed first.

Consistent with some embodiments operation 2254 includes at least controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature. In some embodiments operation 2254 may be performed with at least ion-detection-based advance calculation circuitry 614 (e.g., processing device 430 performing calculation based at least in part on accessing at least engine position sensor 10 via interface for engine position sensor 451 and further accessing one or more of cylinder temperature, cylinder pressure data (from ion sensing circuitry 6) or knock data via sensor interrupt interface 450 or ARM CPU 507 performing the calculation based on accessing at least engine position sensor 10 and one or more of Thermocouple IC 544 (or other type of Temperature Sensor IC), knock sensor IC 541, or ion detection IC 536) configured to control firing of one or more cylinders (e.g., one or more of cylinders 3a-3d) of the engine 2 at least in part by calculating one or more timing advance positions for the given cylinder (e.g., cylinder 3a) based at least in part on (1) ion sensor data (e.g., from ion sensing circuitry 6) indicative one or more pressures within the given cylinder, (2) input from the engine position sensor 10, and (3) input from at least one of one or more knock sensors (e.g., knock sensor 21) or one or more cylinder temperature sensors (e.g., temperature sensor 5), the ion-detection-based advance calculation circuitry being configured to be operable with respect to a given cylinder of the one or more cylinders while the given cylinder is above a given temperature (e.g. as entered by user via user interface). In some embodiments the given temperature is 220 degrees F.

Referencing FIG. 22, consistent with some embodiments, operation 2254 optionally includes one or more of operation 2256, 2270, or 2279.

Consistent with some embodiments operation 2279 includes at least if the given cylinder is at or below the given temperature, then calculating the one or more timing advance positions for the given cylinder based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders. In some embodiments operation 2279 may be performed with at least conditional calculated formula circuitry 1632 (e.g., processing device 430 performing calculation based at least in part on accessing at least engine position sensor 10 via interface for engine position sensor 451 and further accessing one or more of cylinder temperature or knock data via sensor interrupt interface 450 or ARM CPU 507 performing the calculation based on accessing at least engine position sensor 10 and one or more of Thermocouple IC 544 (or other type of Temperature Sensor IC) or knock sensor IC 541) configured to control firing of one or more cylinders (e.g., cylinders 3a-3d) of the engine 2 at least in part by calculating the one or more timing advance positions for a given cylinder (e.g., cylinder 3a) of the one or more cylinders based at least in part on (1) a dynamic table (e.g. FIG. 11) that includes at least an advance curve, (2) input from the engine position sensor 10, and (3) input from at least one of one or more knock sensors (e.g., knock sensor 21) or one or more cylinder temperature sensors (e.g. temperature sensor 5) configured to sense temperature in individual cylinders of the one or more cylinders, wherein the conditional calculated formula circuitry is configured to be operable with respect to the given cylinder of the one or more cylinders while the given cylinder is at one or more temperatures that are at least one of at or below the given temperature (e.g. data from the engine position sensor 10 may be used by conditional calculated formula circuitry 1632 to calculate RPM at each detect point, then the calculated RPM is an input to determine a provisional advance via the dynamic table 1100, and the provisional advance adjusted based on data from the at least one of one or more knock sensors or one or more cylinder temperature sensors to determine an updated advance).

Consistent with some embodiments operation 2256 includes at least making one or more modifications of the advance with respect to the given cylinder, over time responsive at least in part to knock detection via at least one of the ion sensor data or one or more knock sensors. In some embodiments operation 2256 may be performed with at least ion-detection-based advance calculation circuitry 1614 that is configured to modify the advance with respect to the given cylinder, over time responsive at least in part to knock detection via at least one of the ion sensor data or one or more knock sensors. For example, processing device 430 modifying the advance curve based on data indicative of one or more knocks obtained via sensor interrupt interface 450 from knock detector 21 or ARM CPU 507 modifying advance curve 1108 based on data indicative of one or more knocks obtained via knock sensor IC 541. In a further example, advance may be modified to reduce advance responsive to processing device 430 or ARM CPU 507 receiving data indicative of a knock. In some embodiments, advance may also be modified to increase advance if a predetermined amount of time elapses without processing device 430 or ARM CPU 507 receiving data indicative of a knock.

Consistent with some embodiments operation 2270 includes at least utilizing MAP sensor data received via one or more MAP sensors in the calculating the one or more timing advance positions for the given cylinder. In some embodiments operation 2270 may be performed with at least ion-detection-based advance calculation circuitry 1614 that is configured to perform the calculating of the one or more timing advance positions for the given cylinder based at least in part on based at least in part on MAP sensor data associated with a MAP sensor. For example, processing device 430 may perform at least a portion of the calculation after accessing data from MAP sensor 51 of FIG. 1 via MAP sensor interface 449. Or, ARM CPU 507 may perform at least a portion of the calculation after accessing data from MAP sensor 51 via Analog Sensor Input 537.

Operations 2250, 2252, and 2258 are now discussed. Additionally, it is noted that operation 2258 includes performing operations 2262, 2264, 2266, and 2268 in a repeating loop.

Consistent with some embodiments operation 2250 includes at least receiving ion sensor data via one or more spark plugs configured for providing the ion sensor data.

Consistent with some embodiments operation 2252 includes at least receiving data from one or more sensors that include at least one of one or more knock sensors or one or more cylinder temperature sensors.

Consistent with some embodiments operation 2258 includes at least performing the controlling (e.g., with detection-based advance calculation circuitry 1614) in a repeating loop, including at least:

a. Per operation 2262 repeatedly calculating, in the repeating loop, one or more provisional timing advance positions for the given cylinder if the given cylinder is at a detect point, the repeated calculating being performed based at least in part on a determination of a peak pressure position for the given cylinder based at least in part on ionic sensor data associated with the given cylinder and on sensor data from the engine position sensor. In some embodiments operation 2262 may be performed with at least provisional calculation circuitry 1615 (e.g., processing device 430 or ARM CPU 507 accessing engine position sensor 10, in some embodiments via interface for engine position sensor 451) configured to repeatedly calculate, in the repeating loop, one or more provisional timing advance positions for the given cylinder if the given cylinder is at a detect point (e.g. as indicated by data from engine position sensor 10), the provisional calculation circuitry configured to perform the calculations based at least in part on a determination of a peak pressure position for the given cylinder based at least in part on ionic sensor data associated with the given cylinder and on sensor data from the engine position sensor.

b. Per operation 2264 repeatedly adjusting, in the repeating loop, the one or more provisional timing advance positions for the given cylinder to derive a one or more updated timing advance positions for the given cylinder based at least in part on input from at least one of the one or more sensors or the ionic sensor data, the one or more updated timing advance positions including at least one or more charge points and one or more fire points for the given cylinder. In some embodiments operation 2262 may be performed with at least advance adjustment circuitry 1616 (e.g., processing device 430 accessing at least one of temperature sensor 5, ion sensing circuitry 6, or knock sensor 21 via sensor interrupt interface 450 or ARM CPU 507 accessing at least one of Thermocouple IC 544 (or other type of Temperature Sensor IC), knock sensor IC 541 or ion detection IC 536) configured to repeatedly adjust, in the repeating loop, the one or more provisional timing advance positions for the given cylinder to derive a one or more updated timing advance positions for the given cylinder based at least in part on input from at least one of the one or more sensors or the ionic sensor data (e.g., data from one or more of temperature sensor 5, knock detector 21, or ion sensing circuitry 6), the one or more updated timing advance positions including at least one or more charge points and one or more fire points for the given cylinder. But see discussion regarding FIG. 8, process blocks 859, 866 regarding time period for servicing interrupts.

c. Per operation 2266 repeatedly charging, in the repeating loop, an ignition coil 37 associated with the given cylinder if the given cylinder is at one of the one or more charge points. In some embodiments operation 2262 may be performed with at least charging circuitry 1617 (e.g., processing device or ARM CPU 507 causing distributor 7 to charge ignition coil 37 for cylinder 3a when engine position sensor 10 data indicates a charge point) for repeatedly charging, in the repeating loop, a coil associated with the given cylinder if the given cylinder is at one of the one or more charge points.

d. Per operation 2268 repeatedly firing, in the repeating loop, the coil associated with the given cylinder if the given cylinder is at a one of the one or more fire points. In some embodiments operation 2268 may be performed with at least firing circuitry 1618 (e.g., processing device or ARM CPU 507 causing distributor 7 to fire ignition coil 37 for cylinder 3a when engine position sensor data 10 indicates a fire point) for repeatedly firing, in the repeating loop, the ignition coil 37 associated with the given cylinder if the given cylinder is at a one of the one or more fire points.

Figure 23:
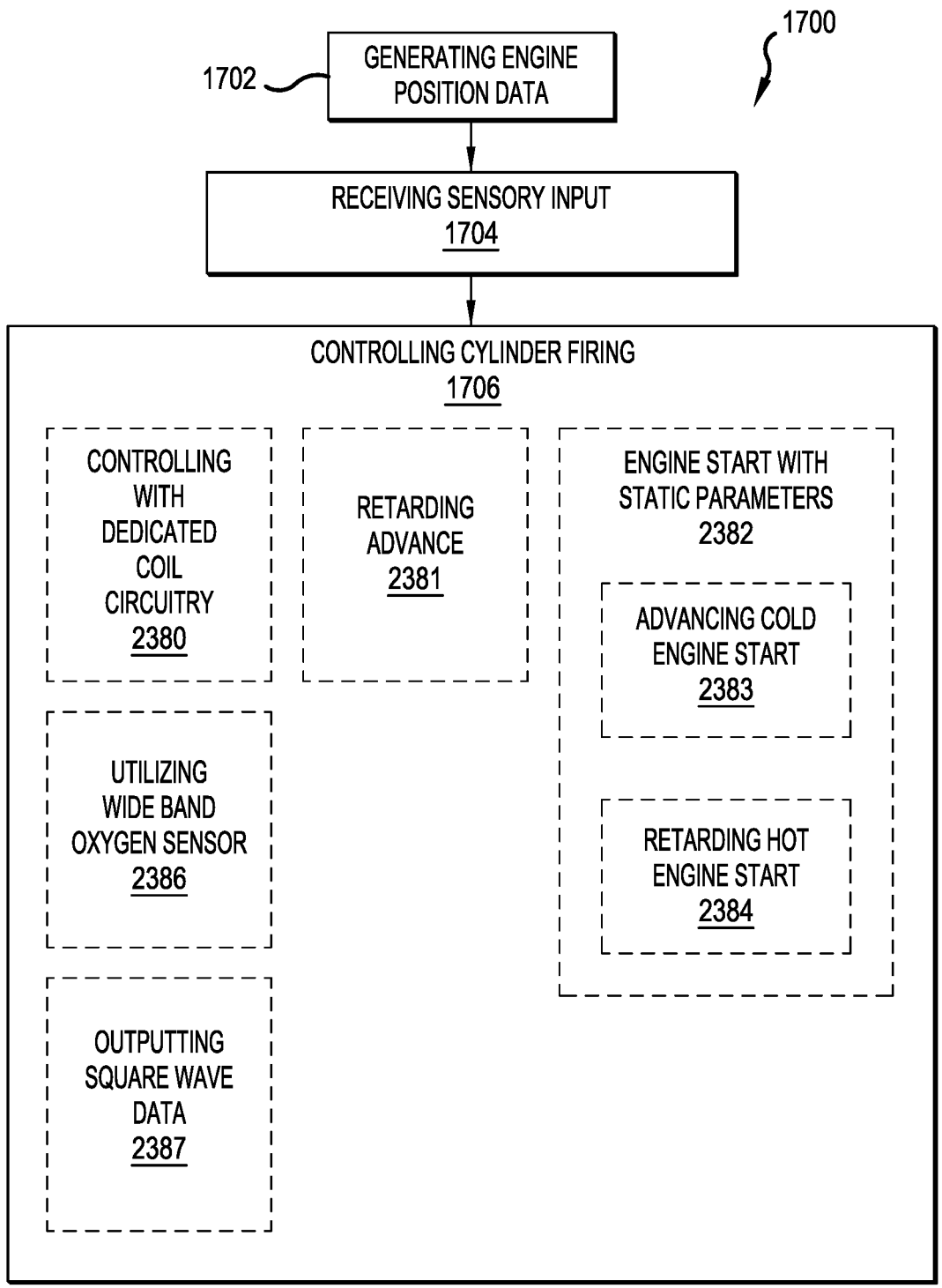
FIG. 23 is a flow chart illustrating the exemplary method of FIG. 17, with additional optional operations, consistent with some embodiments.

Referencing FIG. 23, in some embodiments, operation 1706 includes one or more of optional operations 2380, 2381, 2382, 2386 or 2387.

Consistent with some embodiments operation 2380 includes at least controlling a charging and a firing of a given cylinder of the one or more cylinders at least in part with a dedicated ignition coil 37. In some embodiments operation 2380 may be performed with at least an electronic coil pack configured to provide a single dedicated ignition coil 37 for a given cylinder of the one or more cylinders, and a control circuitry 1603 that includes at least dedicated coil circuitry 1619 (e.g., distributor 7, processing device 430 or ARM CPU 507 configured to direct charging and firing of dedicated ignition coil 37) for controlling charging and firing of the given cylinder (e.g., 3a) at least in part with a dedicated ignition coil (e.g., 37).

Consistent with some embodiments, operation 2381 includes at least retarding the advance for a given cylinder of the one or more cylinders that is running hotter than at least one other cylinder of the one or more cylinders, the retarding based at least in part on sensory input indicative of the temperature of the given cylinder. In some embodiments operation 2381 may be performed with at least advance retarding circuitry 1620 (e.g., processing device 430 or ARM CPU 507 accessing data (e.g., data 432 with temperature data for cylinders 3a-3d) indicating that cylinder 3a is running hotter than the others and responsive to a determination that cylinder 3a is running hotter retarding advance for cylinder 3a) for retarding the advance for a given cylinder of the one or more cylinders that is running hotter than at least one other cylinder of the one or more cylinders. This may occur in embodiments wherein a given cylinder runs hotter than the other cylinders because of an anomaly in the cooling system or because of where the given cylinder is located in relation to the cooling system.

Consistent with some embodiments operation 2382 includes at least if the engine is being cranked from a start, then calculating the one or more timing advance positions for the one or more cylinders based at least in part on (1) one or more static parameters and based at least in part on (2) input from the engine position sensor, including at least receiving input from the engine position sensor immediately upon the engine being power on. In some embodiments operation 2382 may be performed with first stage starting circuitry 1621 configured to calculate the one or more timing advance positions for the one or more cylinders based at least in part on (1) one or more static parameters and based at least in part on (2) input from the engine position sensor, the first stage starting circuitry configured to operate only when while the engine is being cranked during a start, wherein the first stage starting circuitry is configured to receive an engine position from the engine position sensor immediately upon being powered on. For example, processing device 430 or ARM CPU may access one or more static parameters (e.g., from data 432) and may further access data from engine position sensor 10 (e.g., via interface for engine position sensor 451) to perform the calculating (e.g. data from the engine position sensor 10 may be used by first stage starting circuitry 1621 to calculate RPM at each detect point, then the calculated RPM is an input to determine the advance along with the static parameters).

Referencing FIG. 23, consistent with some embodiments, operation 2382 may include one or more of optional operations 2383 or 2384.

Consistent with some embodiments operation 2383 includes at least detecting a cold engine start condition and advancing the one or more cylinders responsive to a detection of a cold engine start condition. In some embodiments operation 2383 is performed with cold start advancing circuitry 1623 for advancing the one or more cylinders (e.g., cylinders 3a-3d) responsive to a detection of a cold engine start condition.

Consistent with some embodiments operation 2384 includes at least detecting a hot engine start condition and retarding the advance of the one or more cylinders responsive to a detection of a hot engine start condition. In some embodiments operation 2384 is performed with at least hot engine retarding circuitry 1625 for retarding the advance of the one or more cylinders responsive to a detection of a hot engine start condition.

Consistent with some embodiments operation 2386 includes at least utilizing sensory input from the wide band oxygen sensor to detect at least a lean fuel condition above a threshold. In some embodiments operation 2386 is performed with at least a wide band oxygen sensor 51 in communication with an engine carburetor and wide band oxygen sensor firmware configured for utilizing sensory input from the wide band oxygen sensor to detect at least a lean fuel condition above a threshold. Processing device 430 may receive wide band oxygen sensor data via wide band oxygen sensor interface 448.

Consistent with some embodiments operation 2387 includes at least outputting one or more square waves indicative of at least one of camshaft position or crankshaft position. In some embodiments operation 2387 is implemented with at least square wave output circuitry 1631 configured to output one or more square waves indicative of at least one of camshaft position or crankshaft position. For example, processing device 430 or ARM CPU 507 may output the square waves (e.g., via output for tachometer, EFI 447) based at least in part on data from engine position sensor 10 which is indicate of at least one of camshaft position or crankshaft position.

Figure 24:
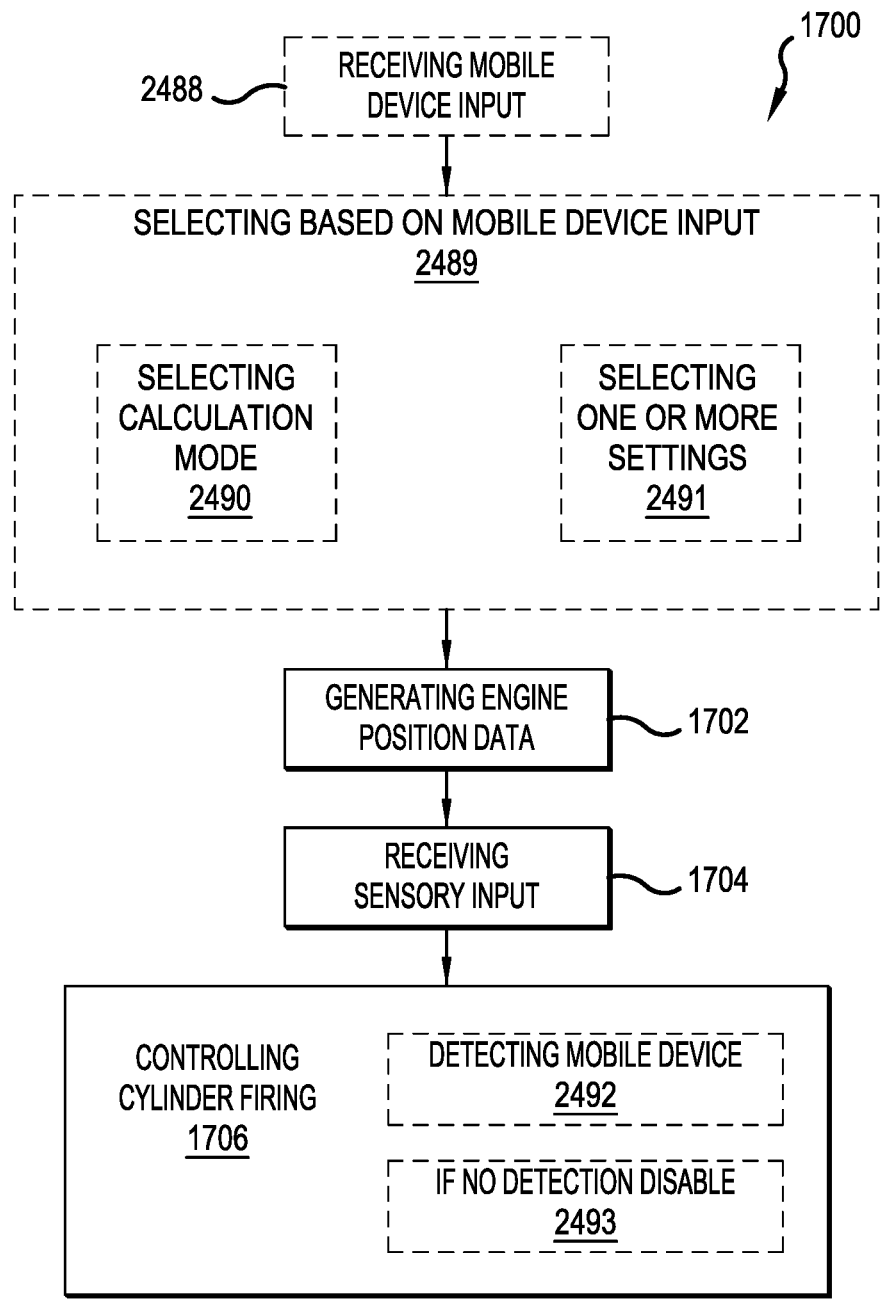
FIG. 24 is a flow chart illustrating the exemplary method of FIG. 17, with additional optional operations, consistent with some embodiments.

Referencing FIG. 24, consistent with some embodiments, method 1700 optionally further includes operations 2488 and 2489. In addition, operation 2489 includes one or more of optional operations 2490 and 2491 and operation 1706 includes one or more of optional operations 2492 and 2493.

Operations 2488 and 2489 are discussed as a sequence.

Consistent with some embodiments operation 2488 includes at least receiving user input via wireless signals received from an associated mobile communication device. In some embodiments operation 2488 is performed with at least user input receiving circuitry 1627 (e.g. transceiver 435 of FIG. 4) for receiving user input via wireless signals received from an associated mobile communication device (e.g., mobile device 50 of FIG. 1).

Consistent with some embodiments operation 2489 includes at least selecting at least one aspect of engine timing based at least in part on the input received (via operation 2488) via the wireless signals received from the associated mobile communication device. In some embodiments operation 2489 is performed with at least user input selection circuitry 1628 configured for selecting at least one aspect of engine timing based at least in part on the input received via the wireless signals received from the associated mobile communication device (e.g., mobile device 50 of FIG. 1).

Consistent with some embodiments operation 2490 includes at least selecting, responsive to the input received by the wireless signals, at least one of:
- a. a first mode for calculating one or more timing advance positions for one or more cylinders of an engine at least in part with a static table (e.g. static table 1000);
- b. a second mode for calculating one or more timing advance positions for one or more cylinders of an engine at least in part with a dynamic table; or
- c. a third mode for calculating one or more timing advance positions for one or more cylinders of an engine at least in part with ion sensing circuitry.

In some embodiments, operation 2490 is performed with at least user input selection circuitry 1628. For example processing device 430 or ARM CPU 507 may select one of the first, second, or third mode responsive to user input received via transceiver 435.

Consistent with some embodiments operation 2491 includes at least selecting, responsive to the input received by the wireless signals, one or more of:
- a. a specified RPM limit;
- b. a specified coil dwell time;
- c. a specified distributor rotation direction;
- d. a specified firing order;
- e. a map sensor for load detection;
- f. engine coolant temperature;
- g. engine oil temperature;
- h. spark output IGT type coils
- i. spark output high power (ground switched);
- j. a maximum advance;
- k. a base timing setting;
- l. an RPM for reaching maximum advance; or
- m. a starting advance.

In some embodiments operation 2491 may be performed with at least wherein the user input selection circuitry 1628 is configured to cause control circuitry 1603 to make the above selection responsive to the input received by the wireless signals.

Operations 2492 and 2493 are discussed as a sequence.

Operation 2492 includes at least detecting a presence or an absence of an associated mobile communication device. In some embodiments operation 2492 is performed with at least detection circuitry 1629 (e.g., processing device attempting to detect signals from mobile device 50 through transceiver 435) configured for detecting a presence of a mobile communication device that is associated with the system Operation 2493 includes at least causing control circuitry to prevent operation of the engine responsive to detecting an absence of the associated mobile communication device. In some embodiments operation 2493 is performed with at least immobilization circuitry 1630 configured for causing the control circuitry to immobilize the system if the circuitry for detecting fails to detect the associated mobile communication device. For example, processing device 430 upon failing to detect signals from mobile device 50 via transceiver may access suppress circuitry 452 to suppress charging and ignition of ignition cables.

Some legacy vehicles that use a mechanical distributor or a legacy electronic distributor may be converted to practice some embodiments described herein. To facilitate this conversion, a kit may be provided that includes at least a new distributor (e.g. distributor 7 with at least engine position sensor (with at least a diametric magnet and two or more hall effect sensors) installed per FIG. 27), a coil pack (e.g. ignition coils 37) for each cylinder including wiring the appear like ignition cable but which are really multi-conductor wires (for aesthetics), and iridium spark plugs.

Figure 31:
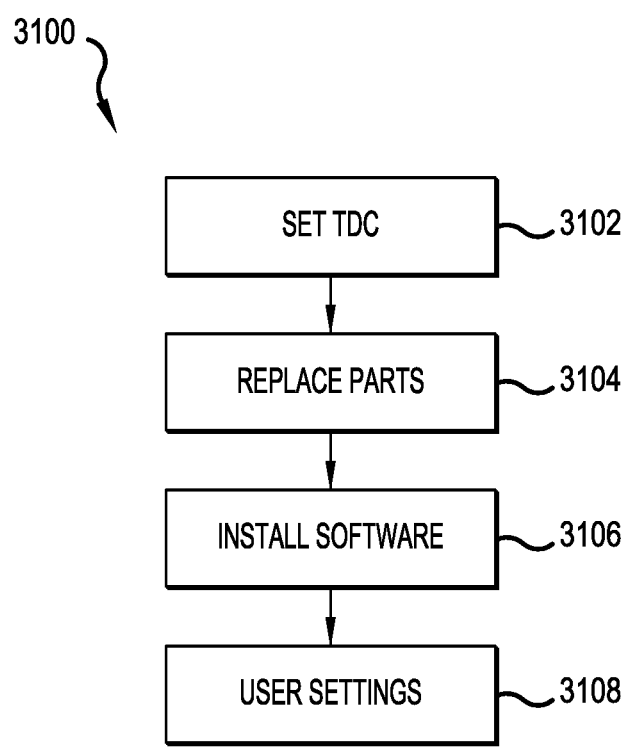
FIG. 31 is an flow chart illustrating an exemplary method, consistent with some embodiments.

Referencing FIG. 31, an installation method 3100 includes at least setting TDC (Process Block 3102). In some embodiments this includes at least disconnecting the battery and/or using factory settings for setting TDC for a specific vehicle type. Method 3100 further includes at least replacing parts (Process Block 3104). In some embodiments, this includes at least one of removing legacy distributor using vehicle-specific instructions, installing new distributor (e.g. distributor 7) using the vehicle-specific instructions, removing original spark plug wires and spark plug connectors, removing original spark plugs, installing replacement spark plugs (e.g. spark plug 4), or installing coil packs (e.g. ignition coils 37). Some vehicles have no mechanical advance or do not have an advance that is easy to access to lockout the advance. In these cases a kit may not contain a complete replacement distributor but rather a set that includes a distributor cap, a rotor, and lockout mechanism that can be adapted to these distributors.

Continuing with reference to FIG. 31, installation method 3100 further includes at least installing software (Process Block 3106). In some embodiments this includes at least one of using a phone app or PC-based software program to provide an interface (See e.g., FIGS. 13-15) or setting software or app to use a zero position as TDC (tells electronics that the engine is currently at TDC and will use it for the basis of all calculations). Method 3100 further includes at least entering user settings (Process Block 3108). In some embodiments a user may use the software or app interface to set various settings, perhaps including one or more of maximum RPM, advance curve types, authorization access to only start when a phone is present (see. e.g. FIGS. 13-15 and corresponding discussion). The vehicle may then be ready to drive.

Some additional embodiments are now discussed.

Embodiment 1: An electronic engine timing system comprising:
an engine position sensor that is configured to output electrical signals indicative of engine position in an engine firing cycle of an engine, the engine position sensor including at least:
a diametric magnet configured to be rotated by at least one of a rotatable distributor shaft or cam shaft; and
two or more hall effect sensors configured and positioned to sense diametric magnet position; and
the engine position sensor being configured at least via the diametric magnet and the two or more hall effect sensors to output the electrical signals indicative of engine position both when the engine is running and when the engine is not running;
sensor data receiving circuitry configured for receiving sensory input, including at least input from the engine position sensor; and
control circuitry configured to control firing of one or more cylinders of the engine, the control circuitry configured to control the firing at least in part by calculating one or more timing advance positions for one or more cylinders of the engine and by causing the one or more cylinders to fire according to the one or more calculated timing advance positions, the control circuitry further configured to calculate the one or more timing advance positions for the one or more cylinders separately from one another on a per cylinder basis based at least in part on input from the engine position sensor.

Embodiment 2: The electronic engine timing system of Embodiment 1, wherein the system contains only a single engine position sensor, the single engine position sensor including only a single diametric magnet and two or more hall effect sensors associated with the single diametric magnet.

Embodiment 3: The electronic engine timing system of any of embodiments 1 through 2, wherein the engine position sensor is configured to output electrical signals indicative of an engine position that correlates to a number of degrees out of 720 degrees with a tolerance of no greater than plus or minus 0.25 degrees.

Embodiment 4: The electronic engine timing system of any of embodiments 1 through 3, wherein the sensor data receiving circuitry is configured for sampling the output of the engine position sensor; and wherein the sensor data receiving circuitry is configured to sample the output of the engine position sensor with a frequency of at least 50,000 samples per second.

Embodiment 5: The electronic engine timing system of any of embodiments 1 through 4, wherein the sensor data receiving circuitry comprises:

sensory interrupt handling circuitry configured for handling sensory interrupts to obtain sensor data from one or more sensors.

Embodiment 6: The electronic engine timing system of any of embodiments 1 through 5, wherein the control circuitry comprises:

static table circuitry configured to calculate the one or more timing advance positions for a given cylinder of the one or more cylinders based at least in part on (1) a static table that includes at least an advance curve and based at least in part on (2) input from the engine position sensor.

Embodiment 7: The electronic engine timing system of embodiment 6, wherein the sensor data receiving circuitry is configured for receiving the output of the one or more knock sensors; and wherein the static table circuitry is further configured to additionally utilize input from one or more knock sensors to calculate the one or more timing advance positions for the one or more cylinders.

Embodiment 8: The electronic engine timing system of any of embodiments 6 or 7, wherein the control circuitry is configured to operate in a repeating loop and wherein the control circuitry comprises:

point calculation circuitry configured for utilizing the static table and input from the engine position sensor to repeatedly compute, within the repeating loop, a charge point and a fire point for the given cylinder;

charging circuitry configured for repeatedly charging, within the repeating loop, a ignition coil associated with the given cylinder if the given cylinder is at a charge point; and firing circuitry configured for repeatedly firing, within the repeating loop, the ignition coil associated with the given cylinder if the given cylinder is at a fire point.

Embodiment 9: The electronic engine timing system of any of embodiments 1 through 8, wherein the control circuitry comprises:

calculated formula circuitry configured to control firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders.

Embodiment 10: The electronic engine timing system of embodiment 9, wherein the calculated formula circuitry is configured to modify the advance curve of the table applicable to the given cylinder, the modification being over time responsive to one or more detected knocks within the given cylinder detected with the one or more knock sensors.

Embodiment 11: The electronic engine timing system of any of embodiments 9 through 10, wherein the system further comprises:

one or more sensors that include at least one of one or more knock sensors or one or more cylinder temperature sensors configured to sense temperature in individual cylinders of the one or more cylinders, wherein the sensor data receiving circuitry is configured for receiving the output of the one or more sensors; and wherein the calculated formula circuitry is configured to operate in a repeating loop and includes at least:

provisional calculation circuitry configured to repeatedly calculate, in the repeating loop, one or more provisional timing advance positions for the given cylinder if the given cylinder is at a detect point, the provisional calculation circuitry configured to perform the calculations of the one or more provisional timing advance positions based at least in part on a dynamic table and on input from the engine position sensor;

advance adjustment circuitry configured to repeatedly adjust, in the repeating loop, the one or more provisional timing advance positions for the given cylinder to derive one or more updated timing advance positions for the given cylinder based at least in part on input from the one or more sensors and the engine position sensor, the one or more updated timing advance positions including at least one or more charge points and one or more fire points for the given cylinder; and charging circuitry for repeatedly charging, within the repeating loop, an ignition coil associated with the given cylinder if the given cylinder is at one of the one or more charge points; and firing circuitry for repeatedly firing, within the repeating loop, the ignition coil associated with the given cylinder if the given cylinder is at one of the one or more fire points.

Embodiment 12: The electronic engine timing system of any of embodiments 1 through 11, wherein the control circuitry comprises:

ion-detection-based advance calculation circuitry configured to control firing of one or more cylinders of the engine at least in part by calculating one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the ion-detection-based advance calculation circuitry being configured to be operable with respect to the given cylinder of the one or more cylinders while the given cylinder is above a given temperature.

Embodiment 13: The electronic engine timing system of embodiment 12, wherein the ion-detection-based advance calculation circuitry further comprises:

conditional calculated formula circuitry configured to control firing of one or more cylinders of the engine at least in part by calculating the one or more timing advance positions for the given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders, wherein the calculated formula circuitry is configured to be operable with respect to the given cylinder of the one or more cylinders while the given cylinder is at one or more temperatures that are at least one of at or below the given temperature.

Embodiment 14: The electronic engine timing system of any of embodiments 12 through 13, wherein the ion-detection-based advance calculation circuitry is configured to modify the advance curve of the table, with respect to the given cylinder, over time responsive at least in part to knock detection via at least one of the ion sensor data or one or more knock sensors.

Embodiment 15: The electronic engine timing system of any of embodiments 12 through 14, wherein the system further comprises:

one or more spark plugs configured for providing the ion sensor data;

one or more sensors that include at least one of one or more knock sensors or one or more cylinder temperature sensors; and wherein the sensor data receiving circuitry is configured for receiving the ion sensor data and sensory input from the one or more sensors; and wherein the ion-detection-based advance calculation circuitry includes at least:

provisional calculation circuitry configured to repeatedly calculate, in the repeating loop, one or more provisional timing advance positions for the given cylinder if the given cylinder is at a detect point, the provisional calculation circuitry configured to perform the calculations based at least in part on a determination of a peak pressure position for the given cylinder based at least in part on ionic sensor data associated with the given cylinder and on sensor data from the engine position sensor;

advance adjustment circuitry configured to repeatedly adjust, in the repeating loop, the one or more provisional timing advance positions for the given cylinder to derive one or more updated timing advance positions for the given cylinder based at least in part on input from at least one of the one or more sensors or the ionic sensor data, the One or more updated timing advance positions including at least one or more charge points and one or more fire points for the given cylinder; and charging circuitry for repeatedly charging, in the repeating loop, an ignition coil associated with the given cylinder if the given cylinder is at one of the one or more charge points; and firing circuitry for repeatedly firing, in the repeating loop, the ignition coil associated with the given cylinder if the given cylinder is at a one of the one or more fire points.

Embodiment 16: The electronic engine timing system of any of embodiments 12 through 15, wherein the ion-detection-based advance calculation circuitry is configured to perform the calculating of the one or more timing advance positions for the given cylinder based at least in part on based at least in part on MAP sensor data associated with a MAP sensor.

Embodiment 17: The electronic engine timing system of any of embodiments 1 through 16, wherein the system further comprises:

one or more cylinder temperature sensors associated with the one or more cylinders, the individual cylinder temperature sensors of the one or more cylinder temperature sensors being disposed within and coupled with respective ones of the one or more cylinders and configured to transmit sensor data to control circuitry that is indicative of internal temperature for their respective ones of the one or more cylinders;

wherein the sensor data receiving circuitry is configured to handle sensory interrupts to obtain sensory input from the one or more cylinder temperature sensors; and wherein the control circuitry is configured to perform its calculation of the one or more timing advance positions based at least in part on input from the one or more cylinder temperature sensors.

Embodiment 18: The electronic timing system of embodiment 17, wherein the one or more cylinder temperature sensors include at least one or more thermistors coupled with one or more spark plugs associated with the one or more cylinders.

Embodiment 19: The electronic engine timing system of any of embodiments 1 through 18, wherein the system further comprises:

one or more cylinder pressure sensors associated with the one or more cylinders, the individual cylinder pressure sensors of the one or more cylinder pressure sensors being disposed within and coupled with respective ones of the one or more cylinders;

wherein the sensor data receiving circuitry is configured to handle sensory interrupts to obtain sensory input from the one or more cylinder pressure sensors; and wherein the control circuitry configured to calculate one or more timing advance positions for one or more cylinders of an engine is configured to perform its calculation of the one or more timing advance positions based at least in part on input from the one or more cylinder pressure sensors.

Embodiment 20: The electronic engine timing system of embodiment 19, wherein the one or more cylinder pressure sensors include at least one or more spark plugs configured to provide ion sensor data.

Embodiment 21: The electronic timing system of any of embodiments 1 through 20, further comprising:

an electronic coil pack configured to provide a single dedicated ignition coil for a given cylinder of the one or more cylinders; and wherein the control circuitry includes at least:

dedicated coil circuitry for controlling charging and firing of the given cylinder at least in part with a dedicated ignition coil.

Embodiment 22: The electronic engine timing system of any of embodiments 1 through 21, wherein the sensor data receiving circuitry is configured for receiving sensory input indicative of one or more temperatures of the one or more cylinders, and the system further comprises:

advance retarding circuitry for retarding the advance for a given cylinder of the one or more cylinders that is running hotter than at least one other cylinder of the one or more cylinders.

Embodiment 23: The electronic engine timing system of claim 1 through 22, wherein the control circuitry comprises:

first stage starting circuitry configured to calculate the one or more timing advance positions for the one or more cylinders based at least in part on (1) one or more static parameters and based at least in part on (2) input from the engine position sensor, the first stage starting circuitry configured to operate only when while the engine is being cranked during a start, wherein the first stage starting circuitry is configured to receive an engine position from the engine position sensor immediately upon being powered on.

Embodiment 24: The electronic engine timing system of embodiment 23, wherein the first stage starting circuitry further comprises:

cold start advancing circuitry for advancing the one or more cylinders responsive to a detection of a cold engine start condition.

Embodiment 25: The electronic engine timing system of any of embodiments 23 through 24, wherein the first stage starting circuitry further comprises:

hot engine retarding circuitry for retarding the advance of the one or more cylinders responsive to a detection of a hot engine start condition.

Embodiment 26: The electronic engine timing system of any of embodiments 1 through 25, wherein the system further comprises:

a wide band oxygen sensor in communication with an engine carburetor; and wide band oxygen sensor firmware configured for utilizing sensory input from the wide band oxygen sensor to detect at least a lean fuel condition above a threshold.

Embodiment 27: The electronic engine timing system of any of embodiments 1 through 26, wherein the system further comprises:

user input receiving circuitry for receiving user input via wireless signals received from an associated mobile communication device; and user input selection circuitry configured for selecting at least one aspect of engine timing based at least in part on the input received via the wireless signals received from the associated mobile communication device.

Embodiment 28: The electronic engine timing system of embodiment 27, wherein the user input selection circuitry is configured to select at least one of:

circuitry for causing control circuitry to calculate one or more timing advance positions for one or more cylinders of an engine at least in part with a static table;

circuitry for causing control circuitry to calculate one or more timing advance positions for one or more cylinders of an engine at least in part with a dynamic table; or circuitry for causing control circuitry to calculate one or more timing advance positions for one or more cylinders of an engine at least in part with ion sensing circuitry.

Embodiment 29: The electronic engine timing system of any of embodiments 27 through 28, wherein the user input selection circuitry is configured to cause control circuitry to select, responsive to the input received by the wireless signals, at least one of:

an specified RPM limit;
a specified coil dwell time;
a specified distributor rotation direction;
a specified firing order;
a map sensor for load detection;
engine coolant temperature;
engine oil temperature;
spark output for Insulated Gate Bi-Polare Transistor ("IGT") type coils
spark output high power (ground switched);
a maximum advance;
a base timing setting;
an RPM for reaching maximum advance; or
a starting advance.

Embodiment 30: The electronic engine timing system of any of embodiments 1 through 29, wherein the system further comprises:

detection circuitry configured for detecting a presence of a mobile communication device that is associated with the system; and immobilization circuitry configured for causing the control circuitry to immobilize the system if the circuitry for detecting fails to detect the associated mobile communication device.

Embodiment 31: The electronic engine timing system of any of embodiments 1 through 30, wherein the system further comprises:

square wave output circuitry configured to output one or more square waves indicative of at least one of camshaft position or crankshaft position.

Embodiment 32: A method preformed with an electronic engine timing system, the method comprising:

generating engine position data at least in part by calculating distributor shaft position with an engine position sensor that is configured to output electrical signals indicative of engine position in an engine firing cycle of an engine both when the engine is running and when the engine is not running and that includes at least:

a diametric magnet configured to be rotated by at least one of a rotatable distributor shaft or cam shaft; and two or more hall effect sensors configured and positioned to sense diametric magnet position;

receiving sensory input that includes at least the generated engine position data;

controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor.

Embodiment 33: The method of embodiment 32, wherein the generating engine position data is performed at least in part with only a single engine position sensor that includes only a single diametric magnet and two or more hall effect sensors associated with the single diametric magnet.

Embodiment 34: The method of any of embodiments 32 through 33, wherein the generating engine position data is performed by operating an engine position sensor to output electrical signals indicative of an engine position that correlates to a number of degrees out of 720 degrees with a tolerance of no greater than plus or minus 0.25 degrees.

Embodiment 35: The method of any of embodiments 32 through 34, wherein the receiving sensory input includes at least sampling the output of the engine position sensor with a frequency of at least 50,000 samples per second.

Embodiment 36: The method of any of embodiments 32 through 35, wherein the receiving sensory input that includes at least the generated engine position data comprises:

handling sensory interrupts to obtain sensor data from one or more sensors.

Embodiment 37: The method of any of embodiments 32 through 36, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions comprises:

controlling the firing of one or more cylinders of the engine at least in part by calculating the one or more timing advance positions for a given cylinder of the one or more cylinders based at least in part on (1) a static table that includes at least an advance curve and based at least in part on (2) input from the engine position sensor.

Embodiment 38: The method of embodiment 37, wherein the receiving sensory input that includes at least the generated engine position data comprises:

receiving the output of one or more knock sensors; and the controlling the firing of one or more cylinders of the engine at least in part by calculating the one or more timing advance positions for a given cylinder of the one or more cylinders based at least in part on (1) a static table that includes at least an advance curve and based at least in part on (2) input from the engine position sensor further includes at least:

additionally utilizing input from one or more knock sensors to calculate the one or more timing advance positions.

Embodiment 39: The method of any of embodiments 37 through 38, wherein the controlling the firing of one or more cylinders of the engine at least in part by calculating the one or more timing advance positions for a given cylinder of the one or more cylinders based at least in part on (1) a static table that includes at least an advance curve and based at least in part on (2) input from the engine position sensor comprises:

performing the controlling in a repeating loop, including at least:

utilizing the static table and input from the engine position sensor to repeatedly compute, within a repeating loop, a charge point and a fire point for the given cylinder;

repeatedly charging, within the repeating loop, an ignition coil associated with the given cylinder if the given cylinder is at a charge point; and repeatedly firing, within the repeating loop, the ignition coil associated with the given cylinder if the given cylinder is at a fire point.

Embodiment 40: The method of any of embodiments 32 through 39, wherein the wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions comprises:

controlling the firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders.

Embodiment 41: The method of embodiment 40, wherein the controlling the firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders comprises:

making one or more modifications to the advance curve of the table applicable to the given cylinder, the one or more modifications being made over time responsive to one or more detected knocks within the given cylinder detected with the one or more knock sensors.

Embodiment 42: The method of any of embodiments 40 through 41, wherein the receiving sensory input that includes at least the generated engine position data comprises:

receiving the output of at least one of one sensors that include at least one of one or more knock sensors or one or more cylinder temperature sensors configured to sense temperature in individual cylinders of the one or more cylinders; and wherein the controlling the firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders includes at least:

performing the controlling in a repeating loop, including at least:

repeatedly calculating, in the repeating loop, one or more provisional timing advance positions for the given cylinder if the given cylinder is at a detect point, the repeated calculating of the one or more provisional timing advance positions being based at least in part on a dynamic table and on input from the engine position sensor;

repeatedly adjusting, in the repeating loop, the one or more provisional timing advance positions for the given cylinder to derive one or more updated timing advance positions for the given cylinder based at least in part on input from the one or more sensors and the engine position sensor, the one or more updated timing advance position including at least one or more charge points and one or more fire points for the given cylinder; and repeatedly charging, within the repeating loop, an ignition coil associated with the given cylinder if the given cylinder is at one of the one or more charge points; and repeatedly firing, within the repeating loop, the ignition coil associated with the given cylinder if the given cylinder is at one of the one or more fire points.

Embodiment 43: The method of any of embodiments 32 through 42, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions comprises:

controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature.

Embodiment 44: The method of embodiment 43, wherein the controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature comprises:

if the given cylinder is at or below the given temperature, then calculating the one or more timing advance positions for the given cylinder based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders.

Embodiment 45: The method of any of embodiments 43 through 44, wherein the controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature comprises:

making one or more modifications of the advance curve of the table, with respect to the given cylinder, over time responsive at least in part to knock detection via at least one of the ion sensor data or one or more knock sensors.

Embodiment 46: The method of any of embodiments 43 through 45, wherein the receiving sensory input that includes at least the generated engine position data comprises:

receiving ion sensor data via one or more spark plugs configured for providing the ion sensor data; and receiving data from one or more sensors that include at least one of one or more knock sensors or one or more cylinder temperature sensors; and wherein the controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature includes at least:

performing the controlling in a repeating loop, including at least:

repeatedly calculating, in the repeating loop, one or more provisional timing advance positions for the given cylinder if the given cylinder is at a detect point, the repeated calculating being performed based at least in part on a determination of a peak pressure position for the given cylinder based at least in part on ionic sensor data associated with the given cylinder and on sensor data from the engine position sensor;

repeatedly adjusting, in the repeating loop, the one or more provisional timing advance positions for the given cylinder to derive a one or more updated timing advance positions for the given cylinder based at least in part on input from at least one of the one or more sensors or the ionic sensor data, the one or more updated timing advance positions including at least one or more charge points and one or more fire points for the given cylinder; and repeatedly charging, in the repeating loop, an ignition coil associated with the given cylinder if the given cylinder is at one of the one or more charge points; and repeatedly firing, in the repeating loop, the ignition coil associated with the given cylinder if the given cylinder is at a one of the one or more fire points.

Embodiment 47: The method of any of embodiments 43 through 46, wherein the wherein the controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature includes at least:

utilizing MAP sensor data received via one or more MAP sensors in the calculating the one or more timing advance positions for the given cylinder.

Embodiment 48: The method of any of embodiments 32 through 47, wherein the receiving sensory input that includes at least the generated engine position data comprises:

receiving sensory input from one or more cylinder temperature sensors associated with the one or more cylinders, the individual cylinder temperature sensors of the one or more cylinder temperature sensors being disposed within and coupled with respective ones of the one or more cylinders and configured to transmit sensor data indicative of internal temperature for their respective ones of the one or more cylinders, wherein the receiving sensory input includes at least handling sensory interrupts to obtain sensory input from the one or more cylinder temperature sensors; and wherein the controlling the firing of one or more cylinders of the engine, the controlling including at least controlling the firing at least in part by calculating one or more timing advance positions for one or more cylinders of the engine includes at least performing the calculations with input from the one or more cylinder temperature sensors associated with the one or more cylinders.

Embodiment 49: The method of embodiment 48, wherein the receiving sensory input from one or more cylinder temperature sensors associated with the one or more cylinders comprises:

receiving sensory input from one or more thermistors coupled with one or more spark plugs associated with the one or more cylinders.

Embodiment 50: The method of any of embodiments 32 through 49, wherein the receiving sensory input that includes at least the generated engine position data comprises:

receiving sensory input from one or more cylinder pressure sensors associated with the one or more cylinders, the individual cylinder pressure sensors of the one or more cylinder pressure sensors being disposed within and coupled with respective ones of the one or more cylinders, wherein the receiving sensory input includes at least handling sensory interrupts to obtain sensory input from the one or more cylinder pressure sensors; and wherein the controlling the firing of one or more cylinders of the engine includes at least controlling the firing at least in part by calculating one or more timing advance positions for one or more cylinders of the engine includes at least performing the calculations with input from the one or more cylinder pressure sensors associated with the one or more cylinders.

Embodiment 51: The method of embodiment 50, wherein the receiving sensory input from one or more one or more cylinder pressure sensors associated with the one or more cylinders comprises:

receiving sensory input from the one or more cylinder pressure sensors that include at least one or more spark plugs configured to provide ion sensor data.

Embodiment 52: The method of any of embodiments 32 through 51, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor comprises:

controlling a charging and a firing of a given cylinder of the one or more cylinders at least in part with a dedicated ignition coil.

Embodiment 53: The method of any of embodiments 32 through 52, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor comprises:

retarding the advance for a given cylinder of the one or more cylinders that is running hotter than at least one other cylinder of the one or more cylinders, the retarding based at least in part on sensory input indicative of the temperature of the given cylinder.

Embodiment 54: The method of any of embodiments 32 through 53, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor comprises:

if the engine is being cranked from a start, then calculating the one or more timing advance positions for the one or more cylinders based at least in part on (1) one or more static parameters and based at least in part on (2) input from the engine position sensor, including at least receiving input from the engine position sensor immediately upon the engine being power on.

Embodiment 55: The method of embodiment 54, wherein the calculating the one or more timing advance positions for the one or more cylinders based at least in part on (1) one or more static parameters and based at least in part on (2) input from the engine position sensor, including at least receiving input from the engine position sensor immediately upon the engine being power on comprises:

detecting a cold engine start condition; and advancing the one or more cylinders responsive to a detection of a cold engine start condition.

Embodiment 56: The method of any of embodiments 54 through 55, wherein the calculating the one or more timing advance positions for the one or more cylinders based at least in part on (1) one or more static parameters and based at least in part on (2) input from the engine position sensor, including at least receiving input from the engine position sensor immediately upon the engine being power on comprises:

detecting a hot engine start condition; and retarding the advance of the one or more cylinders responsive to a detection of a hot engine start condition.

Embodiment 57: The method of any of embodiments 32 through 56, wherein the controlling the firing of one or more cylinders of the engine, the controlling including at least controlling the firing at least in part by calculating one or more timing advance positions for one or more cylinders of the engine includes at least:

utilizing sensory input from the wide band oxygen sensor to detect at least a lean fuel condition above a threshold.

Embodiment 58: The method of any of embodiments 32 through 57, wherein the method further comprises:

receiving user input via wireless signals received from an associated mobile communication device; and selecting at least one aspect of engine timing based at least in part on the input received via the wireless signals received from the associated mobile communication device.

Embodiment 59: The method of embodiment 58, wherein the selecting at least one aspect of engine timing based at least in part on the input received via the wireless signals received from the associated mobile communication device comprises:

selecting, responsive to the input received by the wireless signals, at least one of:

a first mode for calculating one or more timing advance positions for one or more cylinders of an engine at least in part with a static table;

a second mode for calculating one or more timing advance positions for one or more cylinders of an engine at least in part with a dynamic table; or a third mode for calculating one or more timing advance positions for one or more cylinders of an engine at least in part with ion sensing circuitry.

Embodiment 60: The method of any of embodiments 58 through 59, wherein the selecting at least one aspect of engine timing based at least in part on the input received via the wireless signals received from the associated mobile communication device comprises:

selecting, responsive to the input received by the wireless signals, one or more of:

a specified RPM limit;

a specified coil dwell time;

a specified distributor rotation direction;

a specified firing order;

a map sensor for load detection;
engine coolant temperature;
engine oil temperature;
spark output IGT type coils
spark output high power (ground switched);
a maximum advance;
a base timing setting;
an RPM for reaching maximum advance; or
a starting advance.

Embodiment 61: The method of any of embodiments 32 through 60, wherein the controlling the firing of one or more cylinders of the engine, the controlling including at least controlling the firing at least in part by calculating one or more timing advance positions for one or more cylinders of the engine includes at least comprises:

detecting a presence or an absence of an associated mobile communication device; and causing control circuitry to prevent operation of the engine responsive to detecting an absence of the associated mobile communication device.

Embodiment 62: The method of any of embodiments 32 through 61, wherein the controlling the firing of one or more cylinders of the engine, the controlling including at least controlling the firing at least in part by calculating one or more timing advance positions for one or more cylinders of the engine includes at least comprises:

outputting one or more square waves indicative of at least one of camshaft position or crankshaft position.

It will be understood by those skilled in the art that the terminology used in this specification and in the claims is "open" in the sense that the terminology is open to additional elements not enumerated. For example, the words "includes" should be interpreted to mean "including at least" and so on. Even if "includes at least" is used sometimes and "includes" is used other times, the meaning is the same: includes at least. In addition, articles such as "a" or "the" should be interpreted as not referring to a specific number, such as one, unless explicitly indicated. At times a convention of "at least one of A, B, or C" is used, the intent is that this language includes any of A alone, B alone, C alone, A and B, B and C, A and C, all of A, B, and C, or any combination thereof. The same is indicated by the conventions "one or more of A, B, or C." Similarly, the phrase "A, B, and/or C" is intended to include any of A alone, B alone, C alone, A and B, B and C, A and C, all of A, B, and C or any combination thereof.

And as previously indicated elements, components, or operations should not be regarded as essential unless they are so explicitly described. The teachings contained herein may be adapted to a variety of embodiments arranged and composed in a wide variety of ways.

The above description of various embodiments is intended to be illustrative not exhaustive and is not intended to limit this disclosure, its application, or uses. Those skilled in the art will be able to imagine embodiments not described but that are consistent with the principles and teachings described herein. Therefore, the above description of exemplary embodiments is not intended to limit the scope of this disclosure, which should be defined only in accordance with the following claims and equivalents thereof.

I claim:

1. An electronic engine timing system comprising:
    an engine position sensor that is configured to output electrical signals indicative of engine position in an engine firing cycle of an engine, the engine position sensor including at least:
        a diametric magnet configured to be rotated by at least one of a rotatable distributor shaft or cam shaft; and
        two or more hall effect sensors configured and positioned to sense diametric magnet position; and
        the engine position sensor being configured at least via the diametric magnet and the two or more hall effect sensors to output the electrical signals indicative of engine position both when the engine is running and when the engine is not running;
    sensor data receiving circuitry configured for receiving sensory input, including at least input from the engine position sensor; and
    control circuitry configured to control firing of one or more cylinders of the engine, the control circuitry configured to control the firing at least in part by calculating one or more timing advance positions for one or more cylinders of the engine and by causing the one or more cylinders to fire according to the one or more calculated timing advance positions, the control circuitry further configured to calculate the one or more timing advance positions for the one or more cylinders separately from one another on a per cylinder basis based at least in part on input from the engine position sensor.

2. The electronic engine timing system of claim 1, wherein the system contains only a single engine position sensor, the single engine position sensor including only a single diametric magnet and two or more hall effect sensors associated with the single diametric magnet.

3. The electronic engine timing system of claim 1, wherein the engine position sensor is configured to output electrical signals indicative of an engine position that correlates to a number of degrees out of 720 degrees with a tolerance of no greater than plus or minus 0.25 degrees.

4. The electronic engine timing system of claim 1, wherein the sensor data receiving circuitry is configured for sampling the output of the engine position sensor; and
    wherein the sensor data receiving circuitry is configured to sample the output of the engine position sensor with a frequency of at least 50,000 samples per second.

5. The electronic engine timing system of claim 1, wherein the sensor data receiving circuitry comprises:
    sensory interrupt handling circuitry configured for handling sensory interrupts to obtain sensor data from one or more sensors.

6. The electronic engine timing system of claim 1, wherein the control circuitry comprises:
    static table circuitry configured to calculate the one or more timing advance positions for a given cylinder of the one or more cylinders based at least in part on (1) a static table that includes at least an advance curve and based at least in part on (2) input from the engine position sensor.

7. The electronic engine timing system of claim 6, wherein the sensor data receiving circuitry is configured for receiving the output of the one or more knock sensors; and
    wherein the static table circuitry is further configured to additionally utilize input from one or more knock sensors to calculate the one or more timing advance positions for the one or more cylinders.

8. The electronic engine timing system of claim 6, wherein the control circuitry is configured to operate in a repeating loop and wherein the control circuitry comprises:
    point calculation circuitry configured for utilizing the static table and input from the engine position sensor to repeatedly compute, within the repeating loop, a charge point and a fire point for the given cylinder;

charging circuitry configured for repeatedly charging, within the repeating loop, a ignition coil associated with the given cylinder if the given cylinder is at a charge point; and firing circuitry configured for repeatedly firing, within the repeating loop, the ignition coil associated with the given cylinder if the given cylinder is at a fire point.

9. The electronic engine timing system of claim 1, wherein the control circuitry comprises:

calculated formula circuitry configured to control firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders.

10. The electronic engine timing system of claim 9, wherein the calculated formula circuitry is configured to modify the advance curve of the table applicable to the given cylinder, the modification being over time responsive to one or more detected knocks within the given cylinder detected with the one or more knock sensors.

11. The electronic engine timing system of claim 9, wherein the system further comprises:

one or more sensors that include at least one of one or more knock sensors or one or more cylinder temperature sensors configured to sense temperature in individual cylinders of the one or more cylinders, wherein the sensor data receiving circuitry is configured for receiving the output of the one or more sensors; and wherein the calculated formula circuitry is configured to operate in a repeating loop and includes at least:

provisional calculation circuitry configured to repeatedly calculate, in the repeating loop, one or more provisional timing advance positions for the given cylinder if the given cylinder is at a detect point, the provisional calculation circuitry configured to perform the calculations of the one or more provisional timing advance positions based at least in part on a dynamic table and on input from the engine position sensor;

advance adjustment circuitry configured to repeatedly adjust, in the repeating loop, the one or more provisional timing advance positions for the given cylinder to derive one or more updated timing advance positions for the given cylinder based at least in part on input from the one or more sensors and the engine position sensor, the one or more updated timing advance position including at least one or more charge points and one or more fire points for the given cylinder; and charging circuitry for repeatedly charging, within the repeating loop, an ignition coil associated with the given cylinder if the given cylinder is at one of the one or more charge points; and firing circuitry for repeatedly firing, within the repeating loop, the ignition coil associated with the given cylinder if the given cylinder is at one of the one or more fire points.

12. The electronic engine timing system of claim 1, wherein the control circuitry comprises:

ion-detection-based advance calculation circuitry configured to control firing of one or more cylinders of the engine at least in part by calculating one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the ion-detection-based advance calculation circuitry being configured to be operable with respect to a given cylinder of the one or more cylinders while the given cylinder is above a given temperature.

13. The electronic engine timing system of claim 12, wherein the ion-detection-based advance calculation circuitry further comprises:

conditional calculated formula circuitry configured to control firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders, wherein the calculated formula circuitry is configured to be operable with respect to the given cylinder of the one or more cylinders while the given cylinder is at one or more temperatures that are at least one of at or below the given temperature.

14. The electronic engine timing system of claim 13, wherein the ion-detection-based advance calculation circuitry is configured to modify the advance curve of the table, with respect to the given cylinder, over time responsive at least in part to knock detection via at least one of the ion sensor data or one or more knock sensors.

15. The electronic engine timing system of claim 12, wherein the system further comprises:

one or more spark plugs configured to providing the ion sensor data;

one or more sensors that include at least one of one or more knock sensors or one or more cylinder temperature sensors; and wherein the sensor data receiving circuitry is configured for receiving the ion sensor data and sensory input from the one or more sensors; and wherein the ion-detection-based advance calculation circuitry includes at least:

provisional calculation circuitry configured to repeatedly calculate, in the repeating loop, one or more provisional timing advance positions for the given cylinder if the given cylinder is at a detect point, the provisional calculation circuitry configured to perform the calculations based at least in part on a determination of a peak pressure position for the given cylinder based at least in part on ionic sensor data associated with the given cylinder and on sensor data from the engine position sensor;

advance adjustment circuitry configured to repeatedly adjust, in the repeating loop, the one or more provisional timing advance positions for the given cylinder to derive a one or more updated timing advance positions for the given cylinder based at least in part on input from at least one of the one or more sensors or the ionic sensor data, the One or more updated timing advance positions including at least one or more charge points and one or more fire points for the given cylinder; and charging circuitry for repeatedly charging, in the repeating loop, an ignition coil associated with the given cylinder if the given cylinder is at one of the one or more charge points; and firing circuitry for repeatedly firing, in the repeating loop, the ignition coil associated with the given cylinder if the given cylinder is at a one of the one or more fire points.

16. The electronic engine timing system of claim 12, wherein the ion-detection-based advance calculation circuitry is configured to perform the calculating of the one or more timing advance positions for the given cylinder based at least in part on based at least in part on MAP sensor data associated with a MAP sensor.

17. The electronic engine timing system of claim 1, wherein the system further comprises:
   one or more cylinder temperature sensors associated with the one or more cylinders, the individual cylinder temperature sensors of the one or more cylinder temperature sensors being disposed within and coupled with respective ones of the one or more cylinders and configured to transmit sensor data to control circuitry that is indicative of internal temperature for their respective ones of the one or more cylinders;
   wherein the sensor data receiving circuitry is configured to handle sensory interrupts to obtain sensory input from the one or more cylinder temperature sensors; and
   wherein the control circuitry is configured to perform its calculation of the one or more timing advance positions based at least in part on input from the one or more cylinder temperature sensors.

18. The electronic engine timing system of claim 17, wherein the one or more cylinder temperature sensors include at least one or more thermistors coupled with one or more spark plugs associated with the one or more cylinders.

19. The electronic engine timing system of claim 1, wherein the system further comprises:
   one or more cylinder pressure sensors associated with the one or more cylinders, the individual cylinder pressure sensors of the one or more cylinder pressure sensors being disposed within and coupled with respective ones of the one or more cylinders;
   wherein the sensor data receiving circuitry is configured to handle sensory interrupts to obtain sensory input from the one or more cylinder pressure sensors; and
   wherein the control circuitry configured to calculate one or more timing advance positions for one or more cylinders of an engine is configured to perform its calculation of the one or more timing advance positions based at least in part on input from the one or more cylinder pressure sensors.

20. The electronic engine timing system of claim 19, wherein the one or more cylinder pressure sensors include at least one or more spark plugs configured to provide ion sensor data.

21. The electronic engine timing system of claim 1, further comprising:
   an electronic coil pack configured to provide a single dedicated ignition coil for a given cylinder of the one or more cylinders; and
   wherein the control circuitry includes at least:
   dedicated coil circuitry for controlling charging and firing of the given cylinder at least in part with a dedicated ignition coil.

22. The electronic engine timing system of claim 1, wherein the sensor data receiving circuitry is configured for receiving sensory input indicative of one or more temperatures of the one or more cylinders, and the system further comprises:
   advance retarding circuitry for retarding the advance for a given cylinder of the one or more cylinders that is running hotter than at least one other cylinder of the one or more cylinders.

23. The electronic engine timing system of claim 1, wherein the control circuitry comprises:
   first stage starting circuitry configured to calculate the one or more timing advance positions for the one or more cylinders based at least in part on (1) one or more static parameters and based at least in part on (2) input from the engine position sensor, the first stage starting circuitry configured to operate only when while the engine is being cranked during a start, wherein the first stage starting circuitry is configured to receive an engine position from the engine position sensor immediately upon being powered on.

24. The electronic engine timing system of claim 23, wherein the first stage starting circuitry further comprises:
   cold start advancing circuitry for advancing the one or more cylinders responsive to a detection of a cold engine start condition.

25. The electronic engine timing system of claim 23, wherein the first stage starting circuitry further comprises:
   hot engine retarding circuitry for retarding the advance of the one or more cylinders responsive to a detection of a hot engine start condition.

26. The electronic engine timing system of claim 1, wherein the system further comprises:
   a wide band oxygen sensor in communication with an engine carburetor; and
   wide band oxygen sensor firmware configured for utilizing sensory input from the wide band oxygen sensor to detect at least a lean fuel condition above a threshold.

27. The electronic engine timing system of claim 1, wherein the system further comprises:
   user input receiving circuitry for receiving user input via wireless signals received from an associated mobile communication device; and
   user input selection circuitry configured for selecting at least one aspect of engine timing based at least in part on the input received via the wireless signals received from the associated mobile communication device.

28. The electronic engine timing system of claim 27, wherein the user input selection circuitry is configured to select at least one of:
   circuitry for causing control circuitry to calculate one or more timing advance positions for one or more cylinders of an engine at least in part with a static table;
   circuitry for causing control circuitry to calculate one or more timing advance positions for one or more cylinders of an engine at least in part with a dynamic table; or
   circuitry for causing control circuitry to calculate one or more timing advance positions for one or more cylinders of an engine at least in part with ion sensing circuitry.

29. The electronic engine timing system of claim 27, wherein the user input selection circuitry is configured to cause control circuitry to select, responsive to the input received by the wireless signals, at least one of:
   an specified RPM limit;
   a specified coil dwell time;
   a specified distributor rotation direction;
   a specified firing order;

a map sensor for load detection;
engine coolant temperature;
engine oil temperature;
spark output for Insulated Gate Bi-Polare Transistor ("IGT") type coils
spark output high power (ground switched);
a maximum advance;
a base timing setting;
an RPM for reaching maximum advance; or
a starting advance.

30. The electronic engine timing system of claim 1, wherein the system further comprises:
    detection circuitry configured for detecting a presence of a mobile communication device that is associated with the system; and
    immobilization circuitry configured for causing the control circuitry to immobilize the system if the circuitry for detecting fails to detect the associated mobile communication device.

31. The electronic engine timing system of claim 1, wherein the system further comprises:
    square wave output circuitry configured to output one or more square waves indicative of at least one of camshaft position or crankshaft position.

32. A method preformed with an electronic engine timing system, the method comprising:
    generating engine position data at least in part by calculating distributor shaft position with an engine position sensor that is configured to output electrical signals indicative of engine position in an engine firing cycle of an engine both when the engine is running and when the engine is not running and that includes at least:
        a diametric magnet configured to be rotated by at least one of a rotatable distributor shaft or cam shaft; and
        two or more hall effect sensors configured and positioned to sense diametric magnet position;
    receiving sensory input that includes at least the generated engine position data;
    controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor.

33. The method of claim 32, wherein the generating engine position data is performed at least in part with only a single engine position sensor, the single engine position sensor that includes only a single diametric magnet and two or more hall effect sensors associated with the single diametric magnet.

34. The method of claim 32, wherein the generating engine position data is performed by operating an engine position sensor to output electrical signals indicative of an engine position that correlates to a number of degrees out of 720 degrees with a tolerance of no greater than plus or minus 0.25 degrees.

35. The method of claim 32, wherein the receiving sensory input includes at least sampling the output of the engine position sensor with a frequency of at least 50,000 samples per second.

36. The method of claim 32, wherein the receiving sensory input that includes at least the generated engine position data comprises:
    handling sensory interrupts to obtain sensor data from one or more sensors.

37. The method of claim 32, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions comprises:
    controlling the firing of one or more cylinders of the engine at least in part by calculating the one or more timing advance positions for a given cylinder of the one or more cylinders based at least in part on (1) a static table that includes at least an advance curve and based at least in part on (2) input from the engine position sensor.

38. The method of claim 37, wherein the receiving sensory input that includes at least the generated engine position data comprises:
    receiving the output of one or more knock sensors; and
    the controlling the firing of one or more cylinders of the engine at least in part by calculating the one or more timing advance positions for a given cylinder of the one or more cylinders based at least in part on (1) a static table that includes at least an advance curve and based at least in part on (2) input from the engine position sensor further includes at least:
    additionally utilizing input from one or more knock sensors to calculate the one or more timing advance positions.

39. The method of claim 37, wherein the controlling the firing of one or more cylinders of the engine at least in part by calculating the one or more timing advance positions for a given cylinder of the one or more cylinders based at least in part on (1) a static table that includes at least an advance curve and based at least in part on (2) input from the engine position sensor comprises:
    performing the controlling in a repeating loop, including at least:
        utilizing the static table and input from the engine position sensor to repeatedly compute, within a repeating loop, a charge point and a fire point for the given cylinder;
        repeatedly charging, within the repeating loop, an ignition coil associated with the given cylinder if the given cylinder is at a charge point; and
        repeatedly firing, within the repeating loop, the ignition coil associated with the given cylinder if the given cylinder is at a fire point.

40. The method of claim 32, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions comprises:
    controlling the firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders.

41. The method of claim 40, wherein the controlling the firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders comprises:
 making one or more modifications to the advance curve of the table applicable to the given cylinder, the one or more modifications being made over time responsive to one or more detected knocks within the given cylinder detected with the one or more knock sensors.

42. The method of claim 40, wherein the receiving sensory input that includes at least the generated engine position data comprises:
 receiving the output of at least one of one sensors that include at least one of one or more knock sensors or one or more cylinder temperature sensors configured to sense temperature in individual cylinders of the one or more cylinders; and
 wherein the controlling the firing of one or more cylinders of the engine at least in part by calculating the one or more timing advance positions for a given cylinder of the one or more cylinders based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders includes at least:
  performing the controlling in a repeating loop, including at least:
   repeatedly calculating, in the repeating loop, one or more provisional timing advance positions for the given cylinder if the given cylinder is at a detect point, the repeated calculating of the one or more provisional timing advance positions being based at least in part on a dynamic table and on input from the engine position sensor;
   repeatedly adjusting, in the repeating loop, the one or more provisional timing advance positions for the given cylinder to derive one or more updated timing advance positions for the given cylinder based at least in part on input from the one or more sensors and the engine position sensor, the one or more updated timing advance position including at least one or more charge points and one or more fire points for the given cylinder; and
   repeatedly charging, within the repeating loop, an ignition coil associated with the given cylinder if the given cylinder is at one of the one or more charge points; and
   repeatedly firing, within the repeating loop, the ignition coil associated with the given cylinder if the given cylinder is at one of the one or more fire points.

43. The method of claim 32, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions comprises:
 controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature.

44. The method of claim 43, wherein the controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature comprises:
 if the given cylinder is at or below the given temperature, then calculating the one or more timing advance positions for the given cylinder based at least in part on (1) a dynamic table that includes at least an advance curve, (2) input from the engine position sensor, and (3) input from at least one of one or more knock sensors or one or more cylinder temperature sensors configured to sense temperature in individual cylinders of the one or more cylinders.

45. The method of claim 44, wherein the controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature comprises:
 making one or more modifications of the advance curve of the table, with respect to the given cylinder, over time responsive at least in part to knock detection via at least one of the ion sensor data or one or more knock sensors.

46. The method of claim 43, wherein the receiving sensory input that includes at least the generated engine position data comprises:
 receiving ion sensor data via one or more spark plugs configured for providing the ion sensor data; and
 receiving data from one or more sensors that include at least one of one or more knock sensors or one or more cylinder temperature sensors; and
 wherein the controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature includes at least: performing the controlling in a repeating loop, including at least:
repeatedly calculating, in the repeating loop, one or more provisional timing advance positions for the given cylinder if the given cylinder is at a detect point, the repeated calculating being performed based at least in part on a determination of a peak pressure position for the given cylinder based at least in part on ionic sensor data associated with the given cylinder and on sensor data from the engine position sensor;
repeatedly adjusting, in the repeating loop, the one or more provisional timing advance positions for the given cylinder to derive a one or more updated timing advance positions for the given cylinder based at least in part on input from at least one of the one or more sensors or the ionic sensor data, the one or more updated timing advance positions including at least one or more charge points and one or more fire points for the given cylinder; and
repeatedly charging, in the repeating loop, an ignition coil associated with the given cylinder if the given cylinder is at one of the one or more charge points; and
repeatedly firing, in the repeating loop, the ignition coil associated with the given cylinder if the given cylinder is at a one of the one or more fire points.

47. The method of claim 43, wherein the controlling the firing of one or more cylinders of the engine at least in part by calculating the one or more timing advance positions for a given cylinder of the one or more cylinders based at least in part on (1) ion sensor data indicative one or more pressures within the given cylinder, (2) input from the engine position sensor, and (3) input from at least one of one or more knock sensors or one or more cylinder temperature sensors, the calculating being performed with respect to a given cylinder of the one or more cylinders while the given cylinder is above a given temperature includes at least:
utilizing MAP sensor data received via one or more MAP sensors in the calculating the one or more timing advance positions for the given cylinder.

48. The method of claim 32, wherein the receiving sensory input that includes at least the generated engine position data comprises:
receiving sensory input from one or more cylinder temperature sensors associated with the one or more cylinders, the individual cylinder temperature sensors of the one or more cylinder temperature sensors being disposed within and coupled with respective ones of the one or more cylinders and configured to transmit sensor data indicative of internal temperature for their respective ones of the one or more cylinders, wherein the receiving sensory input includes at least handling sensory interrupts to obtain sensory input from the one or more cylinder temperature sensors; and
wherein the controlling the firing of one or more cylinders of the engine, the controlling including at least controlling the firing at least in part by calculating one or more timing advance positions for one or more cylinders of the engine includes at least performing the calculations with input from the one or more cylinder temperature sensors associated with the one or more cylinders.

49. The method of claim 48, wherein the receiving sensory input from one or more cylinder temperature sensors associated with the one or more cylinders comprises:
receiving sensory input from one or more thermistors coupled with one or more spark plugs associated with the one or more cylinders.

50. The method of claim 32, wherein the receiving sensory input that includes at least the generated engine position data comprises:
receiving sensory input from one or more cylinder pressure sensors associated with the one or more cylinders, the individual cylinder pressure sensors of the one or more cylinder pressure sensors being disposed within and coupled with respective ones of the one or more cylinders, wherein the receiving sensory input includes at least handling sensory interrupts to obtain sensory input from the one or more cylinder pressure sensors; and
wherein the controlling the firing of one or more cylinders of the engine includes at least controlling the firing at least in part by calculating one or more timing advance positions for one or more cylinders of the engine includes at least performing the calculations with input from the one or more cylinder pressure sensors associated with the one or more cylinders.

51. The method of claim 50, wherein the receiving sensory input from one or more one or more cylinder pressure sensors associated with the one or more cylinders comprises:
receiving sensory input from the one or more cylinder pressure sensors that include at least one or more spark plugs configured to provide ion sensor data.

52. The method of claim 32, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor comprises:
controlling a charging and a firing of a given cylinder of the one or more cylinders at least in part with a dedicated ignition coil.

53. The method of claim 32, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor comprises:
retarding the advance for a given cylinder of the one or more cylinders that is running hotter than at least one other cylinder of the one or more cylinders, the retarding based at least in part on sensory input indicative of the temperature of the given cylinder.

54. The method of claim 32, wherein the controlling the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on input from the engine position sensor comprises:
    if the engine is being cranked from a start, then calculating the one or more timing advance positions for the one or more cylinders based at least in part on (1) one or more static parameters and based at least in part on (2) input from the engine position sensor, including at least receiving input from the engine position sensor immediately upon the engine being power on.

55. The method of claim 54, wherein the calculating the one or more timing advance positions for the one or more cylinders based at least in part on (1) one or more static parameters and based at least in part on (2) input from the engine position sensor, including at least receiving input from the engine position sensor immediately upon the engine being power on comprises:
    detecting a cold engine start condition; and
    advancing the one or more cylinders responsive to a detection of a cold engine start condition.

56. The method of claim 54, wherein the calculating the one or more timing advance positions for the one or more cylinders based at least in part on (1) one or more static parameters and based at least in part on (2) input from the engine position sensor, including at least receiving input from the engine position sensor immediately upon the engine being power on comprises:
    detecting a hot engine start condition; and
    retarding the advance of the one or more cylinders responsive to a detection of a hot engine start condition.

57. The method of claim 32, wherein the controlling the firing of one or more cylinders of the engine, the controlling including at least controlling the firing at least in part by calculating one or more timing advance positions for one or more cylinders of the engine includes at least:
    utilizing sensory input from the wide band oxygen sensor to detect at least a lean fuel condition above a threshold.

58. The method of claim 32, wherein the method further comprises:
    receiving user input via wireless signals received from an associated mobile communication device; and
    selecting at least one aspect of engine timing based at least in part on the input received via the wireless signals received from the associated mobile communication device.

59. The method of claim 58, wherein the selecting at least one aspect of engine timing based at least in part on the input received via the wireless signals received from the associated mobile communication device comprises:
    selecting, responsive to the input received by the wireless signals, at least one of:
        a first mode for calculating one or more timing advance positions for one or more cylinders of an engine at least in part with a static table;
        a second mode for calculating one or more timing advance positions for one or more cylinders of an engine at least in part with a dynamic table; or
        a third mode for calculating one or more timing advance positions for one or more cylinders of an engine at least in part with ion sensing circuitry.

60. The method of claim 58, wherein the selecting at least one aspect of engine timing based at least in part on the input received via the wireless signals received from the associated mobile communication device comprises:
    selecting, responsive to the input received by the wireless signals, one or more of:
        a specified RPM limit;
        a specified coil dwell time;
        a specified distributor rotation direction;
        a specified firing order;
        a map sensor for load detection;
        engine coolant temperature;
        engine oil temperature;
        spark output IGT type coils
        spark output high power (ground switched);
        a maximum advance;
        a base timing setting;
        an RPM for reaching maximum advance; or
        a starting advance.

61. The method of claim 32, wherein the controlling the firing of one or more cylinders of the engine, the controlling including at least controlling the firing at least in part by calculating one or more timing advance positions for one or more cylinders of the engine includes at least comprises:
    detecting a presence or an absence of an associated mobile communication device; and
    causing control circuitry to prevent operation of the engine responsive to detecting an absence of the associated mobile communication device.

62. The method of claim 32, wherein the controlling the firing of one or more cylinders of the engine, the controlling including at least controlling the firing at least in part by calculating one or more timing advance positions for one or more cylinders of the engine includes at least comprises:
    outputting one or more square waves indicative of at least one of camshaft position or crankshaft position.

63. An electronic engine timing system comprising:
    an engine position sensor that is configured to output electrical signals indicative of engine position in an engine firing cycle of an engine, the engine position sensor including at least:
        a diametric magnet configured to be rotated by at least one of a rotatable distributor shaft or cam shaft; and
        two or more hall effect sensors configured and positioned to sense diametric magnet position; and
        the engine position sensor being configured at least via the diametric magnet and the two or more hall effect sensors to output the electrical signals indicative of engine position both when the engine is running and when the engine is not running;
    at least one non-transitory computer readable medium bearing instructions that, when executed, cause the electronic engine timing system to at least:
        receive sensory input from the engine position sensor;
        control the firing of one or more cylinders of the engine, the controlling including at least controlling the firing at least in part by calculating one or more timing advance positions for one or more cylinders of the engine and by causing the one or more cylinders to fire according to the one or more calculated timing advance positions, the controlling further including at least calculating the one or more timing advance positions for the one or more cylinders separately from one another on a per cylinder basis based at least in part on the input from the engine position sensor.

\* \* \* \* \*